(12) United States Patent
Yang et al.

(10) Patent No.: US 10,969,776 B2
(45) Date of Patent: **\*Apr. 6, 2021**

(54) METHODS AND APPARATUS FOR REDUCING ENERGY CONSUMED BY DRONES DURING FLIGHT

(71) Applicant: INTEL CORPORATION, Santa Clara, CA (US)

(72) Inventors: Songnan Yang, San Jose, CA (US); Muhammad Abozaed, Portland, OR (US); Rafael De La Guardia Gonzalez, Teuchitlan (MX); David Gomez Gutierrez, Ciudad Guzman (MX); Hong W. Wong, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/459,193

(22) Filed: Jul. 1, 2019

(65) Prior Publication Data

US 2019/0324445 A1 Oct. 24, 2019

Related U.S. Application Data

(63) Continuation of application No. 15/565,035, filed as application No. PCT/US2016/065445 on Dec. 7, 2016, now Pat. No. 10,386,833.

(51) Int. Cl.
*G05D 1/00* (2006.01)
*G08G 5/00* (2006.01)
(Continued)

(52) U.S. Cl.
CPC ......... *G05D 1/0005* (2013.01); *B64C 39/024* (2013.01); *B64F 1/06* (2013.01);
(Continued)

(58) Field of Classification Search
CPC ...... G05D 1/0005; G05D 1/0088; B64F 1/06; B64C 39/024; B64C 2201/084;
(Continued)

(56) References Cited

U.S. PATENT DOCUMENTS 6,260,797 B1 7/2001 Palmer
9,959,771 B1 5/2018 Carlson
(Continued)

FOREIGN PATENT DOCUMENTS

WO 2018106235 6/2018

OTHER PUBLICATIONS

International Searching Authority, "International Search Report and Written Opinion," issued in connection with International Patent Application No. PCT/US2016/065445, dated Aug. 17, 2017, 18 pages.

(Continued)

*Primary Examiner* — Michael J Zanelli
(74) *Attorney, Agent, or Firm* — Hanley, Flight & Zimmerman, LLC

(57) ABSTRACT

Methods and apparatus for reducing energy consumed by drones during flight are disclosed. A drone includes a housing, a motor, receiver circuitry carried by the housing, and a route manager. The receiver circuitry is to receive airborne drone-generated wind data from an airborne drone located in an area within which a segment of a flight of the drone is to occur. The airborne drone-generated wind data is to be determined by an inertial measurement unit of the airborne drone. The route manager is to generate a route for the flight of the drone based on wind data, the wind data including the airborne drone-generated wind data. The route is to be followed by the drone during the flight. The route manager is to select at least one portion of the route to cause
(Continued)

the drone to be at least partially propelled by wind to reduce energy consumed by the drone during the flight.

20 Claims, 19 Drawing Sheets

(51) Int. Cl.
    *B64C 39/02*      (2006.01)
    *G01P 5/06*       (2006.01)
    *B64F 1/06*       (2006.01)

(52) U.S. Cl.
    CPC .............. *G01P 5/06* (2013.01); *G05D 1/0088* (2013.01); *G08G 5/003* (2013.01); *G08G 5/0091* (2013.01); *B64C 2201/084* (2013.01); *B64C 2201/088* (2013.01); *B64C 2201/141* (2013.01)

(58) Field of Classification Search
    CPC ......... B64C 2201/141; B64C 2201/088; G01P 5/06; G08G 5/003; G08G 5/0091
    See application file for complete search history.

(56) References Cited

U.S. PATENT DOCUMENTS

| | | |
|---|---|---|
| 10,054,939 B1 | 8/2018 | Applewhite |
| 2006/0106506 A1 | 5/2006 | Nichols et al. |
| 2009/0326792 A1 | 12/2009 | McGrath |
| 2011/0079072 A1 | 4/2011 | Harrison et al. |
| 2016/0140852 A1 | 5/2016 | Downey et al. |
| 2016/0163204 A1 | 6/2016 | Raptopoulos et al. |
| 2018/0244402 A1 | 8/2018 | Kahlon et al. |

OTHER PUBLICATIONS

International Bureau, "International Preliminary Report on Patentability," issued in connection with International Patent Application No. PCT/US2016/065445, dated Jun. 20, 2019, 15 pages.

Ackerman, "Quadrotors Learning to Surf urban Winds for Huge Performance Boosts," IEEE Spectrum, posted Jun. 7, 2016, retrieved from [https://spectrum.ieee.org/automaton/robotics/drones/quadrotors-learning-to-surf-urban-winds] on Sep. 29, 2016, 4 pages.

United States Patent and Trademark Office, "Non-Final Office Action," issued in connection with U.S. Appl. No. 15/565,035, dated Dec. 17, 2018, 13 pages.

United States Patent and Trademark Office, "Notice of Allowance and Fee(s) Due," issued in connection with U.S. Appl. No. 15/565,035, dated Apr. 11, 2019, 12 pages.

SHAPE IN RESPONSE TO
DETECTION OF LAUNCH APEX

SHAPE AT INITIATION
OF LAUNCH

METHODS AND APPARATUS FOR REDUCING ENERGY CONSUMED BY DRONES DURING FLIGHT

RELATED APPLICATIONS

This application arises from a continuation of U.S. patent application Ser. No. 15/565,035, filed Oct. 6, 2017, entitled "Methods and Apparatus for Reducing Energy Consumed by Drones During Flight," which is a U.S. national stage application of International Patent Application Serial No. PCT/US16/65445, filed Dec. 7, 2016, entitled "Methods and Apparatus for Reducing Energy Consumed by Drones During Flight." The entirety of U.S. patent application Ser. No. 15/565,035 and International Patent Application Serial No. PCT/US16/65445 are hereby incorporated herein by reference.

FIELD OF THE DISCLOSURE

This disclosure relates generally to methods and apparatus for reducing energy consumption and, more specifically, to methods and apparatus for reducing energy consumed by drones during flight.

BACKGROUND

A drone typically includes a power source (e.g., a battery) that stores energy to provide power to operate the drone. The stored energy of the power source is consumed during flight operations of the drone. The amount of energy consumed by a drone during a flight originating at a designated launch location and ending at a designated destination location may be impacted by weather conditions (e.g., airflows, wind, etc.) in one or more area(s) through which the drone passes during the flight. For example, the drone may encounter headwinds and/or downdrafts that require the drone to consume additional energy in the course of reaching the destination location. The energy consumed by the drone during a flight may be reduced when the drone is able to avoid adverse weather conditions (e.g., headwinds and/or downdrafts) and/or when the drone is able to encounter and/or engage advantageous weather conditions (e.g., tailwinds and/or updrafts).

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

The amount of energy consumed by a drone during a flight may be impacted by weather conditions (e.g., airflows, wind, etc.) in one or more area(s) through which the drone passes during the flight. For example, the energy consumed by the drone during a flight may be reduced when the drone is able to avoid adverse weather conditions (e.g., headwinds and/or downdrafts) and/or when the drone is able to encounter and/or engage advantageous weather conditions (e.g., tailwinds and/or updrafts). Accordingly, it may be advantageous from an energy consumption standpoint for the drone to take weather conditions into account when planning and/or generating a route to be followed by the drone during a flight.

Drones which plan and/or generate flight routes that are optimized based on supplied weather data for a surrounding area are known. In such known drone applications, however, the weather data is typically modeled based on assumptions as to how one or more structure(s) (e.g., one or more building(s)) located within the area might impact an airflow and/or wind passing through the area. Unlike such known drone applications, methods and apparatus disclosed herein generate a route to reduce energy consumed during a flight of the drone based on wind data including turbine-generated wind data and/or airborne drone-generated wind data. As used herein, the term "turbine-generated wind data" refers to wind data (e.g., a direction of an airflow, a speed of an airflow, and a location of an airflow) sensed, measured, detected and/or generated by or at a turbine (e.g., a wind turbine). As used herein, the term "airborne drone-generated wind data" refers to wind data (e.g., a direction of an airflow, a speed of an airflow, and a location of an airflow) sensed, measured, detected and/or generated by or at an airborne drone (e.g., a drone flying over an area through which another drone may subsequently pass during a flight). The turbine-generated wind data and/or the airborne drone-generated wind data advantageously provide(s) the drone with actual (e.g., not modeled), localized, real-time (or near real-time) data and/or information relating to the current airflow(s) and or wind condition(s) within one or more area(s) through which the drone is to pass during a flight. By taking such actual, localized, real-time (or near real-time) data and information into consideration when generating a route to be followed by the drone during the flight, the drone is advantageously able to reduce the energy consumed by the drone during the flight.

Figure 1:
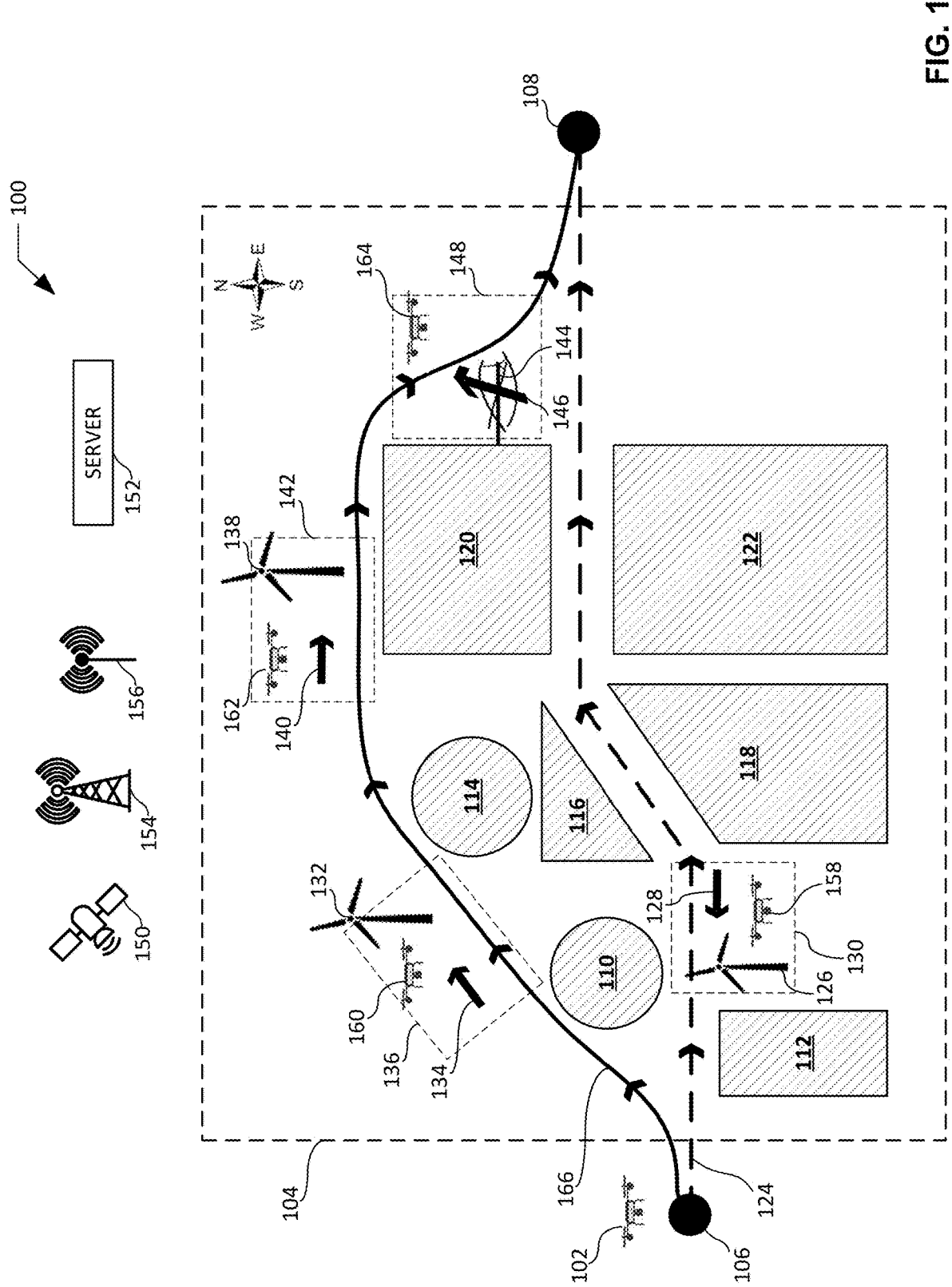
FIG. 1 illustrates an example environment of use in which an example drone reduces its energy usage during flight.

FIG. 1 illustrates an example environment of use 100 in which an example drone 102 reduces the energy it consumes during flight. In the illustrated example of FIG. 1, the example environment of use 100 includes the drone 102 and an example area 104 through and/or over which the drone 102 is to pass during a segment of a flight of the drone 102. In the illustrated example of FIG. 1, the flight of the drone 102 is to begin at an example launch location 106 and end at an example destination location 108. The example area 104 of FIG. 1 includes a first example structure 110 (e.g., a building), a second example structure 112, a third examples structure 114, a fourth example structure 116, a fifth example structure 118, a sixth example structure 120 and a seventh example structure 122. The first, second, third, fourth, fifth, sixth and seventh structures 110, 112, 114, 116, 118, 120, 122 are obstacles and/or impediments within the area 104 that the drone 102 must navigate around, above and/or between when traveling from the launch location 106 to the destination location 108 during a flight of the drone 102. In the illustrated example of FIG. 1, a first example route 124 is the shortest and/or most direct (e.g., by distance) route via which the drone 102 may navigate from the launch location 106 to the destination location 108 in view of the first, second, third, fourth, fifth, sixth and seventh structures 110, 112, 114, 116, 118, 120, 122 located within the area 104.

The example environment of use 100 of FIG. 1 includes a first example turbine 126 (e.g., a wind turbine). The first turbine 126 is located within the area 104 through and/or over which the drone 102 is to pass during a segment of a flight of the drone 102. In the illustrated example of FIG. 1, the first turbine 126 detects a first example airflow 128 (e.g., wind blowing to the west) passing through and/or over a first example airflow area 130 in which the first turbine 126 is located. The example environment of use 100 of FIG. 1 further includes a second example turbine 132 that detects a second example airflow 134 (e.g., wind blowing to the northeast) passing through and/or over a second example airflow area 136 in which the second turbine 132 is located, a third example turbine 138 that detects a third example airflow 140 (e.g., wind blowing to the east) passing through and/or over a third example airflow area 142 in which the third turbine 138 is located, and a fourth example turbine 144 that detects a fourth example airflow 146 (e.g., an updraft of wind) passing through and/or over a fourth example airflow area 148 in which the fourth turbine 144 is located.

In the illustrated example of FIG. 1, one or more of the first, second, third and/or fourth turbine(s) 126, 132, 138, 144 may include a GPS receiver to receive location data via example GPS satellites 150. The one or more of the first, second, third and/or fourth turbine(s) 126, 132, 138, 144 of FIG. 1 may further include one or more sensor(s) to detect a direction and a speed of a corresponding one of the first, second, third and/or fourth airflow(s) 128, 134, 140, 146 of FIG. 1. Thus, the one or more of the first, second, third and/or fourth turbine(s) 126, 132, 138, 144 of FIG. 1 collect(s) and/or generate(s) wind data including a direction of airflow detected by the turbine, a speed of the airflow detected by the turbine, and a location of the turbine. The one or more of the first, second, third and/or fourth turbine(s) 126, 132, 138, 144 of FIG. 1 may further include radio circuitry to transmit the turbine-generated wind data over a network (e.g., a cellular network, a wireless local area network, etc.) to an example server 152 (e.g., a remote server and/or a cloud server). In the illustrated example of FIG. 1, the one or more of the first, second, third and/or fourth turbine(s) 126, 132, 138, 144 may transmit the turbine-generated wind data to other devices (e.g., the server 152, the drone 102, etc.) via an example cellular base station 154 and/or via an example wireless access point 156. In some examples, the one or more of the first, second, third and/or fourth turbine(s) 126, 132, 138, 144 may transmit the turbine-generated wind data to such other devices based on one or more request(s) for the turbine-generated wind data received at the one or more of the first, second, third and/or fourth turbine(s) 126, 132, 138, 144.

The example environment of use 100 of FIG. 1 includes a first example airborne drone 158 (e.g., a drone that is in flight). The first airborne drone 158 is located within the area 104 through and/or over which the drone 102 is to pass during a segment of a flight of the drone 102. In the illustrated example of FIG. 1, the first airborne drone 158 detects the first example airflow 128 (e.g., wind blowing to the west) passing through and/or over the first example airflow area 130 in which the first airborne drone 158 is located. The example environment of use 100 of FIG. 1 further includes a second example airborne drone 160 that detects the second example airflow 134 (e.g., wind blowing to the northeast) passing through and/or over the second example airflow area 136 in which the second airborne drone 160 is located, a third example airborne drone 162 that detects the third example airflow 140 (e.g., wind blowing to the east) passing through and/or over the third example airflow area 142 in which the third airborne drone 162 is located, and a fourth example airborne drone 164 that detects the fourth example airflow 146 (e.g., an updraft of wind) passing through and/or over the fourth example airflow area 148 in which the fourth airborne drone 164 is located.

In the illustrated example of FIG. 1, one or more of the first, second, third and/or fourth airborne drone(s) 158, 160, 162, 164 may include a GPS receiver to receive location data via the example GPS satellites 150. The one or more of the first, second, third and/or fourth airborne drone(s) 158, 160, 162, 164 of FIG. 1 may further include an inertial measurement unit and/or one or more sensor(s) to detect a direction and a speed of a corresponding one of the first, second, third and/or fourth airflow(s) 128, 134, 140, 146 of FIG. 1. Thus, the one or more of the first, second, third and/or fourth airborne drone(s) 158, 160, 162, 164 of FIG. 1 collect(s) and/or generate(s) wind data including a direction of airflow detected by the airborne drone, a speed of the airflow detected by the airborne drone, and a location of the airborne drone. The one or more of the first, second, third and/or fourth airborne drone(s) 158, 160, 162, 164 of FIG. 1 may further include radio circuitry to transmit the airborne drone-generated wind data over a network (e.g., a cellular network, a wireless local area network, etc.) to the example server 152 (e.g., a remote server and/or a cloud server). In the illustrated example of FIG. 1, the one or more of the first, second, third and/or fourth airborne drone(s) 158, 160, 162, 164 may transmit the airborne drone-generated wind data to other devices (e.g., the server 152, the drone 102, etc.) via the example cellular base station 154 and/or via the example wireless access point 156 of FIG. 1. In some examples, the one or more of the first, second, third and/or fourth airborne drone(s) 158, 160, 162, 164 may transmit the airborne drone-generated wind data to such other devices based on one or more request(s) for the airborne drone-generated wind data received at the one or more of the first, second, third and/or fourth airborne drone(s) 158, 160, 162, 164.

In the illustrated example of FIG. 1, the server 152 receives turbine-generated wind data from one or more of the first, second, third and/or fourth turbine(s) 126, 132, 138, 144 of FIG. 1 and/or receives airborne drone-generated wind data from one or more of the first, second, third and/or fourth airborne drone(s) 158, 160, 162, 164 of FIG. 1. The server 152 of FIG. 1 generates wind data including the turbine-generated wind data and/or the airborne drone-generated wind data. The server 152 may generate the wind data by combining and/or aggregating turbine-generated wind data received from various ones of the first, second, third and/or fourth turbine(s) 126, 132, 138, 144, by combining and/or aggregating airborne drone-generated wind data received from various ones of the first, second, third and/or fourth airborne drone(s) 158, 160, 162, 164, and or by combining the aggregate turbine-generated wind data and the aggregate airborne drone-generated wind data. In the illustrated example of FIG. 1, the server 152 may transmit the wind data including the turbine-generated wind data and/or the airborne drone-generated wind data to other devices (e.g., the drone 102, etc.) via the example cellular base station 154 and/or via the example wireless access point 156 of FIG. 1. In some examples, the server 152 may transmit the wind data to such other devices based on one or more request(s) for the wind data received at the server 152.

In the illustrated example of FIG. 1, based on the received wind data including the turbine-generated wind data and/or the airborne drone-generated wind data, the drone 102 generates a second example route 166 to be followed by the drone 102 during the flight of the drone 102 through and/or over the area 104 from the launch location 106 to the destination location 108 of FIG. 1. In the illustrated example of FIG. 1, while the first route 124 is the shortest and/or most direct (e.g., by distance) route via which the drone 102 may navigate from the launch location 106 to the destination location 108 in view of the first, second, third, fourth, fifth, sixth and seventh structures 110, 112, 114, 116, 118, 120, 122 located within the area 104, the second route 166 is a more energy efficient (e.g., less energy consumption by the drone 102) route via which the drone 102 may navigate from the launch location 106 to the destination location 108 in view of the first, second, third, fourth, fifth, sixth and seventh structures 110, 112, 114, 116, 118, 120, 122 located within the area 104. For example, while the drone 102 would encounter a headwind (e.g., the first airflow 128) when traveling along the first route 124, the drone 102 is able to avoid the headwind while also encountering the tailwinds (e.g., the second airflow 134 and the third airflow 140) and the updraft (e.g., the fourth airflow 146) when traveling along the second route 166. As a result of the tailwinds and updraft encountered by the drone 102 when traveling along the second route 166, the drone 102 expends and/or consumes less energy when traveling between the launch location 106 and the destination location 108 relative to the energy that would be expended and/or consumed by the drone 102 were it to travel along the first route 124.

The numbers, sizes, locations, orientations and directions of the areas (e.g., the area 104 and the first, second, third and fourth airflow areas 130, 136, 142, 148), the structures (e.g., the first, second, third, fourth, fifth, sixth and seventh structures 110, 112, 114, 116, 118, 120, 122), the drones not yet flying (e.g., the drone 102), the airborne drones (e.g., the first, second, third and fourth airborne drones 158, 160, 162, 164), the turbines (e.g., the first, second, third and fourth turbines 126, 132, 138, 144), the airflows (e.g., the first, second, third and fourth airflows 128, 134, 140, 146) and the routes (e.g., the first and second routes 124, 166) of FIG. 1 are examples. The environment of use 100 of FIG. 1 may include any number(s), any size(s), any location(s), any orientation(s) and any direction(s) of areas, structures, drones, airborne drones, turbines, airflows and/or routes.

Figure 2:
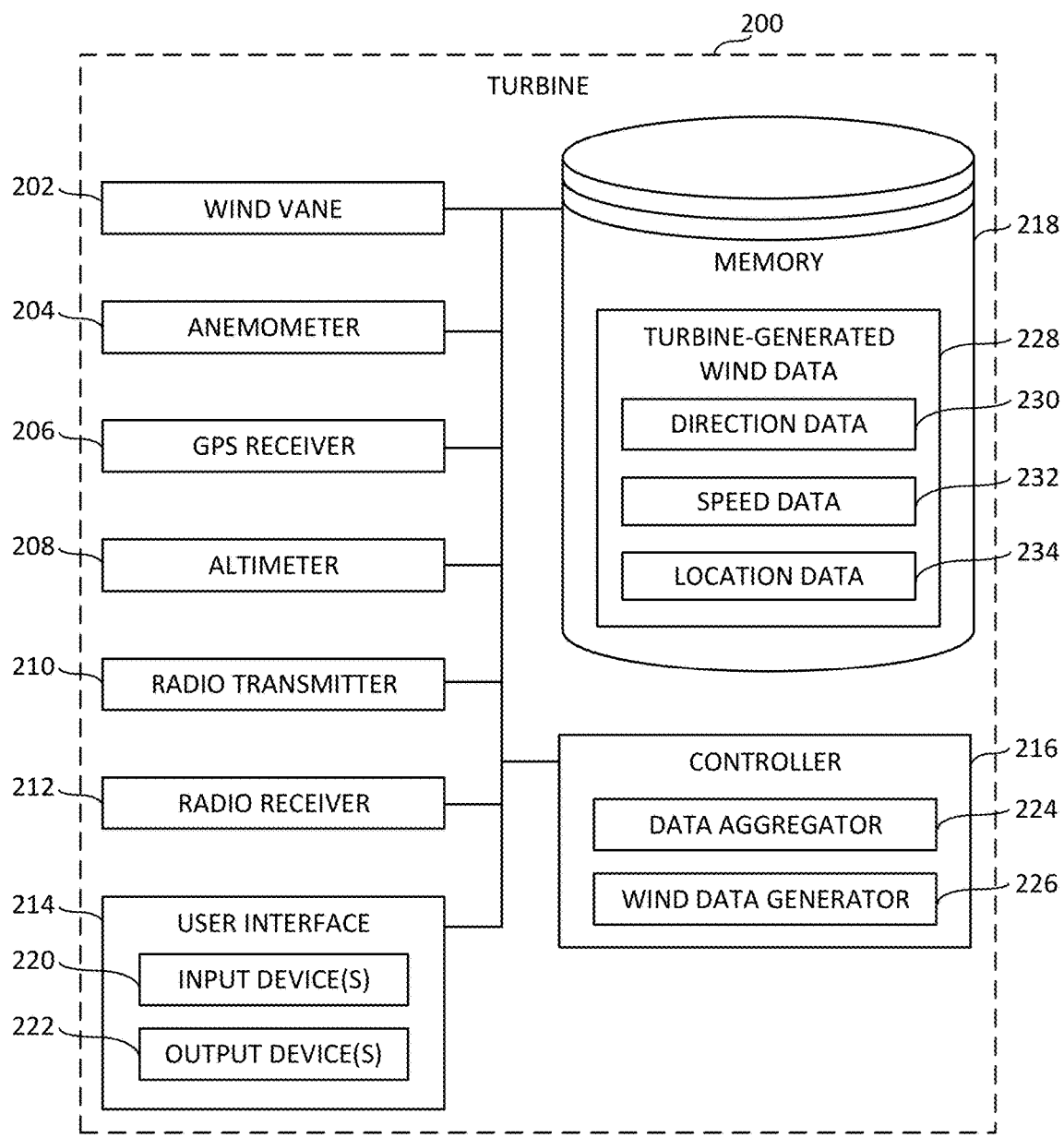
FIG. 2 is a block diagram of an example implementation of a turbine of FIG. 1 constructed in accordance with the teachings of this disclosure.

FIG. 2 is a block diagram of an example implementation of a turbine 200 constructed in accordance with the teachings of this disclosure. The block diagram of FIG. 2 may be used to implement any of the first, second, third and/or fourth example turbines 126, 132, 138, 144 of FIG. 1. In the illustrated example of FIG. 2, the turbine 200 includes an example wind vane 202, an example anemometer 204, an example GPS receiver 206, an example altimeter 208, an example radio transmitter 210, an example radio receiver 212, an example user interface 214, an example controller 216, and an example memory 218. However, other example implementations of the turbine 200 may include fewer or additional structures.

The example wind vane 202 of FIG. 2 senses, measures and/or detects a direction of an airflow (e.g., the direction of the first airflow 128 of FIG. 1). Airflow direction data sensed, measured and/or detected by the wind vane 202 may be associated with one or more time(s) (e.g., time stamped) at which the data was sensed, measured and/or detected by the wind vane 202. Example airflow direction data 230 sensed, measured and/or detected by the wind vane 202 may be of any type, form and/or format, and may be stored in a computer-readable storage medium such as the example memory 218 of FIG. 2 described below.

The example anemometer 204 of FIG. 2 senses, measures and/or detects a speed of an airflow (e.g., the speed of the first airflow 128 of FIG. 1). Airflow speed data sensed, measured and/or detected by the anemometer 204 may be associated with one or more time(s) (e.g., time stamped) at which the data was sensed, measured and/or detected by the anemometer 204. In some examples, one or more of the time(s) associated with the airflow speed data may be synchronized with one or more of the time(s) associated with the airflow direction data. Example airflow speed data 232 sensed, measured and/or detected by the anemometer 204 may be of any type, form and/or format, and may be stored in a computer-readable storage medium such as the example memory 218 of FIG. 2 described below.

The example GPS receiver 206 of FIG. 2 collects, acquires and/or receives data and/or one or more signal(s) from one or more GPS satellite(s) (e.g., represented by the GPS satellite 150 of FIG. 1). Typically, signals from three or more satellites are needed to form the GPS triangulation. The data and/or signal(s) received by the GPS receiver 206 may include information (e.g., time stamps) from which the current position and/or location of the turbine 200 may be identified and/or derived, including for example, the current latitude, longitude and altitude of the turbine 200. Location data identified and/or derived from the signal(s) collected and/or received by the GPS receiver 206 may be associated with one or more local time(s) (e.g., time stamped) at which the data and/or signal(s) were collected and/or received by the GPS receiver 206. In some examples, a local clock is used to timestamp the location data, the airflow speed data, and/or the airflow direction data to maintain synchronization between the same. Example location data 234 identified and/or derived from the signal(s) collected and/or received by the GPS receiver 206 may be of any type, form and/or format, and may be stored in a computer-readable storage medium such as the example memory 218 of FIG. 2 described below.

The example altimeter 208 of FIG. 2 senses, measures and/or detects atmospheric pressure from which a corresponding altitude of the turbine 200 can be determined. Thus, the altimeter 208 may be utilized as an additional and/or alternate means, relative to the GPS receiver 206, for identifying and/or deriving the current altitude of the turbine 200. The altimeter 208 is able to sense, measure and/or detect the altitude of the turbine 200 when cellular and/or wireless network signals are unavailable to the turbine 200, and also when signals from GPS satellites (e.g., the GPS satellite 150) are unavailable to the turbine 200. Altitude data sensed, measured and/or detected by the altimeter 208 may be associated with one or more time(s) (e.g., time stamped) at which the data was sensed, measured and/or detected by the altimeter 208. In some examples, one or more of the time(s) associated with the altitude data may be synchronized with one or more of the time(s) associated with the location data, one or more time(s) associated with the airflow speed data, and/or one or more of the time(s) associated with the airflow direction data. Altitude data sensed, measured and/or detected by the altimeter 208 may be of any type, form and/or format, and may be stored in a computer-readable storage medium such as the example memory 218 of FIG. 2 described below. In some examples, the altitude data may be included among the example location data 234 stored in the example memory 218.

The example radio transmitter 210 of FIG. 2 transmits data and/or one or more radio frequency signal(s) to other devices (e.g., the server 152 of FIG. 1, the drone 102 of FIG. 1, etc.). In some examples, the data and/or signal(s) transmitted by the radio transmitter 210 is/are communicated over a network (e.g., a cellular network and/or a wireless local area network) via the example cellular base station 154 and/or via the example wireless access point 156 of FIG. 1. In some examples, the radio transmitter 210 may transmit example turbine-generated wind data 228 including the example airflow direction data 230, the example airflow speed data 232, and/or the example location data 234 described above. In some examples, the radio transmitter 210 may transmit the turbine-generated wind data 228 in response to one or more request(s) for the turbine-generated wind data 228 received at the turbine 200 from another device (e.g., a request from the server 152 of FIG. 1, a request from the drone 102 of FIG. 1, etc.). Data corresponding to the signal(s) to be transmitted by the radio transmitter 210 may be of any type, form and/or format, and may be stored in a computer-readable storage medium such as the example memory 218 of FIG. 2 described below.

The example radio receiver 212 of FIG. 2 collects, acquires and/or receives data and/or one or more radio frequency signal(s) from other devices (e.g., the server 152 of FIG. 1, the drone 102 of FIG. 1, etc.). In some examples, the data and/or signal(s) received by the radio receiver 212 is/are communicated over a network (e.g., a cellular network and/or a wireless local area network) via the example cellular base station 154 and/or via the example wireless access point 156 of FIG. 1. In some examples, the radio receiver 212 may receive data and/or signal(s) corresponding to one or more request(s) for the turbine-generated wind data 228. The one or more request(s) for the turbine-generated wind data 228 may be transmitted from another device (e.g., a request from the server 152 of FIG. 1, a request from the drone 102 of FIG. 1, etc.). Data carried by, identified and/or derived from the signal(s) collected and/or received by the radio receiver 212 may be of any type, form and/or format, and may be stored in a computer-readable storage medium such as the example memory 218 of FIG. 2 described below.

The example user interface 214 of FIG. 2 facilitates interactions and/or communications between an end user and the turbine 200. The user interface 214 includes one or more input device(s) 220 via which the user may input information and/or data to the turbine 200. For example, the user interface 214 may be a button, a switch, a microphone, and/or a touchscreen that enable(s) the user to convey data and/or commands to the example controller 216 of FIG. 2 described below, and/or, more generally, to the turbine 200 of FIG. 2. The user interface 214 of FIG. 2 also includes one or more output device(s) 222 via which the user interface 214 presents information and/or data in visual and/or audible form to the user. For example, the user interface 214 may include a light emitting diode, a touchscreen, and/or a liquid crystal display for presenting visual information, and/or a speaker for presenting audible information. Data and/or information that is presented and/or received via the user interface 214 may be of any type, form and/or format, and may be stored in a computer-readable storage medium such as the example memory 218 of FIG. 2 described below.

The example controller 216 of FIG. 2 may be implemented by a semiconductor device such as a microprocessor or microcontroller. The controller 216 manages and/or controls the operation of the turbine 200. The example controller 216 of FIG. 2 includes an example data aggregator 224 and an example wind data generator 226. In some examples, the controller 216 manages and/or controls the operation of the turbine 200 based on data, information and/or one or more signal(s) obtained and/or accessed by the controller 216 from one or more of the wind vane 202, the anemometer 204, the GPS receiver 206, the altimeter 208, the radio receiver 212, the user interface 214, the memory 218, the data aggregator 224 and/or the wind data generator 226 of FIG. 2, and/or based on data, information and/or one or more signal(s) provided by the controller 216 to one or more of the radio transmitter 210, the user interface 214, the data aggregator 224 and/or the wind data generator 226 of FIG. 2.

In some examples, the data aggregator 224 of FIG. 2 determines a direction of an airflow (e.g., the direction of the first airflow 128 of FIG. 1). For example, the data aggregator 224 may collect, access, obtain, process, determine, and/or otherwise identify the airflow direction data 230 sensed, measured and/or detected by the wind vane 202. The airflow direction data 230 collected, accessed, obtained, processed, determined, and/or otherwise identified by the data aggregator 224 may include timing information (e.g., time stamps) corresponding to times at which the airflow direction data 230 was sensed, measured and/or detected by the wind vane 202. The data aggregator 224 may collect, access, obtain, process, determine, and/or otherwise identify the airflow direction data 230 from the wind vane 202 and/or from the example memory 218 of FIG. 2 described below.

In some examples, the data aggregator 224 of FIG. 2 determines a speed of an airflow (e.g., the speed of the first airflow 128 of FIG. 1). For example, the data aggregator 224 may collect, access, obtain, process, determine, and/or otherwise identify the airflow speed data 232 sensed, measured and/or detected by the anemometer 204. The airflow speed data 232 collected, accessed, obtained, processed, determined, and/or otherwise identified by the data aggregator 224 may include timing information (e.g., time stamps) corresponding to times at which the airflow speed data 232 was sensed, measured and/or detected by the anemometer 204. The data aggregator 224 may collect, access, obtain, process, determine, and/or otherwise identify the airflow speed data 232 from the anemometer 204 and/or from the example memory 218 of FIG. 2 described below.

In some examples, the data aggregator 224 of FIG. 2 determines a location of the turbine 200. For example, the data aggregator 224 may collect, access, obtain, process, determine, and/or otherwise identify the location data 234 identified and/or derived from the signal(s) collected and/or received by the GPS receiver 206. The data aggregator 224 may additionally and/or alternatively collect, access, obtain, process, determine, and/or otherwise identify the altitude data sensed, measured and/or detected by the altimeter 208. The location data 234 collected, accessed, obtained, processed, determined, and/or otherwise identified by the data aggregator 224 may include timing information (e.g., time stamps) corresponding to times at which the location data 234 was collected, received and/or detected by the GPS receiver 206 and/or the altimeter 208. The data aggregator 224 may collect, access, obtain, process, determine, and/or otherwise identify the location data 234 from the GPS receiver 206, from the altimeter 208, and/or from the example memory 218 of FIG. 2 described below.

In some examples, the wind data generator 226 of FIG. 2 generates the example turbine-generated wind data 228. In some examples, the turbine-generated wind data 228 includes the airflow direction data 230, the airflow speed data 232 and/or the location data 234 described above. In some examples, the wind data generator 226 synchronizes and/or otherwise organizes the turbine-generated wind data 228 based on the timing information associated with each of the airflow direction data 230, the airflow speed data 232, and the location data 234. For example, first data and/or a first data point of the turbine-generated wind data 228 may include an airflow direction at a first time, an airflow speed at the first time, and a location of the turbine 200 at the first time. Second data and/or a second data point of the turbine-generated wind data 228 may include an airflow direction at a second time, an airflow speed at the second time, and a location of the turbine 200 at the second time. Turbine-generated wind data 228 generated and/or determined by the wind data generator 226 may be of any type, form and/or format, and may be stored in a computer-readable storage medium such as the example memory 218 of FIG. 2 described below.

In some examples, the controller 216 of FIG. 2 determines whether a request has been received at the turbine 200 for the turbine-generated wind data 228. For example, the controller 216 may receive one or more signal(s), command(s) and or instruction(s) via the radio receiver 212 of FIG. 2. If the controller 216 determines that a request for the turbine-generated wind data 228 has been received, the controller 216 provides one or more control signal(s) and/or instruction(s) to the radio transmitter 210 of FIG. 2 instructing the radio transmitter 210 to transmit the turbine-generated wind data 228. In response to such signal(s) and/or instruction(s), the radio transmitter 210 may transmit the turbine-generated wind data 228.

In some examples, the controller 216 of FIG. 2 determines whether the turbine-generated wind data 228 of the turbine 200 is to be transmitted. For example, the controller 216 may receive one or more signal(s), command(s) and or instruction(s) indicating that the turbine-generated wind data 228 is to be transmitted to another device (e.g., the server 152 of FIG. 1, the drone 102 of FIG. 1, etc.). In some examples, the timing of the transmission of the turbine-generated wind data 228 may be predetermined, scheduled, and/or otherwise defined by an application and/or program executing on the turbine 200. In some examples, the timing of the transmission of the turbine-generated wind data 228 may be triggered by an event. In some examples, one or more user input(s) received via the input device(s) 220 of the user interface 214 of FIG. 2 may indicate that the turbine-generated wind data 228 is to be transmitted. If the controller 216 determines that the turbine-generated wind data 228 of the turbine 200 is to be transmitted, the controller 216 provides one or more control signal(s) and/or instruction(s) to the radio transmitter 210 of FIG. 2 instructing the radio transmitter 210 to transmit the turbine-generated wind data 228. In response to such signal(s) and/or instruction(s), the radio transmitter 210 may transmit the turbine-generated wind data 228.

In some examples, the controller 216 of FIG. 2 determines whether turbine-generated wind data 228 for the turbine 200 is to continue being collected and/or generated. For example, the controller 216 may receive one or more signal(s), command(s) and or instruction(s) indicating that turbine-generated wind data 228 for the turbine 200 is not to continue being collected and/or generated. In some examples, the timing and/or duration of the collection and/or generation of the turbine-generated wind data 228 may be predetermined, scheduled, and/or otherwise defined by an application and/or program executing on the turbine 200. In some examples, the timing and/or duration of the collection and/or generation of the turbine-generated wind data 228 may be triggered by an event. In some examples, one or more user input(s) received via the input device(s) 220 of the user interface 214 of FIG. 2 may indicate that turbine-generated wind data 228 for the turbine 200 is not to continue being collected and/or generated. If the controller 216 determines that turbine-generated wind data 228 for the turbine 200 is not to continue being collected and/or generated, the controller 216 may provide one or more control signal(s) and/or instruction(s) to one or more of the wind vane 202, the anemometer 204, the GPS receiver 206, the altimeter 208 and/or the user interface 214 of FIG. 2 indicating that turbine-generated wind data 228 for the turbine 200 is not to continue being collected and/or generated. In response to such signal(s) and/or instruction(s), one or more of the wind vane 202, the anemometer 204, the GPS receiver 206, the altimeter 208 and/or the user interface 214 of FIG. 2 may cease sensing, measuring, collecting and/or detecting data associated with turbine-generated wind data 228 for the turbine 200.

The example memory 218 of FIG. 2 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 218 may be stored in any file and/or data structure format, organization scheme, and/or arrangement. In some examples, the memory 218 stores airflow direction data 230 sensed, measured and/or detected by the wind vane 202, airflow speed data 232 sensed, measured and/or detected by the anemometer 204, location data 234 collected, received, identified and/or derived by the GPS receiver 206, altitude data sensed, measured and/or detected by the altimeter 208, and/or turbine-generated wind data 228 generated by the wind data generator 226 and/or to be transmitted by the radio transmitter 210 of FIG. 2. The memory 218 is accessible to one or more of the example wind vane 202, the example anemometer 204, the example GPS receiver 206, the example altimeter 208, the example radio transmitter 210, the example radio receiver 212, the example user interface 214 and/or the example controller 216 of FIG. 2, and/or, more generally, to the turbine 200 of FIG. 2.

While an example manner of implementing a turbine is illustrated in FIG. 2, one or more of the elements, processes and/or devices illustrated in FIG. 2 may be combined, divided, re-arranged, omitted, eliminated and/or implemented in any other way. Further, the example wind vane 202, the example anemometer 204, the example GPS receiver 206, the example altimeter 208, the example radio transmitter 210, the example radio receiver 212, the example user interface 214, the example controller 216, the example memory 218, the example data aggregator 224 and/or the example wind data generator 226 of FIG. 2 may be implemented by hardware, software, firmware and/or any combination of hardware, software and/or firmware. Thus, for example, any of the example wind vane 202, the example anemometer 204, the example GPS receiver 206, the example altimeter 208, the example radio transmitter 210, the example radio receiver 212, the example user interface 214, the example controller 216, the example memory 218, the example data aggregator 224 and/or the example wind data generator 226 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wind vane 202, the example anemometer 204, the example GPS receiver 206, the example altimeter 208, the example radio transmitter 210, the example radio receiver 212, the example user interface 214, the example controller 216, the example memory 218, the example data aggregator 224 and/or the example wind data generator 226 is/are hereby expressly defined to include a tangible computer-readable storage device or storage disk such as a memory, a digital versatile disk (DVD), a compact disk (CD), a Blu-ray disk, etc. storing the software and/or firmware. Further still, the example turbine 200 of FIG. 2 may include one or more elements, processes and/or devices in addition to, or instead of, those illustrated in FIG. 2, and/or may include more than one of any or all of the illustrated elements, processes and devices.

Figure 3:
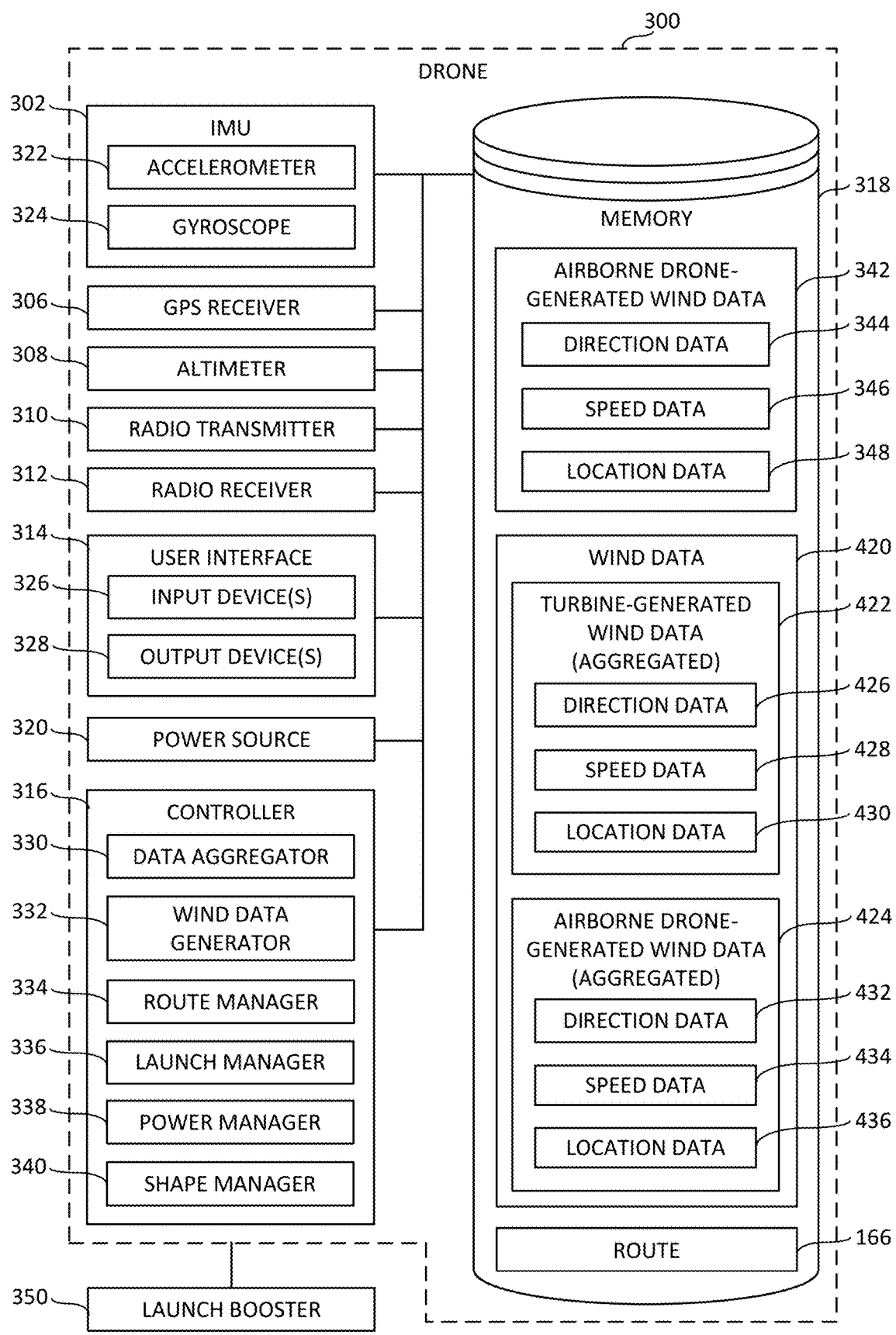
FIG. 3 is a block diagram of an example implementation of a drone of FIG. 1 constructed in accordance with the teachings of this disclosure.

FIG. 3 is a block diagram of an example implementation of a drone 300 constructed in accordance with the teachings of this disclosure. The block diagram of FIG. 3 may be used to implement any of the first, second, third and/or fourth example airborne drones 158, 160, 162, 164 of FIG. 1, and/or the example drone 102 of FIG. 1. In the illustrated example of FIG. 3, the drone 300 includes an example inertial measurement unit 302, an example GPS receiver 306, an example altimeter 308, an example radio transmitter 310, an example radio receiver 312, an example user interface 314, an example controller 316, an example memory 318, and an example power source 320. However, other example implementations of the drone 300 may include fewer or additional structures.

The example inertial measurement unit (IMU) 302 of FIG. 3 includes an example accelerometer 322 and an example gyroscope 324. The example accelerometer 322 of FIG. 3 senses, measures and/or detects changes in velocity (e.g., acceleration(s)) of the drone 300. Different changes in the velocity values sensed, measured and/or detected by the accelerometer 322 correspond to different accelerations of the drone 300. In some examples, the accelerometer 322 is implemented as a triple-axis accelerometer (e.g., a 3-axis accelerometer) such that the accelerometer 322 senses, measures and/or detects acceleration data for each of three axes of a coordinate system associated with the drone 300.

The example gyroscope 324 of FIG. 3 senses, measures and/or detects angular velocity (e.g., rates of rotation) of the drone 300. Different angular velocity values sensed, measured and/or detected by the gyroscope 324 correspond to different rotational movements of the drone 300. In some examples, the gyroscope 324 is implemented as a triple-axis gyroscope (e.g., a 3-axis gyroscope) such that the gyroscope 324 senses, measures and/or detects rate or rotation data for each of three axes of a coordinate system associated with the drone 300. Based on the acceleration data and the rate or rotation data sensed, measured and/or detected by the accelerometer 322 and the gyroscope 324, the IMU 302 determines a direction and a speed of an airflow (e.g., the direction and the speed of the first airflow 128 of FIG. 1). For example, the IMU 302 may determine a direction and a speed of an airflow by comparing an estimated IMU input (e.g., based on the drone's design and motor speed) to an actual and/or measured IMU input (e.g., based on the rate or rotation data sensed, measured and/or detected by the accelerometer 322 and the gyroscope 324). Airflow direction and airflow speed data determined by the IMU 302 may be associated with one or more time(s) (e.g., time stamped) at which the acceleration data and the rate of rotation data was sensed, measured and/or detected by the accelerometer 322 and the gyroscope 324 of the IMU 302. Example airflow direction data 344 and example airflow speed data 346 determined by the IMU 302 may be of any type, form and/or format, and may be stored in a computer-readable storage medium such as the example memory 318 of FIG. 3 described below.

The example GPS receiver 306 of FIG. 3 collects, acquires and/or receives data and/or one or more signal(s) from one or more GPS satellite(s) (e.g., represented by the GPS satellites 150 of FIG. 1). Typically, signals from three or more satellites are needed to form the GPS triangulation. The data and/or signal(s) received by the GPS receiver 306 may include information (e.g., time stamps) from which the current position and/or location of the drone 300 may be identified and/or derived, including for example, the current latitude, longitude and altitude of the drone 300. Location data identified and/or derived from the signal(s) collected and/or received by the GPS receiver 306 may be associated with one or more local time(s) (e.g., time stamped) at which the data and/or signal(s) were collected and/or received by the GPS receiver 306. In some examples, a local clock is used to timestamp the location data, the airflow speed data, and/or the airflow direction data to maintain synchronization between the same. Example location data 348 identified and/or derived from the signal(s) collected and/or received by the GPS receiver 306 may be of any type, form and/or format, and may be stored in a computer-readable storage medium such as the example memory 318 of FIG. 3 described below.

The example altimeter 308 of FIG. 3 senses, measures and/or detects atmospheric pressure from which a corresponding altitude of the drone 300 can be determined. Thus, the altimeter 308 may be utilized as an additional and/or alternate means, relative to the GPS receiver 306, for identifying and/or deriving the current altitude of the drone 300. The altimeter 308 is able to sense, measure and/or detect the altitude of the drone 300 when cellular and/or wireless network signals are unavailable to the drone 300, and also when signals from GPS satellites (e.g., the GPS satellites 150) are unavailable to the drone 300. Altitude data sensed, measured and/or detected by the altimeter 308 may be associated with one or more time(s) (e.g., time stamped) at which the data was sensed, measured and/or detected by the altimeter 308. In some examples, one or more of the time(s) associated with the altitude data may be synchronized with one or more of the time(s) associated with the location data, one or more time(s) associated with the airflow speed data, and/or one or more of the time(s) associated with the airflow direction data. Altitude data sensed, measured and/or detected by the altimeter 308 may be of any type, form and/or format, and may be stored in a computer-readable storage medium such as the example memory 318 of FIG. 3 described below. In some examples, the altitude data may be included among the example location data 348 stored in the example memory 318.

The example radio transmitter 310 of FIG. 3 transmits data and/or one or more radio frequency signal(s) to other devices (e.g., the server 152 of FIG. 1, the drone 102 of FIG. 1, etc.). In some examples, the data and/or signal(s) transmitted by the radio transmitter 310 is/are communicated over a network (e.g., a cellular network and/or a wireless local area network) via the example cellular base station 154 and/or via the example wireless access point 156 of FIG. 1. In some examples, the radio transmitter 310 may transmit example airborne drone-generated wind data 342 including the example airflow direction data 344, the example airflow speed data 346, and/or the example location data 348 described above. In some examples, the radio transmitter 310 may transmit the airborne drone-generated wind data 342 in response to one or more request(s) for the airborne drone-generated wind data 342 received at the drone 300 from another device (e.g., a request from the server 152 of FIG. 1, a request from the drone 102 of FIG. 1, etc.). In some examples, the example radio transmitter 310 may transmit one or more request(s) to a server (e.g., the server 152 of FIGS. 1 and/or 4) for wind data (e.g., the wind data 420 of FIG. 4). In some examples, the example radio transmitter 310 may transmit one or more request(s) to a server (e.g., the server 152 of FIGS. 1 and/or 4) for a route (e.g., the second route 166 of FIG. 1) to be generated based on wind data (e.g., the wind data 420 of FIG. 4). Data corresponding to the signal(s) to be transmitted by the radio transmitter 310 may be of any type, form and/or format, and may be stored in a computer-readable storage medium such as the example memory 318 of FIG. 3 described below.

The example radio receiver 312 of FIG. 3 collects, acquires and/or receives data and/or one or more radio frequency signal(s) from other devices (e.g., the server 152 of FIG. 1, the drone 102 of FIG. 1, etc.). In some examples, the data and/or signal(s) received by the radio receiver 312 is/are communicated over a network (e.g., a cellular network and/or a wireless local area network) via the example cellular base station 154 and/or via the example wireless access point 156 of FIG. 1. In some examples, the radio receiver 312 may receive data and/or signal(s) corresponding to one or more request(s) for the airborne drone-generated wind data 342. The one or more request(s) for the airborne drone-generated wind data 342 may be transmitted from another device (e.g., a request from the server 152 of FIG. 1, a request from the drone 102 of FIG. 1, etc.). In some examples, the radio receiver 312 may receive data and/or signal(s) corresponding to wind data including turbine-generated wind data and/or airborne drone-generated wind data (e.g., the wind data 420 including the aggregated turbine-generated wind data 422 and the aggregated airborne drone-generated wind data 424 of FIG. 4). In some examples, the wind data may be received from a server (e.g., the server 152 of FIGS. 1 and/or 4). In other examples, the wind data may be received from one or more turbine(s) (e.g., one or more of the first, second, third and/or fourth turbine(s) 126, 132, 138, 144 of FIG. 1) and/or from one or more airborne drone(s) (e.g., one or more of the first, second, third and/or fourth airborne drone(s) 158, 160, 162, 164 of FIG. 1). In some examples, the radio receiver 312 may receive data and/or signal(s) corresponding to a route for a flight of the drone, the route being based on wind data including turbine-generated wind data and/or airborne drone-generated wind data (e.g., the wind data 420 including the aggregated turbine-generated wind data 422 and the aggregated airborne drone-generated wind data 424 of FIG. 4). Data carried by, identified and/or derived from the signal(s) collected and/or received by the radio receiver 312 may be of any type, form and/or format, and may be stored in a computer-readable storage medium such as the example memory 318 of FIG. 3 described below.

The example user interface 314 of FIG. 3 facilitates interactions and/or communications between an end user and the drone 300. The user interface 314 includes one or more input device(s) 326 via which the user may input information and/or data to the drone 300. For example, the user interface 314 may be a button, a switch, a microphone, and/or a touchscreen that enable(s) the user to convey data and/or commands to the example controller 316 of FIG. 3 described below, and/or, more generally, to the drone 300 of FIG. 3. The user interface 314 of FIG. 3 also includes one or more output device(s) 328 via which the user interface 314 presents information and/or data in visual and/or audible form to the user. For example, the user interface 314 may include a light emitting diode, a touchscreen, and/or a liquid crystal display for presenting visual information, and/or a speaker for presenting audible information. Data and/or information that is presented and/or received via the user interface 314 may be of any type, form and/or format, and may be stored in a computer-readable storage medium such as the example memory 318 of FIG. 3 described below.

The example controller 316 of FIG. 3 may be implemented by a semiconductor device such as a microprocessor or microcontroller. The controller 316 manages and/or controls the operation of the drone 300. The example controller 316 of FIG. 3 includes an example data aggregator 330, an example wind data generator 332, an example route manager 334, an example launch manager 336, an example power manager 338, and an example shape manager 340. In some examples, the controller 316 manages and/or controls the operation of the drone 300 based on data, information and/or one or more signal(s) obtained and/or accessed by the controller 316 from one or more of the IMU 302, the GPS receiver 306, the altimeter 308, the radio receiver 312, the user interface 314, the memory 318, the data aggregator 330, the wind data generator 332, the route manager 334, the launch manager 336, the power manager 338 and/or the shape manager 340 of FIG. 3, and/or based on data, information and/or one or more signal(s) provided by the controller 316 to one or more of the radio transmitter 310, the user interface 314, the data aggregator 330, the wind data generator 332, the route manager 334, the launch manager 336, the power manager 338 and/or the shape manager 340 of FIG. 3.

In some examples, the data aggregator 330 of FIG. 3 determines a direction of an airflow (e.g., the direction of the first airflow 128 of FIG. 1). For example, the data aggregator 330 may collect, access, obtain, process, determine, and/or otherwise identify the airflow direction data 344 sensed, measured, detected and/or determined by the IMU 302. The airflow direction data 344 collected, accessed, obtained, processed, determined, and/or otherwise identified by the data aggregator 330 may include timing information (e.g., time stamps) corresponding to times at which the airflow direction data 344 was sensed, measured and/or detected by the accelerometer 322 and the gyroscope 324 of the IMU 302. The data aggregator 330 may collect, access, obtain, process, determine, and/or otherwise identify such airflow direction data 344 from the IMU 302 and/or from the example memory 318 of FIG. 3 described below.

In some examples, the data aggregator 330 of FIG. 3 determines a speed of an airflow (e.g., the speed of the first airflow 128 of FIG. 1). For example, the data aggregator 330 may collect, access, obtain, process, determine, and/or otherwise identify the airflow speed data 346 sensed, measured, detected and/or determined by the IMU 302. The airflow speed data 346 collected, accessed, obtained, processed, determined, and/or otherwise identified by the data aggregator 330 may include timing information (e.g., time stamps) corresponding to times at which the airflow speed data 346 was sensed, measured and/or detected by the accelerometer 322 and the gyroscope 324 of the IMU 302. The data aggregator 330 may collect, access, obtain, process, determine, and/or otherwise identify such airflow speed data 346 from the IMU 302 and/or from the example memory 318 of FIG. 3 described below.

In some examples, the data aggregator 330 of FIG. 3 determines a location of the drone 300. For example, the data aggregator 330 may collect, access, obtain, process, determine, and/or otherwise identify the location data 348 identified and/or derived from the signal(s) collected and/or received by the GPS receiver 306. The data aggregator 330 may additionally and/or alternatively collect, access, obtain and/or otherwise identify the altitude data sensed, measured and/or detected by the altimeter 308. The location data 348 collected, accessed, obtained, processed, determined, and/or otherwise identified by the data aggregator 330 may include timing information (e.g., time stamps) corresponding to times at which the location data 348 was collected, received and/or detected by the GPS receiver 306 and/or the altimeter 308. The data aggregator 330 may collect, access, obtain, process, determine, and/or otherwise identify the location data 348 from the GPS receiver 306, from the altimeter 308, and/or from the example memory 318 of FIG. 3 described below.

In some examples, the wind data generator 332 of FIG. 3 generates the example airborne drone-generated wind data 342. In some examples, the airborne drone-generated wind data 342 includes the airflow direction data 344, the airflow speed data 346 and/or the location data 348 described above. In some examples, the wind data generator 332 synchronizes and/or otherwise organizes the airborne drone-generated wind data 342 based on the timing information associated with each of the airflow direction data 344, the airflow speed data 346, and the location data 348. For example, first data and/or a first data point of the airborne drone-generated wind data 342 may include an airflow direction at a first time, an airflow speed at the first time, and a location of the drone 300 at the first time. Second data and/or a second data point of the airborne drone-generated wind data 342 may include an airflow direction at a second time, an airflow speed at the second time, and a location of the drone 300 at the second time. Airborne drone-generated wind data 342 generated and/or determined by the wind data generator 332 may be of any type, form and/or format, and may be stored in a computer-readable storage medium such as the example memory 318 of FIG. 3 described below.

In some examples, the controller 316 of FIG. 3 determines whether a request has been received at the drone 300 for the airborne drone-generated wind data 342. For example, the controller 316 may receive one or more signal(s), command(s) and or instruction(s) via the radio receiver 312 of FIG. 3. If the controller 316 determines that a request for the airborne drone-generated wind data 342 has been received, the controller 316 provides one or more control signal(s) and/or instruction(s) to the radio transmitter 310 of FIG. 3 instructing the radio transmitter 310 to transmit the airborne drone-generated wind data 342. In response to such signal(s) and/or instruction(s), the radio transmitter 310 may transmit the airborne drone-generated wind data 342.

In some examples, the controller 316 of FIG. 3 determines whether the airborne drone-generated wind data 342 of the drone 300 is to be transmitted. For example, the controller 316 may receive one or more signal(s), command(s) and or instruction(s) indicating that the airborne drone-generated wind data 342 is to be transmitted to another device (e.g., the server 152 of FIG. 1, the drone 102 of FIG. 1, etc.). In some examples, the timing of the transmission of the airborne drone-generated wind data 342 may be predetermined, scheduled, and/or otherwise defined by an application and/or program executing on the drone 300. In some examples, the timing of the transmission of the airborne drone-generated wind data 342 may be triggered by an event. In some examples, one or more user input(s) received via the input device(s) 326 of the user interface 314 of FIG. 3 may indicate that the airborne drone-generated wind data 342 is to be transmitted. If the controller 316 determines that the airborne drone-generated wind data 342 of the drone 300 is to be transmitted, the controller 316 provides one or more control signal(s) and/or instruction(s) to the radio transmitter 310 of FIG. 3 instructing the radio transmitter 310 to transmit the airborne drone-generated wind data 342. In response to such signal(s) and/or instruction(s), the radio transmitter 310 may transmit the airborne drone-generated wind data 342.

In some examples, the controller 316 of FIG. 3 determines whether airborne drone-generated wind data 342 for the drone 300 is to continue being collected and/or generated. For example, the controller 316 may receive one or more signal(s), command(s) and or instruction(s) indicating that airborne drone-generated wind data 342 for the drone 300 is not to continue being collected and/or generated. In some examples, the timing and/or duration of the collection and/or generation of the airborne drone-generated wind data 342 may be predetermined, scheduled, and/or otherwise defined by an application and/or program executing on the drone 300. In some examples, the timing and/or duration of the collection and/or generation of the airborne drone-generated wind data 342 may be triggered by an event. In some examples, one or more user input(s) received via the input device(s) 326 of the user interface 314 of FIG. 3 may indicate that airborne drone-generated wind data 342 for the drone 300 is not to continue being collected and/or generated. If the controller 316 determines that airborne drone-generated wind data 342 for the drone 300 is not to continue being collected and/or generated, the controller 316 may provide one or more control signal(s) and/or instruction(s) to one or more of the IMU 302, the GPS receiver 306, the altimeter 308 and/or the user interface 314 of FIG. 3 indicating that airborne drone-generated wind data 342 for the drone 300 is not to continue being collected and/or generated. In response to such signal(s) and/or instruction(s), one or more of the IMU 302, the GPS receiver 306, the altimeter 308 and/or the user interface 314 of FIG. 3 may cease sensing, measuring, collecting and/or detecting data associated with airborne drone-generated wind data 342 for the drone 300.

The example route manager 334 of FIG. 3 generates, manages and/or controls a route of the drone 300 based on data, information and/or one or more signal(s) obtained and/or accessed by the route manager 334 from one or more of the IMU 302, the GPS receiver 306, the altimeter 308, the radio receiver 312, the user interface 314, the controller 316, the memory 318, the launch manager 336, the power manager 338 and/or the shape manager 340 of FIG. 3, and/or based on data, information and/or one or more signal(s) provided by the route manager 334 to one or more of the radio transmitter 310, the user interface 314, the controller 316, the launch manager 336, the power manager 338 and/or the shape manager 340 of FIG. 3. In some examples, one or more of the functions and/or operations of the route manager 334 of FIG. 3 described herein may alternatively be performed by the route manager 419 of the server 152 of FIGS. 1 and 4.

Figure 4:
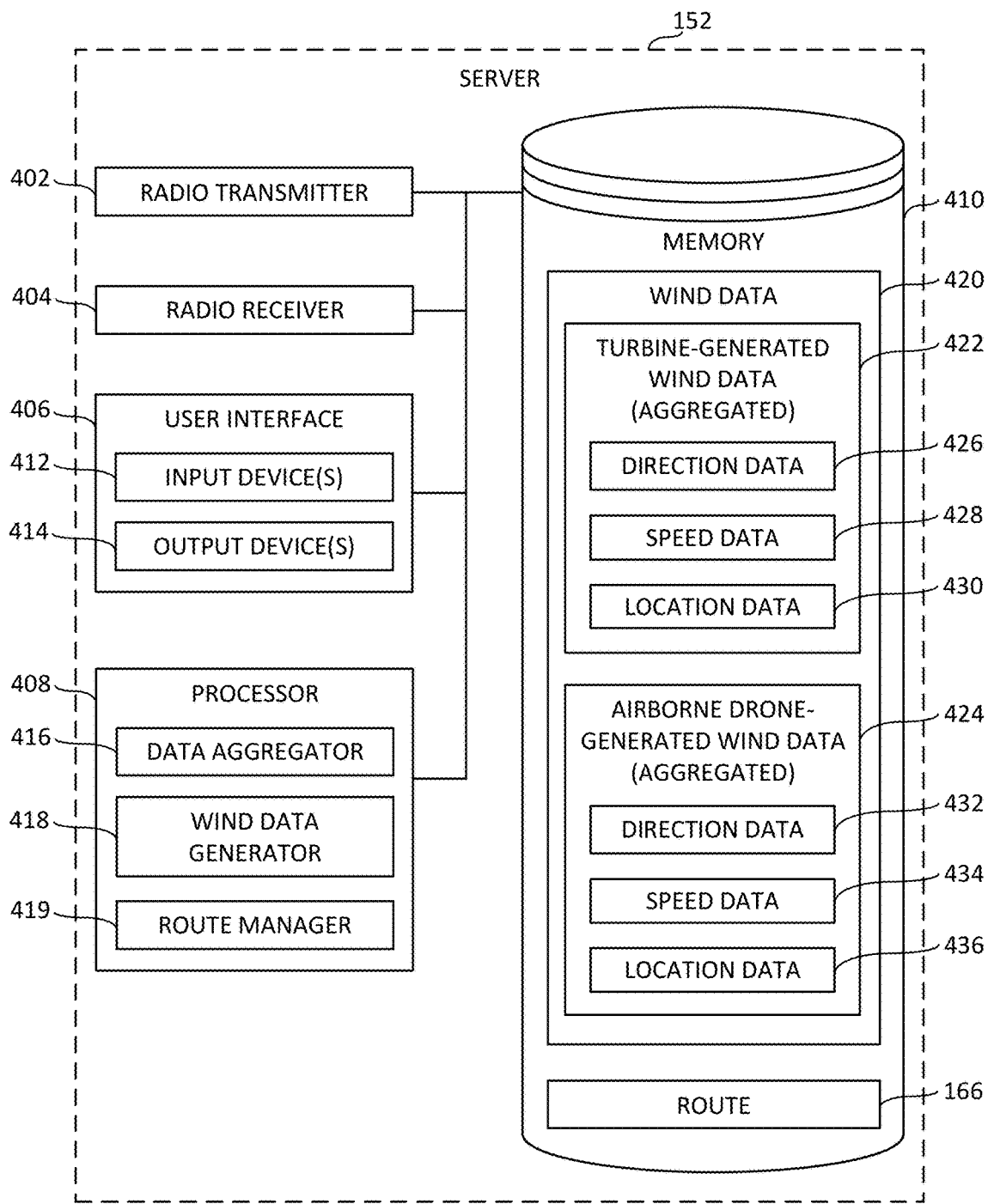
FIG. 4 is a block diagram of an example implementation of a server of FIG. 1 constructed in accordance with the teachings of this disclosure.

In some examples, the route manager 334 of FIG. 3 generates a route to be followed during a flight of the drone 300 based on the wind data received by the drone 300 (e.g., the wind data 420 including the aggregated turbine-generated wind data 422 and/or the aggregated airborne drone-generated wind data 424 of FIG. 4). For example, the route manager 334 of the drone 300 may generate the second route 166 of FIG. 1 to be followed by the drone 300 during the flight of the drone 300 through and/or over the area 104 from the launch location 106 to the destination location 108 of FIG. 1. In some examples, the route generated by the route manager 334 passes through a tailwind area within which the drone is to engage a tailwind during the flight. Data corresponding to and/or indicative of the tailwind and/or the tailwind area may be included within the wind data received by the drone 300. In some examples, the route generated by the route manager 334 passes through an updraft area within which the drone is to engage an updraft during the flight. Data corresponding to and/or indicative of the updraft and/or the updraft area may be included within the wind data received by the drone 300.

In some examples, the route manager 334 of FIG. 3 generates a route to be followed during a flight of the drone 300 to reduce energy consumed by the drone 300 during the flight. For example, as described above in connection with FIG. 1, while the first route 124 of FIG. 1 is the shortest and/or most direct (e.g., by distance) route via which the drone 102 may navigate from the launch location 106 to the destination location 108, the second route 166 is a more energy efficient (e.g., by energy consumption of the drone 102) route via which the drone 102 may navigate from the launch location 106 to the destination location 108. In this regard, while the drone 102 would encounter a headwind (e.g., the first airflow 128) when traveling along the first route 124, the drone 102 is able to avoid the headwind while also encountering the tailwinds (e.g., the second airflow 134 and the third airflow 140) and the updraft (e.g., the fourth airflow 146) when traveling along the second route 166. As a result of the tailwinds and updraft encountered by the drone 102 when traveling along the second route 166, the power source 320 of FIG. 3 expends and/or consumes less energy when the drone 102 travels between the launch location 106 and the destination location 108 relative to the energy that would be expended and/or consumed by the power source 320 of FIG. 3 when the drone 102 travels between the launch location 106 and the destination location 108 along the first route 124.

In some examples, the route manager 334 of FIG. 3 causes the drone 300 to follow the route generated by the route manager 334 during a flight of the drone 300. For example, the route manager 334 may provide one or more signal(s), command(s) and/or instruction(s) to one or more motor(s) of the drone 300 to cause the drone 300 to track, follow and/or otherwise move along the route generated by the route manager 334 during a flight of the drone 300.

In some examples, the route manager 334 of FIG. 3 determines whether to update the route being followed by the drone 300. For example, the route manager 334 may receive one or more signal(s), command(s) and or instruction(s) indicating that the route is to be updated (e.g., updated based on more current wind data). In some examples, the timing of an update request and/or instruction may be predetermined, scheduled, and/or otherwise defined by an application and/or program executing on the drone 300. In some examples, the timing of the update request and/or instruction may be triggered by an event. In some examples, one or more user input(s) received via the input device(s) 326 of the user interface 314 of FIG. 3 may indicate that the route being followed by the drone 300 is to be updated. If the route manager 334 determines that the route is to be updated, the route manager 334 provides one or more control signal(s) and/or instruction(s) to the radio transmitter 310 of FIG. 3 instructing the radio transmitter 310 to transmit one or more request(s) for wind data (e.g., a request for more current wind data).

In some examples, the route manager 334 of FIG. 3 determines whether the route being followed by the drone 300 has been completed. For example, based on location data obtained and/or accessed from the GPS receiver 306 of FIG. 3, the route manager 334 may determine whether a current position and/or location of the drone 300 coincides with (e.g., matches) a destination location of a route being followed by the drone 300 during a flight of the drone 300. The route being followed by the drone 300 has been completed when the current location of the drone 300 coincides with the destination location of the route. If the route manager 334 determines that the route has not been completed (e.g., that the destination location of the route has not been reached), the route manager 334 continues providing signal(s), command(s) and/or instruction(s) to one or more motor(s) of the drone 300 to cause the drone 300 to track, follow and/or otherwise move along the route.

The example launch manager 336 of FIG. 3 manages and/or controls a launch of the drone 300 via an example launch booster 350 of FIG. 3 based on data, information and/or one or more signal(s) obtained and/or accessed by the launch manager 336 from one or more of the IMU 302, the GPS receiver 306, the altimeter 308, the radio receiver 312, the user interface 314, the controller 316, the memory 318, the route manager 334, the power manager 338, the shape manager 340 and/or the launch booster 350 of FIG. 3, and/or based on data, information and/or one or more signal(s) provided by the launch manager 336 to one or more of the radio transmitter 310, the user interface 314, the controller 316, the route manager 334, the power manager 338, the shape manager 340 and/or the launch booster 350 of FIG. 3.

In some examples, launching the drone 300 via the launch booster 350 reduces the energy consumed by the drone 300 during the launch. In some examples, the drone 300 is in contact with and/or releasably coupled to the launch booster 350 prior to being launched. In some examples, the drone 300 separates and/or releases from the launch booster 350 during the launch. In some examples, the drone separates and/or releases from the launch booster 350 in response to the launch manager 336 detecting a specified altitude and/or time in relation to the launch of the drone 300. In some examples, the launch booster 350 is to increase at least one of a height of the drone 300 or a speed of the drone 300 during the launch. In some examples, the launch booster 350 is a catapult. In other examples, the launch booster 350 is a slingshot. In other examples, the launch booster 350 is a balloon. In other examples, the launch booster 350 is a vacuum chamber. In other examples, the launch booster 350 is a small form factor rocket or explosive device.

In some examples, the launch manager 336 of FIG. 3 provides one or more signal(s), command(s) and/or instruction(s) to a trigger and/or release mechanism of the launch booster 350 of FIG. 3 to initiate the launch via the launch booster 350. In some examples, the timing of the transmission of such signal(s), command(s) and/or instruction(s) may be predetermined and/or otherwise defined by an application and/or program executing on the drone 300. In other examples, the timing of the transmission of such signal(s), command(s) and/or instruction(s) may be associated with one or more user input(s) received via the input device(s) 326 of the user interface 314 of FIG. 3. In response to the signal(s), command(s) and/or instruction(s) provided by the launch manager 336, the launch booster 350 may launch the drone 300.

In some examples, the launch manager 336 of FIG. 3 determines whether an apex of a launch via the launch booster 350 of FIG. 3 has been reached. For example, the launch manager 336 may determine that an apex of a launch via the launch booster 350 has been reached based on altitude data sensed, measured and/or detected by the altimeter 308 of FIG. 3. In some examples, the apex of the launch coincides with an altitude specified by the launch manager 336.

In some examples, the launch manager 336 of FIG. 3 provides one or more signal(s), command(s) and/or instruction(s) to the power manager 338 in response to determining that the apex of the launch has been reached. In some examples, such signal(s), command(s) and/or instruction(s) may cause the power manager 338 to initiate and/or supply power from the power source 320 of FIG. 3 to one or more motor(s) of the drone 300.

In some examples, the launch manager 336 of FIG. 3 provides one or more signal(s), command(s) and/or instruction(s) to the shape manager 340 in response to determining that the apex of the launch has been reached. In some examples, such signal(s), command(s) and/or instruction(s) may cause the shape manager 340 to change the shape of the drone 300 from a projectile form factor to a self-propelled type form factor.

The example power manager 338 of FIG. 3 manages and/or controls the supply of power from the power source 320 of FIG. 3 to one or more motor(s) of the drone 300 of FIG. 3 based on data, information and/or one or more signal(s) obtained and/or accessed by the power manager 338 from one or more of the IMU 302, the GPS receiver 306, the altimeter 308, the radio receiver 312, the user interface 314, the controller 316, the memory 318, the route manager 334, the launch manager 336 and/or the shape manager 340 of FIG. 3, and/or based on data, information and/or one or more signal(s) provided by the power manager 338 to one or more of the radio transmitter 310, the user interface 314, the controller 316, the route manager 334, the launch manager 336, the shape manager 340 and/or one or more motor(s) of the drone 300 of FIG. 3.

In some examples, the power manager 338 of FIG. 3 determines whether to provide and/or supply power from the power source 320 of FIG. 3 to one or more motor(s) of the drone 300 in response to the launch manager 336 of FIG. 3 determining that an apex of the launch has been reached. For example, the power manager 338 may receive one or more signal(s), command(s) and or instruction(s) indicating that power is to be supplied from the power source 320 to one or more motor(s) of the drone 300 in response to the launch manager 336 determining that an apex of the launch has been reached.

In some examples, the power manager 338 provides and/or supplies power from the power source 320 of FIG. 3 to one or more motor(s) of the drone 300. For example, the power manager 338 may provide one or more signal(s), command(s) and/or instruction(s) to the power source 320 of FIG. 3 and/or to one or more motor(s) of the drone 300 to cause the power source 320 to provide and/or supply power to the one or more motor(s) of the drone 300. The power manager 338 may simply close a switch to create a closed circuit between the power supply 320 and the motor, and/or a regulator that controls the speed of the motor.

The example shape manager 340 of FIG. 3 manages and/or controls the shape of the drone 300 of FIG. 3 based on data, information and/or one or more signal(s) obtained and/or accessed by the shape manager 340 from one or more of the IMU 302, the GPS receiver 306, the altimeter 308, the radio receiver 312, the user interface 314, the controller 316, the memory 318, the route manager 334, the launch manager 336, the power manager 338 and/or the launch booster 350 of FIG. 3, and/or based on data, information and/or one or more signal(s) provided by the shape manager 340 to one or more of the radio transmitter 310, the user interface 314, the controller 316, the route manager 334, the launch manager 336, the power manager 338 and/or one or more shape adjustable component(s) of the drone 300 of FIG. 3.

In some examples, the shape manager 340 of FIG. 3 determines whether to change a shape of one or more shape adjustable component(s) (e.g., an extendable and/or transformable arm) of the drone 300 in response to the launch manager 336 of FIG. 3 determining that an apex of the launch has been reached. For example, the shape manager 340 may receive one or more signal(s), command(s) and or instruction(s) indicating that a shape of one or more shape adjustable component(s) of the drone 300 is/are to be changed.

In some examples, the shape manager 340 changes the shape of one or more shape adjustable component(s) of the drone 300. For example, the shape manager 340 may provide one or more signal(s), command(s) and/or instruction(s) to one or more shape adjustable component(s) of the drone 300 to cause the shape adjustable component(s) to change shape, extend, retract, and/or move. This may be effected by, for example, actuating one or more motor(s) to move one or more component(s) of the drone 300.

The example memory 318 of FIG. 3 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 318 may be stored in any file and/or data structure format, organization scheme, and/or arrangement.

In some examples, the memory 318 of FIG. 3 stores airflow direction data 344 sensed, measured and/or detected by the IMU 302. In some examples, the memory 318 stores airflow speed data 346 sensed, measured and/or detected by the IMU 302. In some examples, the memory 318 stores location data 348 collected, received, identified and/or derived by the GPS receiver 306. In some examples, the memory 318 stores altitude data sensed, measured and/or detected by the altimeter 308. In some examples, the memory 318 stores airborne drone-generated wind data 342 generated by the wind data generator 332 and/or to be transmitted by the radio transmitter 310 of FIG. 3. In some examples, the memory 318 stores wind data 420 accessed, obtained and/or received from the server 152 of FIG. 4. In some examples, the wind data 420 includes the aggregated turbine-generated wind data 422 of FIG. 4. In some examples, the wind data 420 includes the aggregated airborne drone-generated wind data 424 of FIG. 4. In some examples, the memory 318 stores a route (e.g., the second route 166) generated by the route manager 334 of FIG. 3. The memory 318 is accessible to one or more of the example IMU 302, the example GPS receiver 306, the example altimeter 308, the example radio transmitter 310, the example radio receiver 312, the example user interface 314, the example controller 316, the example data aggregator 330, the example wind data generator 332, the example route manager 334, the example launch manager 336, the example power manager 338 and/or the example shape manager 340 of FIG. 3, and/or, more generally, to the drone 300 of FIG. 3.

The example power source 320 of FIG. 3 stores energy. In some examples, the power source 320 provides and/or supplies power to the IMU 302, the GPS receiver 306, the altimeter 308, the radio transmitter 310, the radio receiver 312, the user interface 314, the controller 316, the memory 318, the data aggregator 330, the wind data generator 332, the route manager 334, the launch manager 336, the power manager 338 and/or the shape manager 340, and/or, more generally, the drone 300 of FIG. 3. In some examples, the power source 320 may additionally and/or alternatively provide and/or supply power to one or more motor(s) of the drone 300 coupled to one or more propeller(s) and/or rotor(s) of the drone 300. In some examples, power provided by the power source 320 to the motor(s), propeller(s) and/or rotor(s) of the drone 300 enables flight of the drone 300. In some examples, the power source 320 may be a battery. As power is provided by the power source 320, the energy stored by the power source 320 is consumed.

While an example manner of implementing a drone is illustrated in FIG. 3, one or more of the elements, processes and/or devices illustrated in FIG. 3 may be combined, divided, re-arranged, omitted, eliminated and/or implemented in any other way. Further, the example IMU 302, the example GPS receiver 306, the example altimeter 308, the example radio transmitter 310, the example radio receiver 312, the example user interface 314, the example controller 316, the example memory 318, the example power source 320, the example data aggregator 330, the example wind data generator 332, the example route manager 334, the example launch manager 336, the example power manager 338 and/or the example shape manager 340 of FIG. 3 may be implemented by hardware, software, firmware and/or any combination of hardware, software and/or firmware. Thus, for example, any of the example IMU 302, the example GPS receiver 306, the example altimeter 308, the example radio transmitter 310, the example radio receiver 312, the example user interface 314, the example controller 316, the example memory 318, the example power source 320, the example data aggregator 330, the example wind data generator 332, the example route manager 334, the example launch manager 336, the example power manager 338 and/or the example shape manager 340 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example IMU 302, the example GPS receiver 306, the example altimeter 308, the example radio transmitter 310, the example radio receiver 312, the example user interface 314, the example controller 316, the example memory 318, the example power source 320, the example data aggregator 330, the example wind data generator 332, the example route manager 334, the example launch manager 336, the example power manager 338 and/or the example shape manager 340 is/are hereby expressly defined to include a tangible computer-readable storage device or storage disk such as a memory, a digital versatile disk (DVD), a compact disk (CD), a Blu-ray disk, etc. storing the software and/or firmware. Further still, the example drone 300 of FIG. 3 may include one or more elements, processes and/or devices in addition to, or instead of, those illustrated in FIG. 3, and/or may include more than one of any or all of the illustrated elements, processes and devices.

FIG. 4 is a block diagram of an example implementation of the server 152 of FIG. 1. In the illustrated example of FIG. 4, the server 152 includes an example radio transmitter 402, an example radio receiver 404, an example user interface 406, an example processor 408, and an example memory 410. However, other example implementations of the server 152 may include fewer or additional structures.

The example radio transmitter 402 of FIG. 4 transmits data and/or one or more radio frequency signal(s) to other devices (e.g., the drone 102 of FIG. 1, the first, second, third and/or fourth turbines 126, 132, 138, 144 of FIG. 1, the first, second, third and/or fourth airborne drones 158, 160, 162, 164 of FIG. 1, etc.). In some examples, the data and/or signal(s) transmitted by the radio transmitter 402 is/are communicated over a network (e.g., a cellular network and/or a wireless local area network) via the example cellular base station 154 and/or via the example wireless access point 156 of FIG. 1. In some examples, the radio transmitter 402 may transmit example wind data 420 including the example aggregated turbine-generated wind data 422 and/or the example aggregated airborne drone-generated wind data 424 described below. In some examples, the radio transmitter 402 may transmit the wind data 420 in response to one or more request(s) for the wind data received at the server 152 from another device (e.g., a request from the drone 102 of FIG. 1, etc.). In some examples, the radio transmitter 402 may transmit a route (e.g., the second route 166 of FIG. 1) for a flight of a drone, the route being generated based on the example wind data 420 including the example aggregated turbine-generated wind data 422 and/or the example aggregated airborne drone-generated wind data 424 described below. In some examples, the radio transmitter 402 may transmit the route in response to one or more request(s) for the route received at the server 152 from another device (e.g., a request from the drone 102 of FIG. 1, etc.). Data corresponding to the signal(s) to be transmitted by the radio transmitter 402 may be of any type, form and/or format, and may be stored in a computer-readable storage medium such as the example memory 410 of FIG. 4 described below.

The example radio receiver 404 of FIG. 4 collects, acquires and/or receives data and/or one or more radio frequency signal(s) from other devices (e.g., the drone 102 of FIG. 1, the first, second, third and/or fourth turbines 126, 132, 138, 144 of FIG. 1, the first, second, third and/or fourth airborne drones 158, 160, 162, 164 of FIG. 1, etc.). In some examples, the data and/or signal(s) received by the radio receiver 404 is/are communicated over a network (e.g., a cellular network and/or a wireless local area network) via the example cellular base station 154 and/or via the example wireless access point 156 of FIG. 1. In some examples, the radio receiver 404 may receive data and/or signal(s) corresponding to turbine-generated wind data (e.g., the turbine-generated wind data 228 of FIG. 2) from one or more of the first, second, third and/or fourth turbines 126, 132, 138, 144 of FIG. 1. In some examples, the radio receiver 404 may receive data and/or signal(s) corresponding to airborne drone-generated wind data (e.g., the airborne drone-generated wind data 342 of FIG. 3) from one or more of the first, second, third and/or fourth airborne drones 158, 160, 162, 164 of FIG. 1. In some examples, the radio receiver 404 may receive data and/or signal(s) corresponding to one or more request(s) for the wind data 420. The one or more request(s) for the wind data 420 may be transmitted from another device (e.g., a request from the drone 102 of FIG. 1, etc.). In some examples, the radio receiver 404 may receive data and/or signal(s) corresponding to one or more request(s) for a route of a flight of a drone, the route to be based on the wind data 420. The one or more request(s) for the route may be transmitted from another device (e.g., a request from the drone 102 of FIG. 1, etc.). Data carried by, identified and/or derived from the signal(s) collected and/or received by the radio receiver 404 may be of any type, form and/or format, and may be stored in a computer-readable storage medium such as the example memory 410 of FIG. 4 described below.

The example user interface 406 of FIG. 4 facilitates interactions and/or communications between an end user and the server 152. The user interface 406 includes one or more input device(s) 412 via which the user may input information and/or data to the server 152. For example, the user interface 406 may be a button, a switch, a microphone, and/or a touchscreen that enable(s) the user to convey data and/or commands to the example processor 408 of FIG. 4 described below, and/or, more generally, to the server 152 of FIGS. 1 and/or 4. The user interface 406 of FIG. 4 also includes one or more output device(s) 414 via which the user interface 406 presents information and/or data in visual and/or audible form to the user. For example, the user interface 406 may include a light emitting diode, a touchscreen, and/or a liquid crystal display for presenting visual information, and/or a speaker for presenting audible information. Data and/or information that is presented and/or received via the user interface 406 may be of any type, form and/or format, and may be stored in a computer-readable storage medium such as the example memory 410 of FIG. 4 described below.

The example processor 408 of FIG. 4 may be implemented by a semiconductor device such as a microprocessor, controller or microcontroller. The processor 408 manages and/or controls the operation of the server 152. The example processor 408 of FIG. 4 includes an example data aggregator 416, an example wind data generator 418 and an example route manager 419. In some examples, the processor 408 manages and/or controls the operation of the server 152 based on data, information and/or one or more signal(s) obtained and/or accessed by the processor 408 from one or more of the radio receiver 404, the user interface 406, the memory 410, the data aggregator 416, the wind data generator 418 and/or the route manager 419 of FIG. 4, and/or based on data, information and/or one or more signal(s) provided by the processor 408 to one or more of the radio transmitter 402, the user interface 406, the data aggregator 416, the wind data generator 418 and/or the route manager 419 of FIG. 4.

In some examples, the data aggregator 416 of FIG. 4 determines whether turbine-generated wind data has been received at the server 152. For example, the data aggregator 416 may receive one or more signal(s), command(s) and or instruction(s) via the radio receiver 404 of FIG. 4 indicating that the turbine-generated wind data 228 has been received from the turbine 200 of FIG. 2 (e.g., from one or more of the first, second, third and/or fourth turbines 126, 132, 138, 144 of FIG. 1). If the data aggregator 416 determines that turbine-generated wind data has been received from one or more turbine(s), the data aggregator 416 generates example aggregated turbine-generated wind data 422 by combining and/or aggregating the turbine-generated wind data received from various ones of the first, second, third and/or fourth turbine(s) 126, 132, 138, 144. In some examples, the aggregated turbine-generated wind data 422 may include example aggregated airflow direction data 426, example aggregated airflow speed data 428 and/or example aggregated location data 430.

In some examples, the data aggregator 416 of FIG. 4 determines whether airborne drone-generated wind data has been received at the server 152. For example, the data aggregator 416 may receive one or more signal(s), command(s) and or instruction(s) via the radio receiver 404 of FIG. 4 indicating that the airborne drone-generated wind data 342 has been received from the drone 300 of FIG. 3 (e.g., from one or more of the first, second, third and/or fourth airborne drones 158, 160, 162, 164 of FIG. 1). If the data aggregator 416 determines that airborne drone-generated wind data has been received from one or more airborne drone(s), the data aggregator 416 generates example aggregated airborne drone-generated wind data 424 by combining and/or aggregating the airborne drone-generated wind data received from various ones of the first, second, third and/or fourth airborne drone(s) 158, 160, 162, 164. In some examples, the aggregated airborne drone-generated wind data 424 may include example aggregated airflow direction data 432, example aggregated airflow speed data 434 and/or example aggregated location data 436.

In some examples, the wind data generator 418 of FIG. 4 generates example wind data 420 based on the aggregated turbine-generated wind data 422 and/or the aggregated airborne drone-generated wind data 424. In some examples, the wind data generator 418 generates the wind data 420 by combining and/or aggregating the aggregated turbine-generated wind data 422 and the aggregated airborne drone-generated wind data 424. In such examples, the wind data 420 may include the aggregated turbine-generated wind data 422 including the aggregated airflow direction data 426, the aggregated airflow speed data 428, and the aggregated location data 430 associated therewith, and may further include the aggregated airborne drone-generated wind data 424 including the aggregated airflow direction data 432, the aggregated airflow speed data 434, and the aggregated location data 436 associated therewith.

In some examples, the processor 408 of FIG. 4 determines whether a request has been received at the server 152 for the wind data 420. For example, the processor 408 may receive one or more signal(s), command(s) and or instruction(s) via the radio receiver 404 of FIG. 4. If the processor 408 determines that a request for the wind data 420 has been received, the processor 408 provides one or more control signal(s) and/or instruction(s) to the radio transmitter 402 of FIG. 4 instructing the radio transmitter 402 to transmit the wind data 420. In response to such signal(s) and/or instruction(s), the radio transmitter 402 may transmit the wind data 420.

In some examples, the processor 408 of FIG. 4 determines whether the wind data 420 generated at the server 152 is to be transmitted. For example, the processor 408 may receive one or more signal(s), command(s) and or instruction(s) indicating that the wind data 420 is to be transmitted to another device (e.g., the drone 102 of FIG. 1, etc.). In some examples, the timing of the transmission of the wind data 420 may be predetermined, scheduled, and/or otherwise defined by an application and/or program executing on the server 152. In some examples, the timing of the transmission of the wind data 420 may be triggered by an event. In some examples, one or more user input(s) received via the input device(s) 412 of the user interface 406 of FIG. 4 may indicate that the wind data 420 is to be transmitted. If the processor 408 determines that the wind data 420 is to be transmitted, the processor 408 provides one or more control signal(s) and/or instruction(s) to the radio transmitter 402 of FIG. 4 instructing the radio transmitter 402 to transmit the wind data 420. In response to such signal(s) and/or instruction(s), the radio transmitter 402 may transmit the wind data 420.

In some examples, the processor 408 of FIG. 4 determines whether wind data 420 is to continue being generated. For example, the processor 408 may receive one or more signal(s), command(s) and or instruction(s) indicating that wind data 420 is not to continue being generated at the server 152. In some examples, the timing and/or duration of the generation of the wind data 420 may be predetermined, scheduled, and/or otherwise defined by an application and/or program executing on the server 152. In some examples, the timing and/or duration of the generation of the wind data 420 may be triggered by an event. In some examples, one or more user input(s) received via the input device(s) 412 of the user interface 406 of FIG. 4 may indicate that wind data 420 is not to continue being generated. If the processor 408 determines that wind data 420 is not to continue being generated, the wind data generator 418 may cease generating the wind data 420.

In some examples, the route manager 419 of FIG. 4 generates a route to be followed during a flight of the drone (e.g., the drone 300 of FIG. 3) based on the wind data generated by the wind data generator 418 of FIG. 4 (e.g., the wind data 420 including the aggregated turbine-generated wind data 422 and/or the aggregated airborne drone-generated wind data 424 of FIG. 4). In some examples, the route manager 419 generates the route based in part on launch location and a destination location identified by a request for the route received from a drone (e.g., the drone 300 of FIG. 3). For example, the route manager 419 may generate the second route 166 of FIG. 1 to be followed by the drone 300 of FIG. 3 during the flight of the drone 300 through and/or over the area 104 from the launch location 106 to the destination location 108 of FIG. 1. Information and/or data identifying the launch location 106 and the destination location 108 of the flight of the drone may be included with a request for generation of the route received at the server 152. In some examples, the route generated by the route manager 419 passes through a tailwind area within which the drone is to engage a tailwind during the flight. In some examples, the route generated by the route manager 334 passes through an updraft area within which the drone is to engage an updraft during the flight.

In some examples, the route manager 419 of FIG. 4 generates a route to be followed during a flight of the drone (e.g., the drone 300 of FIG. 3) to reduce energy consumed by the drone during the flight. For example, as described above in connection with FIG. 1, while the first route 124 of FIG. 1 is the shortest and/or most direct (e.g., by distance) route via which the drone 102 may navigate from the launch location 106 to the destination location 108, the second route 166 is a more energy efficient (e.g., by energy consumption of the drone 102) route via which the drone 102 may navigate from the launch location 106 to the destination location 108. In this regard, while the drone 102 would encounter a headwind (e.g., the first airflow 128) when traveling along the first route 124, the drone 102 is able to avoid the headwind while also encountering the tailwinds (e.g., the second airflow 134 and the third airflow 140) and the updraft (e.g., the fourth airflow 146) when traveling along the second route 166. As a result of the tailwinds and updraft encountered by the drone 102 when traveling along the second route 166, the power source 320 of FIG. 3 expends and/or consumes less energy when the drone 102 travels between the launch location 106 and the destination location 108 relative to the energy that would be expended and/or consumed by the power source 320 of FIG. 3 when the drone 102 travels between the launch location 106 and the destination location 108 along the first route 124.

In some examples, the processor 408 of FIG. 4 determines whether a request has been received at the server 152 for the route. For example, the processor 408 may receive one or more signal(s), command(s) and or instruction(s) via the radio receiver 404 of FIG. 4. If the processor 408 determines that a request for the route has been received, the processor 408 provides one or more control signal(s) and/or instruction(s) to the route manager 419 of FIG. 4 to generate the route and one or more control signal(s) and/or instruction(s) to the radio transmitter 402 of FIG. 4 instructing the radio transmitter 402 to transmit the generated route. In response to such signal(s) and/or instruction(s), route manager 419 may generate the route, and the radio transmitter 402 may transmit the generated route.

In some examples, the processor 408 of FIG. 4 determines whether the route generated at the server 152 is to be transmitted. For example, the processor 408 may receive one or more signal(s), command(s) and or instruction(s) indicating that the route is to be transmitted to another device (e.g., the drone 102 of FIG. 1, etc.). In some examples, the timing of the transmission of the route may be predetermined, scheduled, and/or otherwise defined by an application and/or program executing on the server 152. In some examples, the timing of the transmission of the route may be triggered by an event. In some examples, one or more user input(s) received via the input device(s) 412 of the user interface 406 of FIG. 4 may indicate that the route is to be transmitted. If the processor 408 determines that the route is to be transmitted, the processor 408 provides one or more control signal(s) and/or instruction(s) to the radio transmitter 402 of FIG. 4 instructing the radio transmitter 402 to transmit the route. In response to such signal(s) and/or instruction(s), the radio transmitter 402 may transmit the route.

In some examples, the processor 408 of FIG. 4 determines whether routes are to continue being generated. For example, the processor 408 may receive one or more signal(s), command(s) and or instruction(s) indicating that routes are not to continue being generated at the server 152. In some examples, the timing and/or duration of the generation of the route may be predetermined, scheduled, and/or otherwise defined by an application and/or program executing on the server 152. In some examples, the timing and/or duration of the generation of the route may be triggered by an event. In some examples, one or more user input(s) received via the input device(s) 412 of the user interface 406 of FIG. 4 may indicate that routes are not to continue being generated. If the processor 408 determines that routes are not to continue being generated, the route manager 419 may cease generating routes.

The example memory 410 of FIG. 4 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 410 may be stored in any file and/or data structure format, organization scheme, and/or arrangement. In some examples, the memory 410 stores turbine-generated wind data (e.g., the turbine-generated wind data 228 of FIG. 2) received by the radio receiver 404 from one or more of the first, second, third and/or fourth turbines 126, 132, 138, 144 of FIG. 1. In some examples, the memory 410 stores airborne drone-generated wind data (e.g., the airborne drone-generated wind data 342 of FIG. 3) received by the radio receiver 404 from one or more of the first, second, third and/or fourth airborne drones 158, 160, 162, 164 of FIG. 1. In some examples, the memory 410 stores the wind data 420 generated by the wind data generator 418 of the server 152. In some examples, the wind data 420 stored in the memory 410 includes the aggregated turbine-generated wind data 422 described above. In some examples, the wind data 420 stored in the memory 410 includes the aggregated airborne drone-generated wind data 422 described above. In some examples, the memory 410 stores a route (e.g., the second route 166) generated by the route manager 419 of FIG. 4. The memory 410 is accessible to the example radio transmitter 402, the example radio receiver 404, the example user interface 406, and the example processor 408 of FIG. 4, and/or, more generally, to the example server 152 of FIGS. 1 and/or 4.

While an example manner of implementing the example server 152 is illustrated in FIG. 4, one or more of the elements, processes and/or devices illustrated in FIG. 4 may be combined, divided, re-arranged, omitted, eliminated and/or implemented in any other way. Further, the example radio transmitter 402, the example radio receiver 404, the example user interface 406, the example processor 408, the example memory 410, the example data aggregator 416, the example wind data generator 418 and/or the example route manager 419 of FIG. 4 may be implemented by hardware, software, firmware and/or any combination of hardware, software and/or firmware. Thus, for example, any of the example radio transmitter 402, the example radio receiver 404, the example user interface 406, the example processor 408, the example memory 410, the example data aggregator 416, the example wind data generator 418 and/or the example route manager 419 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example radio transmitter 402, the example radio receiver 404, the example user interface 406, the example processor 408, the example memory 410, the example data aggregator 416, the example wind data generator 418 and/or the example route manager 419 is/are hereby expressly defined to include a tangible computer readable storage device or storage disk such as a memory, a digital versatile disk (DVD), a compact disk (CD), a Blu-ray disk, etc. storing the software and/or firmware. Further still, the example server 152 of FIG. 4 may include one or more elements, processes and/or devices in addition to, or instead of, those illustrated in FIG. 4, and/or may include more than one of any or all of the illustrated elements, processes and devices.

Figure 5:
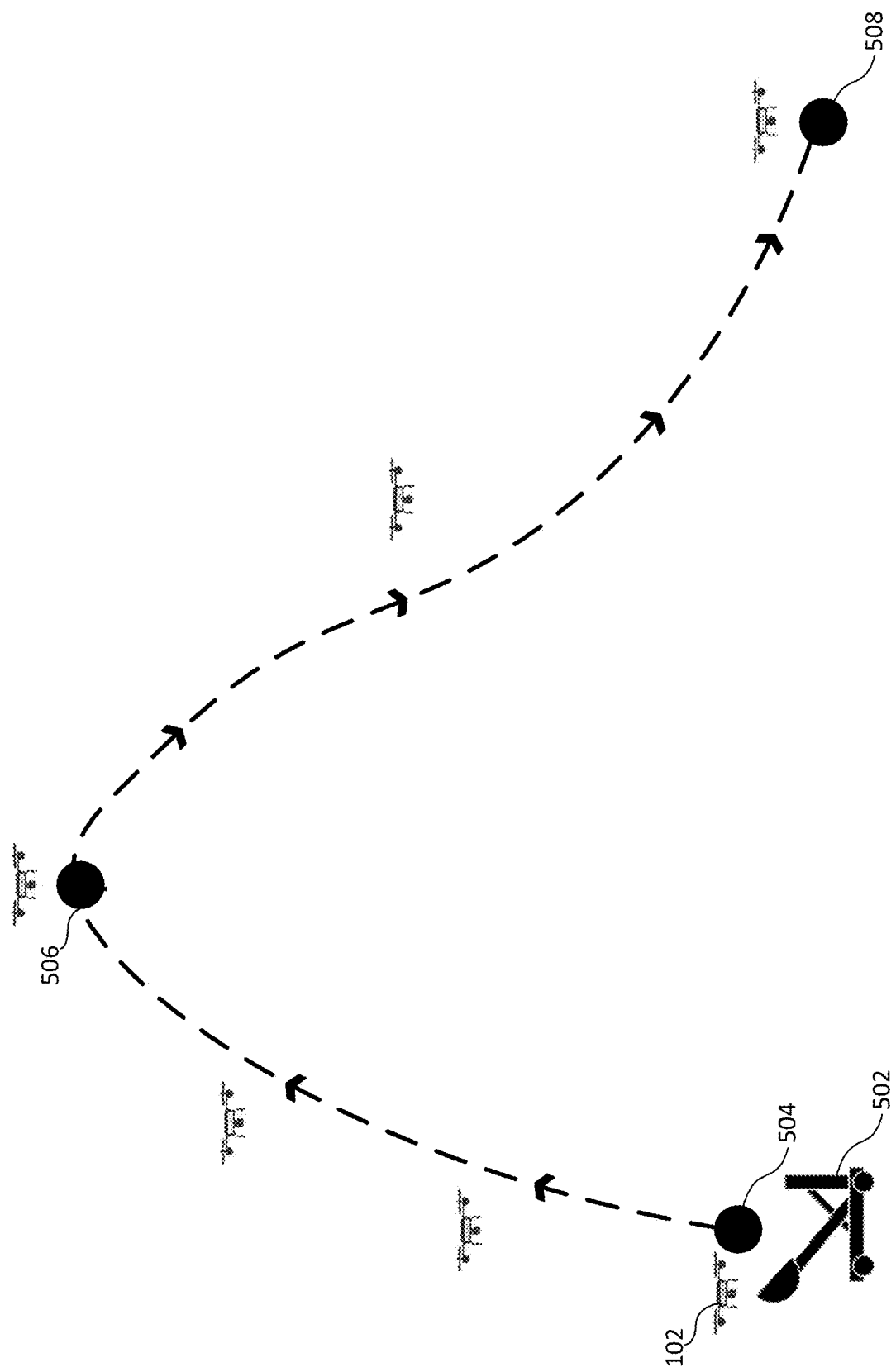
FIG. 5 illustrates the example drone of FIGS. 1 and/or 3 being launched by a first example launch booster.

FIG. 5 illustrates the example drone 102 of FIGS. 1 and/or 3 being launched by a first example launch booster 502 corresponding to the example launch booster 350 of FIG. 3. In the illustrated example of FIG. 5, the first launch booster 502 is a catapult. In the illustrated example of FIG. 5, the drone 102 is in contact with and/or releasably coupled to the first launch booster 502 prior to being launched. The drone 102 separates and/or releases from the first launch booster 502 during an initial portion of the launch. For example, in response to the first launch booster 502 being triggered and/or otherwise activated, the first launch booster 502 launches the drone 102 upward (e.g., skyward) from an example launch location 504 in a direction of a desired flight path. As a result of being launched, the drone 102 is propelled upward toward an example launch apex 506. In some examples, the launch manager 336 of FIG. 3 determines that the launch apex 506 of FIG. 5 has been reached and/or detected by the drone 102. In some examples, the power manager 338 of FIG. 3 provides power to one or more motor(s) of the drone 102 in response to the detection of the launch apex 506 of FIG. 5. In some examples, the shape manager 340 of FIG. 3 changes a shape of the drone 102 in response to the detection of the launch apex 506 of FIG. 5. In the illustrated example of FIG. 5, the drone 102 travels (e.g., down glides with and/or without power) toward an example destination location 508 once the launch apex 506 of FIG. 5 has been reached and/or detected.

Figure 6:
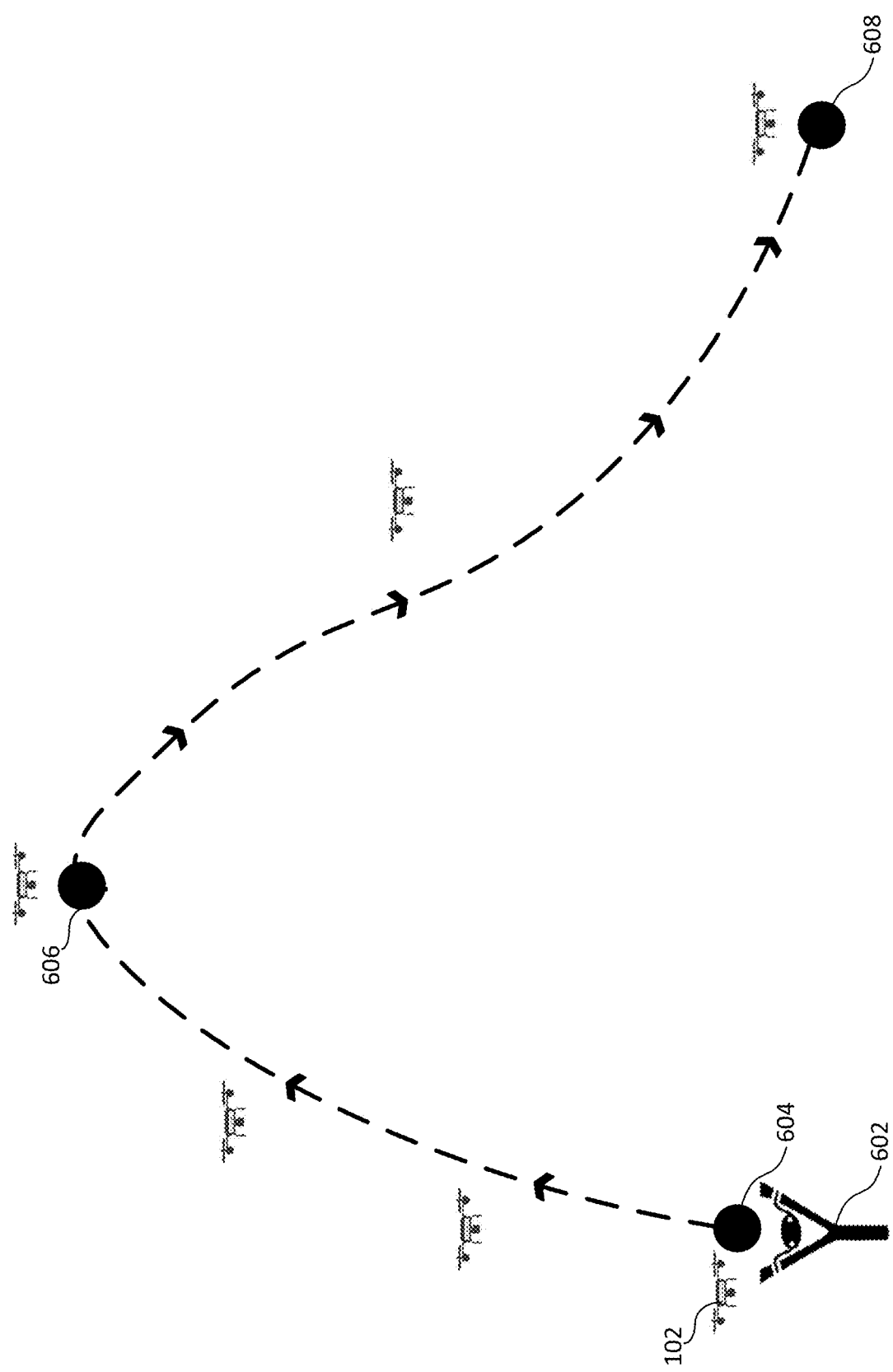
FIG. 6 illustrates the example drone of FIGS. 1 and/or 3 being launched by a second example launch booster.

FIG. 6 illustrates the example drone 102 of FIGS. 1 and/or 3 being launched by a second example launch booster 602 corresponding to the example launch booster 350 of FIG. 3. In the illustrated example of FIG. 6, the second launch booster 602 is a slingshot. In the illustrated example of FIG. 6, the drone 102 is in contact with and/or releasably coupled to the second launch booster 602 prior to being launched. The drone 102 separates and/or releases from the second launch booster 602 during an initial portion of the launch. For example, in response to the second launch booster 602 being triggered and/or otherwise activated, the second launch booster 602 launches the drone 102 upward (e.g., skyward) from an example launch location 604 in a direction of a desired flight path. As a result of being launched, the drone 102 is propelled upward toward an example launch apex 606. In some examples, the launch manager 336 of FIG. 3 determines that the launch apex 606 of FIG. 6 has been reached and/or detected by the drone 102. In some examples, the power manager 338 of FIG. 3 provides power to one or more motor(s) of the drone 102 in response to the detection of the launch apex 606 of FIG. 6. In some examples, the shape manager 340 of FIG. 3 changes a shape of the drone 102 in response to the detection of the launch apex 606 of FIG. 6. In the illustrated example of FIG. 6, the drone 102 travels (e.g., down glides with and/or without power) toward an example destination location 608 once the launch apex 606 of FIG. 6 has been reached and/or detected.

Figure 7:
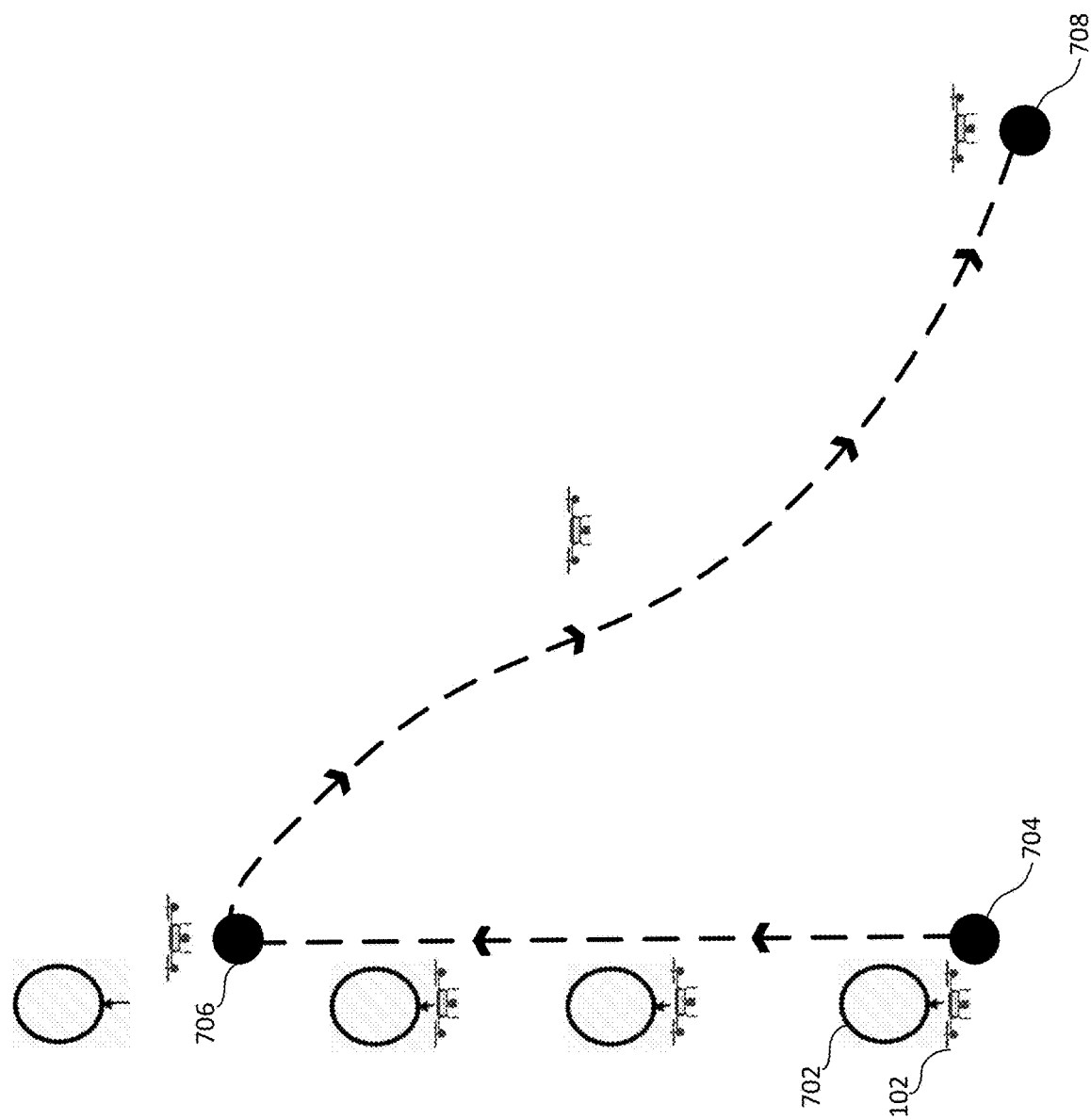
FIG. 7 illustrates the example drone of FIGS. 1 and/or 3 being launched by a third example launch booster.

FIG. 7 illustrates the example drone 102 of FIGS. 1 and/or 3 being launched by a third example launch booster 702 corresponding to the example launch booster 350 of FIG. 3. In the illustrated example of FIG. 7, the third launch booster 702 is a balloon. In the illustrated example of FIG. 7, the drone 102 is releasably coupled to the third launch booster 702 prior to being launched. The drone 102 separates and/or releases from the third launch booster 702 at a specified time and/or altitude during the launch in response to one or more instruction(s) received from the launch manager 336 of FIG. 3. For example, the third launch booster 702 launches the drone 102 upward (e.g., skyward) from an example launch location 704. As a result of being launched, the drone 102 is propelled upward toward an example launch apex 706. In some examples, the launch apex 706 coincides with an altitude at which the launch manager 336 of FIG. 3 determines that the drone 102 is to separate and/or release from the third launch booster 702. In some examples, the launch manager 336 of FIG. 3 determines that the launch apex 706 of FIG. 7 has been reached and/or detected by the drone 102. In some examples, the power manager 338 of FIG. 3 provides power to one or more motor(s) of the drone 102 in response to the detection of the launch apex 706 of FIG. 7. In some examples, the shape manager 340 of FIG. 3 changes a shape of the drone 102 in response to the detection of the launch apex 706 of FIG. 7. In the illustrated example of FIG. 7, the drone 102 travels (e.g., down glides with and/or without power) toward an example destination location 708 once the launch apex 706 of FIG. 7 has been reached and/or detected.

Figure 8:
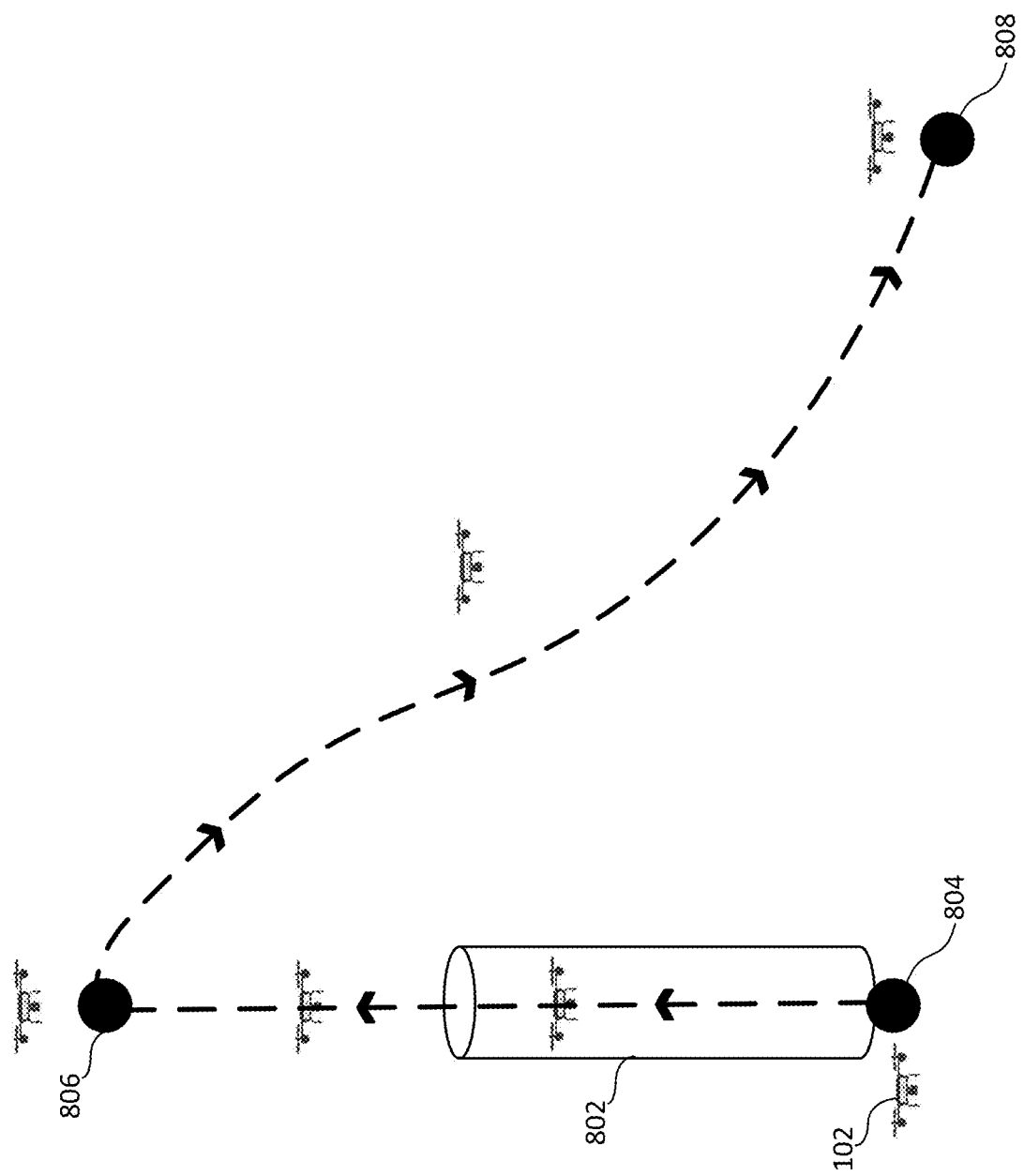
FIG. 8 illustrates the example drone of FIGS. 1 and/or 3 being launched by a fourth example launch booster.

FIG. 8 illustrates the example drone 102 of FIGS. 1 and/or 3 being launched by a fourth example launch booster 802 corresponding to the example launch booster 350 of FIG. 3. In the illustrated example of FIG. 8, the fourth launch booster 802 is a vacuum chamber. In the illustrated example of FIG. 8, the drone 102 engages the fourth launch booster 802 in conjunction with being launched from an example launch location 804. As the drone 102 enters the lower end of the fourth launch booster 802 proximate the launch location 804, the vacuum forces generated by the fourth launch booster 802 propel and/or launch the drone 102 through the fourth launch booster 802 and upward (e.g., skyward) from an upper end of the fourth launch booster 802. As a result of being launched, the drone 102 is propelled upward toward an example launch apex 806. In some examples, the launch manager 336 of FIG. 3 determines that the launch apex 806 of FIG. 8 has been reached and/or detected by the drone 102. In some examples, the power manager 338 of FIG. 3 provides power to one or more motor(s) of the drone 102 in response to the detection of the launch apex 806 of FIG. 8. In some examples, the shape manager 340 of FIG. 3 changes a shape of the drone 102 in response to the detection of the launch apex 806 of FIG. 8. In the illustrated example of FIG. 8, the drone 102 travels (e.g., down glides with and/or without power) toward an example destination location 808 once the launch apex 806 of FIG. 8 has been reached and/or detected.

Figure 9B:
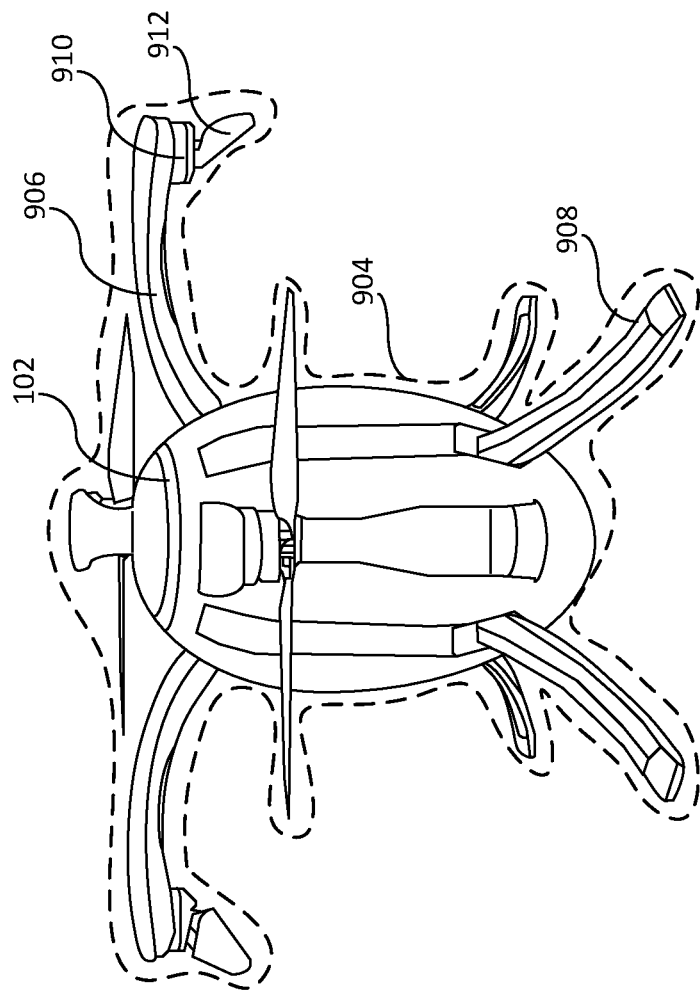
FIG. 9B illustrates the example drone of FIGS. 1, 3 and/or 9A in a second example configuration.
Figure 9A:
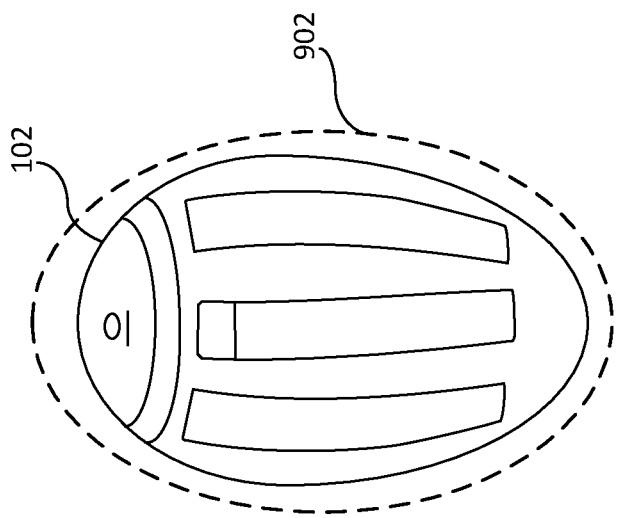
FIG. 9A illustrates the example drone of FIGS. 1 and/or 3 in a first example configuration.

FIG. 9A illustrates the example drone 102 of FIGS. 1 and/or 3 in a first example configuration 902. FIG. 9B illustrates the example drone 102 of FIGS. 1, 3 and/or 9A in a second example configuration 904. In the illustrated example of FIG. 9A, the first configuration 902 of the drone 102 has an example elliptical and/or egg-like shape. In the illustrated example of FIG. 9B, the second configuration 904 of the drone 102 has an example irregular shape formed by the extension of example arms 906 and example legs 908 of the drone 102 outward relative to the elliptical and/or egg-like shape of the first configuration 902 of FIG. 9A. In some examples, the shape manager 340 of FIG. 3 transforms and/or changes the shape of the drone 102 from the elliptical and/or egg-like shape corresponding to the first configuration 902 of FIG. 9A to the irregular shape corresponding to the second configuration 904 of FIG. 9B. In some examples, the shape manager 340 of FIG. 3 changes the shape of the drone 102 in response to the launch manager 336 of FIG. 3 determining that the drone 102 has reached a launch apex. In some examples, the power manager 338 of FIG. 3 provides and/or supplies power to an example motor 910 of the drone 102 in response to the launch manager 336 of FIG. 3 determining that the drone 102 has reached a launch apex and/or in response to the shape manager 340 of FIG. 3 changing the shape of the drone 102. Power provided to the motor 910 of the drone causes an example rotor 912 coupled to the motor 910 to rotate to propel and/or enable flight of the drone 102.

Flowcharts representative of example machine readable instructions which may be executed to collect and/or transmit turbine-generated wind data, collect and/or transmit airborne drone-generated wind data, generate and/or transmit wind data including turbine-generated wind data and/or airborne drone-generated wind data, generate and/or transmit a route for a flight of a drone based on wind data including turbine-generated wind data and/or airborne drone-generated wind data, and/or to control the supply of power to the drone and the shape of the drone in connection with launching the drone are shown in FIGS. 10-16. In these examples, the machine-readable instructions may implement one or more program(s) for execution by a processor such as the example controller 216 of FIG. 2 shown in the example processor platform 1700 discussed below in connection with FIG. 17, the example controller 316 of FIG. 3 shown in the example processor platform 1800 discussed below in connection with FIG. 18, and/or the example processor 408 of FIG. 4 shown in the example processor platform 1900 discussed below in connection with FIG. 19. The one or more program(s) may be embodied in software stored on a tangible computer readable storage medium such as a CD-ROM, a floppy disk, a hard drive, a digital versatile disk (DVD), a Blu-ray disk, or a memory associated with the controller 216 of FIG. 2, the controller 316 of FIG. 3, and/or the processor 408 of FIG. 4, but the entire program(s) and/or parts thereof could alternatively be executed by a device other than the controller 216 of FIG. 2, the controller 316 of FIG. 3, and/or the processor 408 of FIG. 4, and/or embodied in firmware or dedicated hardware. Further, although the example program(s) is/are described with reference to the flowcharts illustrated in FIGS. 10-16, many other methods for collecting and transmitting turbine-generated wind data, for collecting and transmitting airborne drone-generated wind data, for generating and transmitting wind data including turbine-generated wind data and/or airborne drone-generated wind data, for generating and transmitting a route for a flight of a drone based on wind data including turbine-generated wind data and/or airborne drone-generated wind data, and for controlling the supply of power to the drone and the shape of the drone in connection with launching the drone may alternatively be used. For example, the order of execution of the blocks may be changed, and/or some of the blocks described may be changed, eliminated, or combined.

As mentioned above, the example instructions of FIGS. 10-16 may be stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example instructions of FIGS. 10-16 may be stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 10:
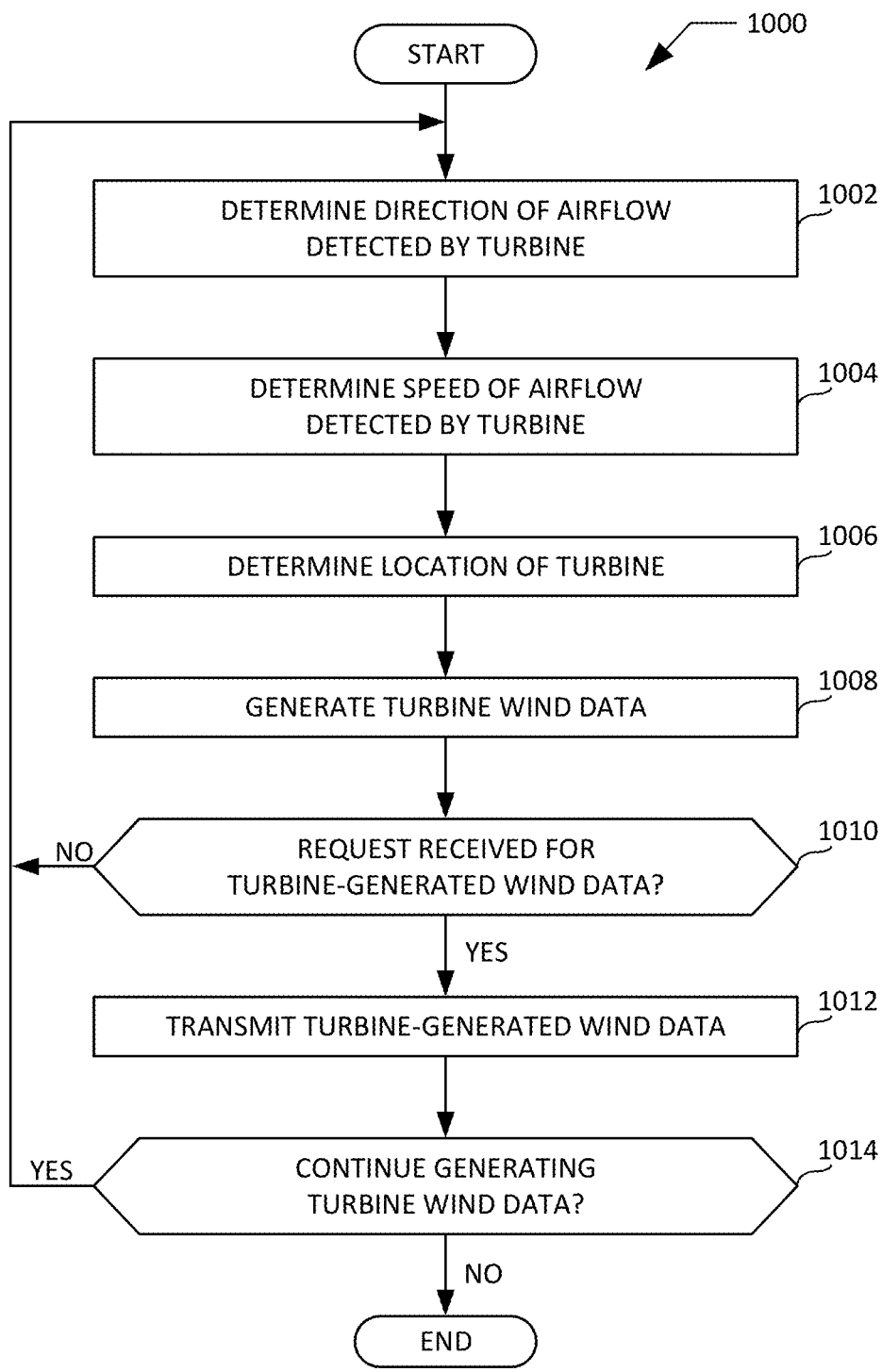
FIG. 10 is a flowchart representative of example machine readable instructions that may be executed at the example turbine of FIGS. 1 and/or 2 to collect and transmit example turbine-generated wind data.

FIG. 10 is a flowchart representative of example machine readable instructions 1000 that may be executed at a turbine (e.g., the turbine 200 of FIG. 2) to collect and transmit example turbine-generated wind data (e.g., the example turbine-generated wind data 228 of FIG. 2). The example program 1000 begins when the example data aggregator 224 of FIG. 2 determines a direction of an airflow detected by the turbine (block 1002). For example, the data aggregator 224 may collect, access, obtain, process, determine and/or otherwise identify the airflow direction data 230 sensed, measured and/or detected by the wind vane 202 of FIG. 2. The airflow direction data 230 collected, accessed, obtained, processed, determined, and/or otherwise identified by the data aggregator 224 may include timing information (e.g., time stamps) corresponding to times at which the airflow direction data 230 was sensed, measured and/or detected by the wind vane 202 of FIG. 2. Following block 1002, control proceeds to block 1004.

At block 1004, the example data aggregator 224 of FIG. 2 determines a speed of the airflow detected by the turbine (block 1004). For example, the data aggregator 224 may collect, access, obtain, process, determine, and/or otherwise identify the airflow speed data 232 sensed, measured and/or detected by the anemometer 204 of FIG. 2. The airflow speed data 232 collected, accessed, obtained, processed, determined and/or otherwise identified by the data aggregator 224 may include timing information (e.g., time stamps) corresponding to times at which the airflow speed data 232 was sensed, measured and/or detected by the anemometer 204 of FIG. 2. Following block 1004, control proceeds to block 1006.

At block 1006, the example data aggregator 224 of FIG. 2 determines a location of the turbine (block 1006). For example, the data aggregator 224 may collect, access, obtain, process, determine and/or otherwise identify the location data 234 identified and/or derived from the signal(s) collected and/or received by the GPS receiver 206 of FIG. 2. The data aggregator 224 may additionally and/or alternatively collect, access, obtain, process, determine, and/or otherwise identify the altitude data sensed, measured and/or detected by the altimeter 208 of FIG. 2. The location data 234 collected, accessed, obtained, processed, determined, and/or otherwise identified by the data aggregator 224 may include timing information (e.g., time stamps) corresponding to times at which the location data 234 was collected, received and/or detected by the GPS receiver 206 and/or the altimeter 208 of FIG. 2. Following block 1006, control proceeds to block 1008.

At block 1008, the example wind data generator 226 of FIG. 2 generates turbine wind data (e.g., the turbine-generated wind data 228 of FIG. 2) based on the direction of the airflow detected by the turbine, the speed of the airflow detected by the turbine, and the location of the turbine (block 1008). In some examples, the turbine-generated wind data 228 includes the airflow direction data 230, the airflow speed data 232 and/or the location data 234 described above. In some examples, the wind data generator 226 synchronizes and/or otherwise organizes the turbine-generated wind data 228 based on the timing information associated with each of the airflow direction data 230, the airflow speed data 232, and the location data 234. Following block 1008, control proceeds to block 1010.

At block 1010, the example controller 216 of FIG. 2 determines whether a request has been received for the turbine-generated wind data (block 1010). For example, the controller 216 may receive one or more signal(s), command(s) and or instruction(s) indicating a request for the turbine-generated wind data 228. If the controller 216 determines at block 1010 that a request for the turbine-generated wind data has not been received, control returns to block 1002. If the controller 216 instead determines at block 1010 that a request for the turbine-generated wind data has been received, control proceeds to block 1012.

At block 1012, the example radio transmitter 210 of FIG. 2 transmits the turbine-generated wind data (block 1012). For example, the radio transmitter 210 may transmit the turbine-generated wind data 228 generated by the wind data generator 226 of FIG. 2 to the server 152 of FIGS. 1 and/or 4, and/or the drone 102 of FIGS. 1 and/or 3. Following block 1012, control proceeds to block 1014.

At block 1014, the example controller 216 of FIG. 2 determines whether turbine-generated wind data is to continue being generated (block 1014). For example, the controller 216 may receive one or more signal(s), command(s) and or instruction(s) indicating that turbine-generated wind data is not to continue being generated. If the controller 216 determines at block 1014 that turbine-generated wind data is to continue being generated, control returns to block 1002. If the controller 216 instead determines at block 1014 that turbine-generated wind data is not to continue being generated, the example program 1000 of FIG. 10 ends.

Figure 11:
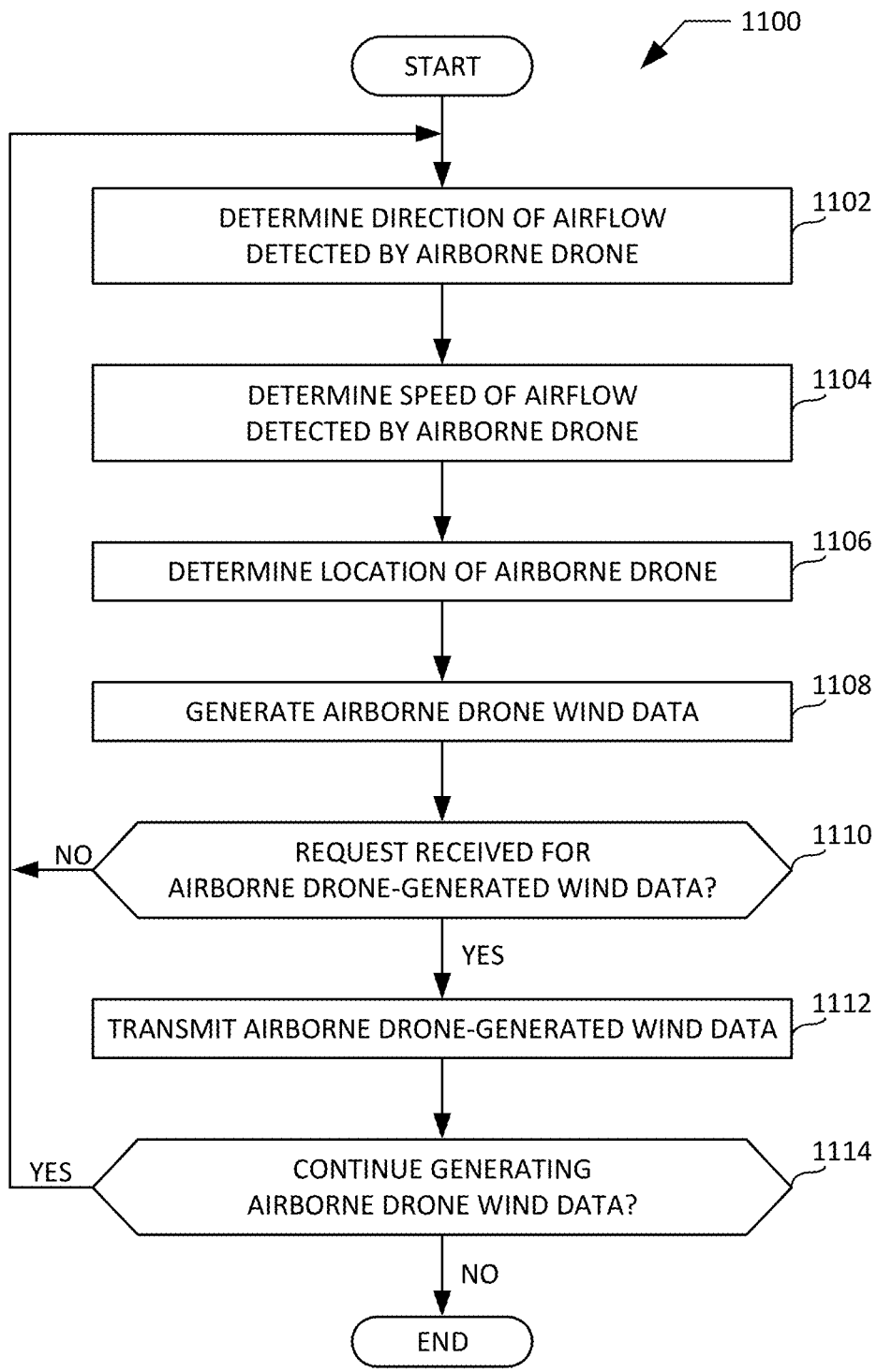
FIG. 11 is a flowchart representative of example machine readable instructions that may be executed at the example drone of FIGS. 1 and/or 3 to collect and transmit example airborne drone-generated wind data.

FIG. 11 is a flowchart representative of example machine readable instructions 1100 that may be executed at a drone (e.g., the drone 300 of FIG. 3) to collect and transmit example airborne drone-generated wind data (e.g., the airborne drone-generated wind data 342 of FIG. 3). The example program 1100 begins when the example data aggregator 330 of FIG. 3 determines a direction of an airflow detected by the airborne drone (block 1102). For example, the data aggregator 330 may collect, access, obtain, process, determine, and/or otherwise identify the airflow direction data 344 sensed, measured and/or detected by the IMU 302 of FIG. 3. The airflow direction data 344 collected, accessed, obtained, processed, determined, and/or otherwise identified by the data aggregator 330 may include timing information (e.g., time stamps) corresponding to times at which the airflow direction data 344 was sensed, measured and/or detected by the IMU 302 of FIG. 3. Following block 1102, control proceeds to block 1104.

At block 1104, the example data aggregator 330 of FIG. 3 determines a speed of the airflow detected by the airborne drone (block 1104). For example, the data aggregator 330 may collect, access, process, determine, obtain and/or otherwise identify the airflow speed data 346 sensed, measured and/or detected by the IMU 302 of FIG. 3. The airflow speed data 346 collected, accessed, obtained, processed, determined, and/or otherwise identified by the data aggregator 330 may include timing information (e.g., time stamps) corresponding to times at which the airflow speed data 346 was sensed, measured and/or detected by the IMU 302 of FIG. 3. Following block 1104, control proceeds to block 1106.

At block 1106, the example data aggregator 330 of FIG. 3 determines a location of the airborne drone (block 1106). For example, the data aggregator 330 may collect, access, obtain, process, determine, and/or otherwise identify the location data 348 identified and/or derived from the signal(s) collected and/or received by the GPS receiver 306 of FIG. 3. The data aggregator 330 may additionally and/or alternatively collect, access, obtain, process, determine, and/or otherwise identify the altitude data sensed, measured and/or detected by the altimeter 308 of FIG. 3. The location data 348 collected, accessed, obtained, processed, determined, and/or otherwise identified by the data aggregator 330 may include timing information (e.g., time stamps) corresponding to times at which the location data 348 was collected, received and/or detected by the GPS receiver 306 and/or the altimeter 308 of FIG. 3. Following block 1106, control proceeds to block 1108.

At block 1108, the example wind data generator 332 of FIG. 3 generates airborne drone-generated wind data (e.g., the airborne drone-generated wind data 342 of FIG. 3) based on the direction of the airflow detected by the airborne drone, the speed of the airflow detected by the airborne drone, and the location of the airborne drone (block 1108). In some examples, the airborne drone-generated wind data 342 includes the airflow direction data 344, the airflow speed data 346 and/or the location data 348 described above. In some examples, the wind data generator 332 synchronizes and/or otherwise organizes the airborne drone-generated wind data 342 based on the timing information associated with each of the airflow direction data 344, the airflow speed data 346, and the location data 348. Following block 1108, control proceeds to block 1110.

At block 1110, the example controller 316 of FIG. 3 determines whether a request has been received for the airborne drone-generated wind data (block 1110). For example, the controller 316 may receive one or more signal(s), command(s) and or instruction(s) indicating a request for the airborne drone-generated wind data 342. If the controller 316 determines at block 1110 that a request for the airborne drone-generated wind data has not been received, control returns to block 1102. If the controller 316 instead determines at block 1110 that a request for the airborne drone-generated wind data has been received, control proceeds to block 1112.

At block 1112, the example radio transmitter 310 of FIG. 3 transmits the airborne drone-generated wind data (block 1112). For example, the radio transmitter 310 may transmit the airborne drone-generated wind data 342 generated by the wind data generator 332 of FIG. 3 to the server 152 of FIGS. 1 and/or 4, and/or the drone 102 of FIGS. 1 and/or 3. Following block 1112, control proceeds to block 1114.

At block 1114, the example controller 316 of FIG. 3 determines whether airborne drone-generated wind data is to continue being generated (block 1114). For example, the controller 316 may receive one or more signal(s), command(s) and or instruction(s) indicating that airborne drone-generated wind data is not to continue being generated. If the controller 316 determines at block 1114 that airborne drone-generated wind data is to continue being generated, control returns to block 1102. If the controller 316 instead determines at block 1114 that airborne drone-generated wind data is not to continue being generated, the example program 1100 of FIG. 12 ends.

Figure 12:
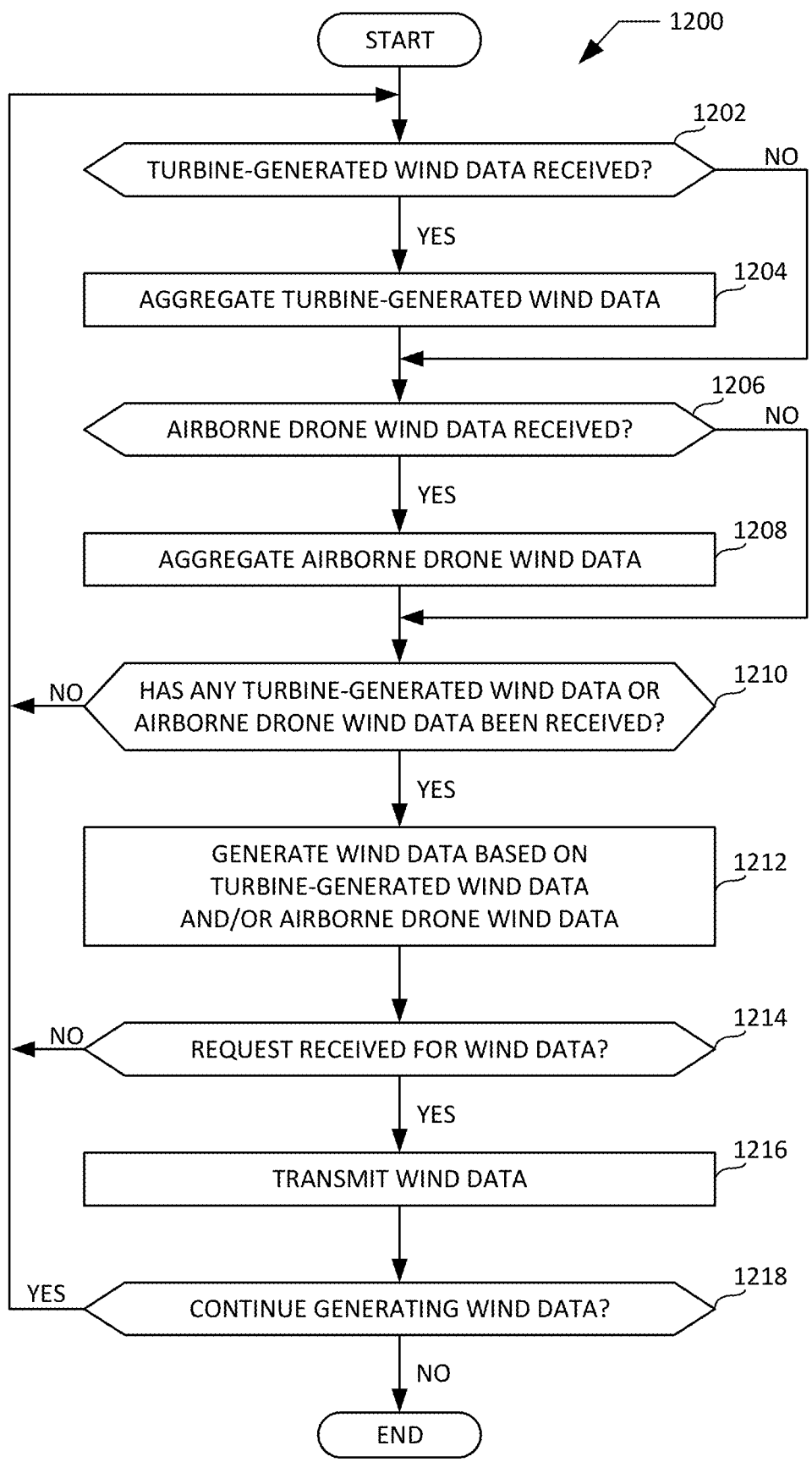
FIG. 12 is a flowchart representative of example machine readable instructions that may be executed at the example server of FIGS. 1 and/or 4 to generate and transmit example wind data including turbine-generated wind data and/or airborne drone-generated wind data.

FIG. 12 is a flowchart representative of example machine readable instructions 1200 that may be executed at a server (e.g., the example server 152 of FIGS. 1 and/or 4) to generate and transmit example wind data (e.g., the wind data 420 of FIG. 4) including turbine-generated wind data (e.g., the aggregated turbine-generated wind data 422 of FIG. 4) and/or airborne drone-generated wind data (e.g., the aggregated airborne drone-generated wind data 424 of FIG. 4).

The example program 1200 begins when the example data aggregator 416 of FIG. 4 determines whether turbine-generated wind data has been received (block 1202). For example, the data aggregator 416 may receive one or more signal(s), command(s) and or instruction(s) indicating that turbine-generated wind data 228 has been received from the turbine 200 of FIG. 2 (e.g., from one or more of the first, second, third and/or fourth turbines 126, 132, 138, 144 of FIG. 1). If the data aggregator 416 determines at block 1202 that turbine-generated wind data has been received from one or more turbine(s), control proceeds to block 1204. If the data aggregator 416 instead determines at block 1202 that turbine-generated wind data has not been received, control proceeds to block 1206.

At block 1204, the example data aggregator 416 of FIG. 4 generates aggregated turbine-generated wind data (e.g., the aggregated turbine-generated wind data 422 of FIG. 4) by combining and/or aggregating the turbine-generated wind data received from various ones of the turbines (e.g., the first, second, third and/or fourth turbine(s) 126, 132, 138, 144 of FIG. 1) (block 1204). Following block 1204, control proceeds to block 1206.

At block 1206, the example data aggregator 416 of FIG. 4 determines whether airborne drone-generated wind data has been received (block 1206). For example, the data aggregator 416 may receive one or more signal(s), command(s) and or instruction(s) indicating that airborne drone-generated wind data 342 has been received from the drone 300 of FIG. 3 (e.g., from one or more of the first, second, third and/or fourth airborne drones 158, 160, 162, 164 of FIG. 1). If the data aggregator 416 determines at block 1206 that airborne drone-generated wind data has been received from one or more airborne drone(s), control proceeds to block 1208. If the data aggregator 416 instead determines at block 1206 that airborne drone-generated wind data has not been received, control proceeds to block 1210.

At block 1208, the example data aggregator 416 of FIG. 4 generates aggregated airborne drone-generated wind data (e.g., the aggregated airborne drone-generated wind data 424 of FIG. 4) by combining and/or aggregating the airborne drone-generated wind data received from various ones of the airborne drones (e.g., the first, second, third and/or fourth airborne drone(s) 158, 160, 162, 164 of FIG. 1) (block 1208). Following block 1208, control proceeds to block 1210.

At block 1210, the example data aggregator 416 of FIG. 4 determines whether any turbine-generated wind data or airborne drone-generated wind data has been received (block 1210). For example, the data aggregator 416 may receive one or more signal(s), command(s) and or instruction(s) indicating that turbine-generated wind data and/or airborne drone-generated wind data has been received. If the data aggregator 416 determines at block 1210 that no turbine-generated wind data or airborne drone-generated wind data has been received, control returns to block 1202. If the data aggregator 416 instead determines at block 1210 that turbine-generated wind data and/or airborne drone-generated wind data has been received, control proceeds to block 1212.

At block 1212, the example wind data generator 418 of FIG. 4 generates wind data (e.g., the wind data 420 of FIG. 4) based on the aggregated turbine-generated wind data and/or the aggregated airborne drone-generated wind data (block 1212). For example, the wind data generator 418 may generate the wind data 420 of FIG. 4 by combining and/or aggregating the aggregated turbine-generated wind data 422 of FIG. 4 and the aggregated airborne drone-generated wind data 424 of FIG. 4. Following block 1212, control proceeds to block 1214.

At block 1214, the example processor 408 of FIG. 4 determines whether a request has been received for the wind data (block 1214). For example, the processor 408 may receive one or more signal(s), command(s) and or instruction(s) indicating a request for the wind data 420 of FIG. 4. If the processor 408 determines at block 1214 that a request for the wind data has not been received, control returns to block 1202. If the processor 408 instead determines at block 1214 that a request for the wind data has been received, control proceeds to block 1216.

At block 1216, the example radio transmitter 402 of FIG. 4 transmits the wind data (block 1216). For example, the radio transmitter 402 may transmit the wind data 420 generated by the wind data generator 418 of FIG. 4 to the drone 102 of FIGS. 1 and/or 3. Following block 1216, control proceeds to block 1218.

At block 1218, the example processor 408 of FIG. 4 determines whether wind data is to continue being generated (block 1218). For example, the processor 408 may receive one or more signal(s), command(s) and or instruction(s) indicating that wind data is not to continue being generated. If the processor 408 determines at block 1218 that wind data is to continue being generated, control returns to block 1202. If the processor 408 instead determines at block 1218 that wind data is not to continue being generated, the example program 1200 of FIG. 12 ends.

Figure 13:
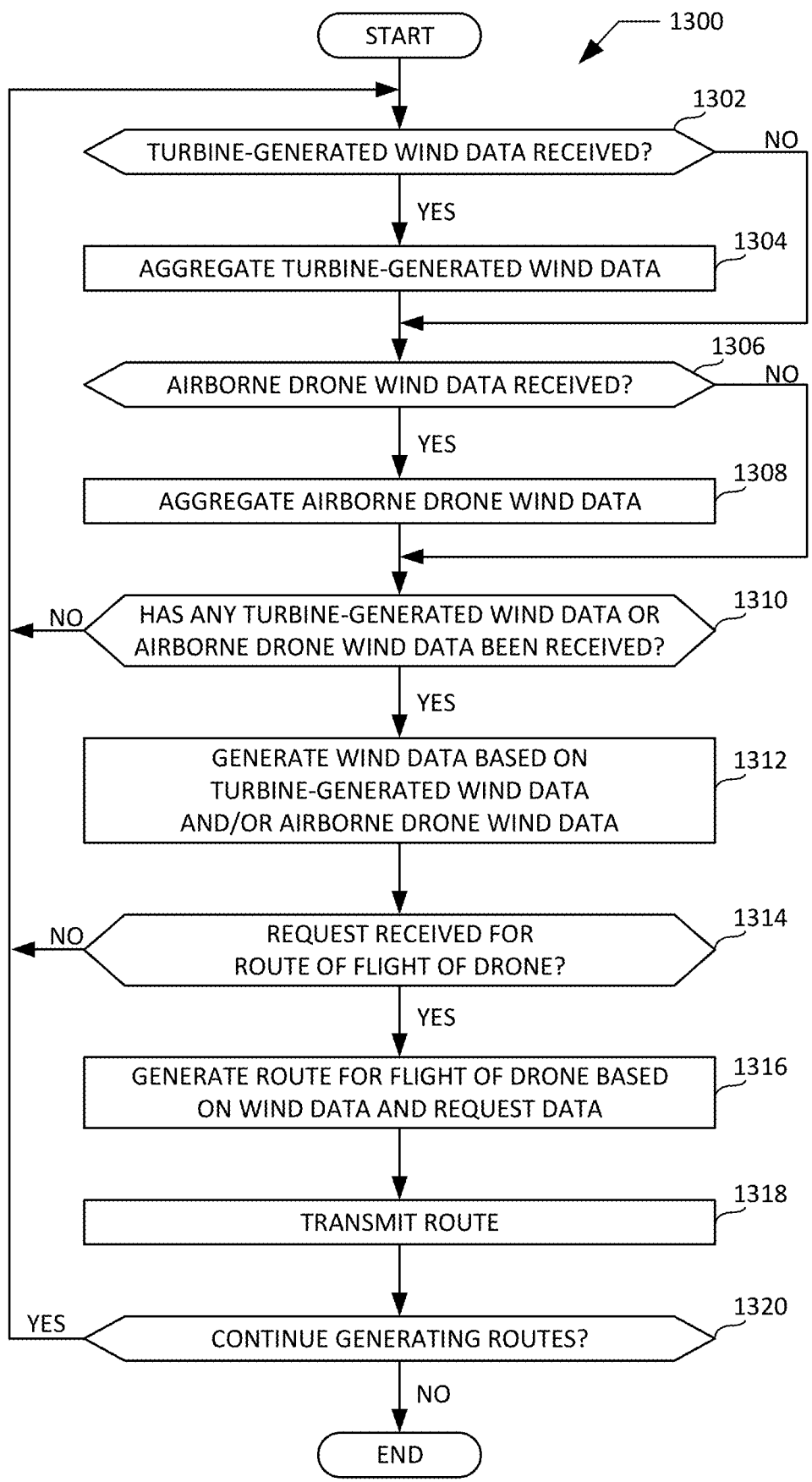
FIG. 13 is a flowchart representative of example machine readable instructions that may be executed at the example server of FIGS. 1 and/or 4 to generate and transmit a route for a flight of a drone based on wind data including turbine-generated wind data and/or airborne drone-generated wind data.

FIG. 13 is a flowchart representative of example machine readable instructions 1300 that may be executed at a server (e.g., the example server 152 of FIGS. 1 and/or 4) to generate and transmit a route (e.g., the second route 166 of FIG. 1) for a flight of a drone based on wind data (e.g., the wind data 420 of FIG. 4) including turbine-generated wind data (e.g., the aggregated turbine-generated wind data 422 of FIG. 4) and/or airborne drone-generated wind data (e.g., the aggregated airborne drone-generated wind data 424 of FIG. 4).

The example program 1300 begins when the example data aggregator 416 of FIG. 4 determines whether turbine-generated wind data has been received (block 1302). For example, the data aggregator 416 may receive one or more signal(s), command(s) and or instruction(s) indicating that turbine-generated wind data 228 has been received from the turbine 200 of FIG. 2 (e.g., from one or more of the first, second, third and/or fourth turbines 126, 132, 138, 144 of FIG. 1). If the data aggregator 416 determines at block 1302 that turbine-generated wind data has been received from one or more turbine(s), control proceeds to block 1304. If the data aggregator 416 instead determines at block 1302 that turbine-generated wind data has not been received, control proceeds to block 1306.

At block 1304, the example data aggregator 416 of FIG. 4 generates aggregated turbine-generated wind data (e.g., the aggregated turbine-generated wind data 422 of FIG. 4) by combining and/or aggregating the turbine-generated wind data received from various ones of the turbines (e.g., the first, second, third and/or fourth turbine(s) 126, 132, 138, 144 of FIG. 1) (block 1304). Following block 1304, control proceeds to block 1306.

At block 1306, the example data aggregator 416 of FIG. 4 determines whether airborne drone-generated wind data has been received (block 1306). For example, the data aggregator 416 may receive one or more signal(s), command(s) and or instruction(s) indicating that airborne drone-generated wind data 342 has been received from the drone 300 of FIG. 3 (e.g., from one or more of the first, second, third and/or fourth airborne drones 158, 160, 162, 164 of FIG. 1). If the data aggregator 416 determines at block 1306 that airborne drone-generated wind data has been received from one or more airborne drone(s), control proceeds to block 1308. If the data aggregator 416 instead determines at block 1306 that airborne drone-generated wind data has not been received, control proceeds to block 1310.

At block 1308, the example data aggregator 416 of FIG. 4 generates aggregated airborne drone-generated wind data (e.g., the aggregated airborne drone-generated wind data 424 of FIG. 4) by combining and/or aggregating the airborne drone-generated wind data received from various ones of the airborne drones (e.g., the first, second, third and/or fourth airborne drone(s) 158, 160, 162, 164 of FIG. 1) (block 1308). Following block 1308, control proceeds to block 1310.

At block 1310, the example data aggregator 416 of FIG. 4 determines whether any turbine-generated wind data or airborne drone-generated wind data has been received (block 1310). For example, the data aggregator 416 may receive one or more signal(s), command(s) and or instruction(s) indicating that turbine-generated wind data and/or airborne drone-generated wind data has been received. If the data aggregator 416 determines at block 1310 that no turbine-generated wind data or airborne drone-generated wind data has been received, control returns to block 1302. If the data aggregator 416 instead determines at block 1310 that turbine-generated wind data and/or airborne drone-generated wind data has been received, control proceeds to block 1312.

At block 1312, the example wind data generator 418 of FIG. 4 generates wind data (e.g., the wind data 420 of FIG. 4) based on the aggregated turbine-generated wind data and/or the aggregated airborne drone-generated wind data (block 1312). For example, the wind data generator 418 may generate the wind data 420 of FIG. 4 by combining and/or aggregating the aggregated turbine-generated wind data 422 of FIG. 4 and the aggregated airborne drone-generated wind data 424 of FIG. 4. Following block 1312, control proceeds to block 1314.

At block 1314, the example processor 408 of FIG. 4 determines whether a request has been received for a route of a flight of a drone (block 1314). For example, the processor 408 may receive one or more signal(s), command(s) and or instruction(s) indicating a request for a flight of a drone, where the request includes information and/or data identifying a launch location and a destination location for the flight. If the processor 408 determines at block 1314 that a request for a route of a flight of a drone has not been received, control returns to block 1302. If the processor 408 instead determines at block 1314 that a request for the wind data has been received, control proceeds to block 1316.

At block 1316, the example route manager 419 of FIG. 4 generates a route for a flight of a drone based on the wind data (e.g., the wind data 420 including the aggregated turbine-generated wind data 422 and/or the aggregated airborne drone-generated wind data 424 of FIG. 4) and based on the request data (e.g., the identified launch location and destination location for the flight of the drone) (block 1316). For example, the route manager 419 may generate the second route 166 of FIG. 1 to be followed by the drone 102 during the flight of the drone 102 through and/or over the area 104 from the launch location 106 to the destination location 108 of FIG. 1. In some examples, the route generated by the route manager 419 passes through a tailwind area within which the drone is to engage a tailwind during the flight. In some examples, the route generated by the route manager 419 passes through an updraft area within which the drone is to engage an updraft during the flight. Following block 1316, control proceeds to block 1318.

At block 1318, the example radio transmitter 402 of FIG. 4 transmits the route (block 1318). For example, the radio transmitter 402 may transmit the route (e.g., the second route 166) generated by the route generator 419 of FIG. 4 to the drone 102 of FIGS. 1 and/or 3. Following block 1318, control proceeds to block 1320.

At block 1320, the example processor 408 of FIG. 4 determines whether routes are to continue being generated (block 1320). For example, the processor 408 may receive one or more signal(s), command(s) and or instruction(s) indicating that routes are not to continue being generated. If the processor 408 determines at block 1320 that routes are to continue being generated, control returns to block 1302. If the processor 408 instead determines at block 1320 that routes are not to continue being generated, the example program 1300 of FIG. 13 ends.

Figure 14:
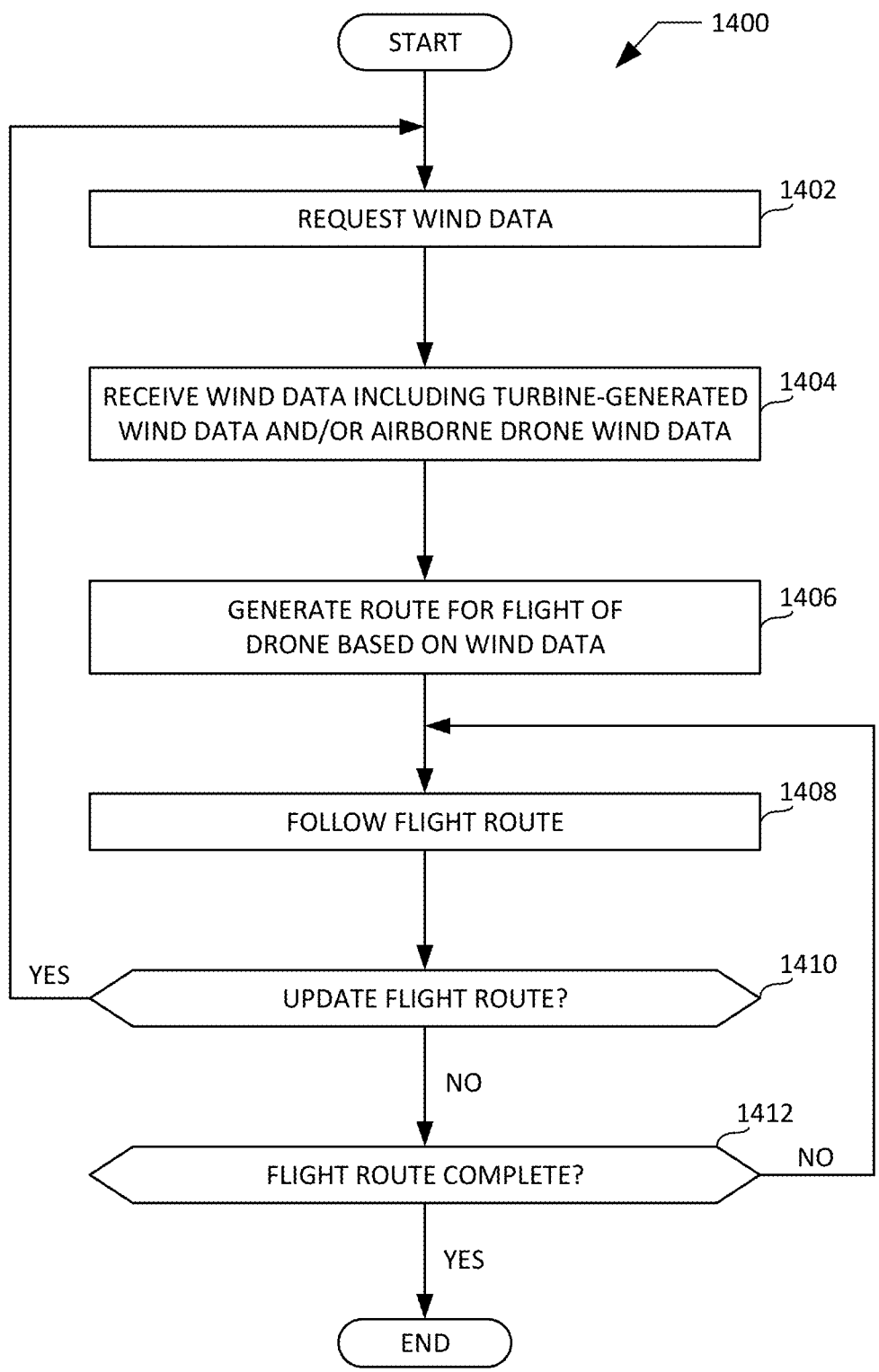
FIG. 14 is a flowchart representative of example machine readable instructions that may be executed at the example drone of FIGS. 1 and/or 3 to generate a route for a flight of the drone based on wind data including turbine-generated wind data and/or airborne drone-generated wind data.

FIG. 14 is a flowchart representative of example machine readable instructions 1400 that may be executed at a drone (e.g., the drone 300 of FIG. 3) to generate a route for a flight of the drone based on wind data (e.g., the wind data 420 of FIGS. 3 and/or 4) including turbine-generated wind data (e.g., the aggregated turbine-generated wind data 422 of FIGS. 3 and/or 4) and/or airborne drone-generated wind data (e.g., the aggregated airborne drone-generated wind data 424 of FIGS. 3 and/or 4). The example program 1400 begins when the example radio transmitter 310 of FIG. 3 transmits one or more request(s) to a server (e.g., the server 152 of FIGS. 1 and/or 4) for wind data (e.g., the wind data 420 of FIG. 4) (block 1402). Following block 1402, control proceeds to block 1404.

At block 1404, the example radio receiver 312 of FIG. 3 receives data and/or signal(s) corresponding to wind data including turbine-generated wind data and/or airborne drone-generated wind data (e.g., the wind data 420 including the aggregated turbine-generated wind data 422 and the aggregated airborne drone-generated wind data 424 of FIGS. 3 and/or 4) (block 1404). Following block 1404, control proceeds to block 1406.

At block 1406, the example route manager 334 of FIG. 3 generates a route to be followed during a flight of the drone based on the wind data received by the drone (e.g., the wind data 420 including the aggregated turbine-generated wind data 422 and/or the aggregated airborne drone-generated wind data 424 of FIGS. 3 and/or 4) (block 1406). For example, the route manager 334 may generate the second route 166 of FIG. 1 to be followed by the drone 102 during the flight of the drone 102 through and/or over the area 104 from the launch location 106 to the destination location 108 of FIG. 1. In some examples, the route generated by the route manager 334 passes through a tailwind area within which the drone is to engage a tailwind during the flight. Data corresponding to and/or indicative of the tailwind and/or the tailwind area may be included within the wind data received by the drone. In some examples, the route generated by the route manager 334 passes through an updraft area within which the drone is to engage an updraft during the flight. Data corresponding to and/or indicative of the updraft and/or the updraft area may be included within the wind data received by the drone. Following block 1406, control proceeds to block 1408.

At block 1408, the example route manager 334 of FIG. 3 causes the drone to follow the route generated by the route manager 334 during a flight of the drone (block 1408). For example, the route manager 334 may provide one or more signal(s), command(s) and/or instruction(s) to one or more motor(s) of the drone to cause the drone to track, follow and/or otherwise move along the route generated by the route manager 334 during a flight of the drone. Following block 1408, control proceeds to block 1410.

At block 1410, the example route manager 334 of FIG. 3 determines whether to update the route being followed by the drone (block 1410). For example, the route manager 334 may receive one or more signal(s), command(s) and or instruction(s) indicating that the route is to be updated (e.g., updated based on more current wind data). If the route manager 334 determines at block 1410 that that the route is to be updated, control returns to block 1402. If the route manager 334 instead determines at block 1410 that the route is not to be updated, control proceeds to block 1412.

At block 1412, the example route manager 334 of FIG. 3 determines whether the route being followed by the drone has been completed (block 1412). For example, based on location data obtained and/or accessed from the GPS receiver 306 of FIG. 3, the route manager 334 may determine whether a current position and/or location of the drone coincides with (e.g., matches) a destination location of a route being followed by the drone during a flight of the drone. The route being followed by the drone has been completed when the current location of the drone coincides with the destination location of the route. If the route manager 334 determines at block 1412 that that the route being followed by the drone has not been completed, control returns to block 1408. If the route manager 334 instead determines at block 1412 that the route being followed by the drone has been completed, the example program 1400 of FIG. 14 ends.

Figure 15:
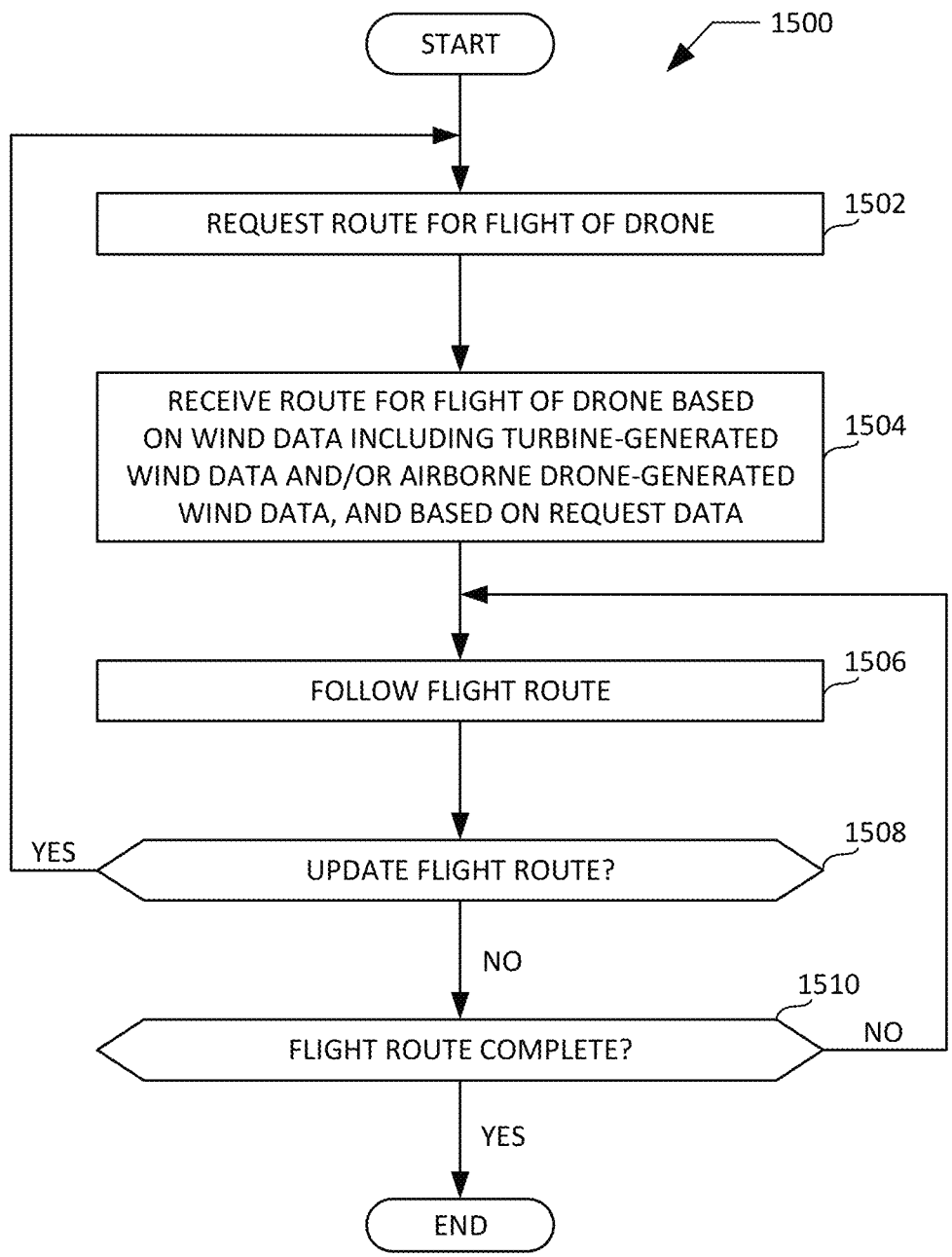
FIG. 15 is a flowchart representative of example machine readable instructions that may be executed at the example drone of FIGS. 1 and/or 3 to obtain a route for a flight of the drone based on wind data including turbine-generated wind data and/or airborne drone-generated wind data.

FIG. 15 is a flowchart representative of example machine readable instructions 1500 that may be executed at a drone (e.g., the drone 300 of FIG. 3) to obtain a route for a flight of the drone based on wind data (e.g., the wind data 420 of FIGS. 3 and/or 4) including turbine-generated wind data (e.g., the aggregated turbine-generated wind data 422 of FIGS. 3 and/or 4) and/or airborne drone-generated wind data (e.g., the aggregated airborne drone-generated wind data 424 of FIGS. 3 and/or 4). The example program 1500 begins when the example radio transmitter 310 of FIG. 3 transmits one or more request(s) to a server (e.g., the server 152 of FIGS. 1 and/or 4) for a route of a flight of the drone, the request including information and/or data identifying a launch location and a destination location for the flight (block 1502). Following block 1502, control proceeds to block 1504.

At block 1504, the example radio receiver 312 of FIG. 3 receives data and/or signal(s) corresponding to a route for a flight of the drone based on wind data including turbine-generated wind data and/or airborne drone-generated wind data (e.g., the wind data 420 including the aggregated turbine-generated wind data 422 and the aggregated airborne drone-generated wind data 424 of FIGS. 3 and/or 4) and based on information and/or data included in the request (e.g., the identified launch location and destination location for the flight) (block 1504). In some examples, the route passes through a tailwind area within which the drone is to engage a tailwind during the flight. In some examples, the route passes through an updraft area within which the drone is to engage an updraft during the flight. Following block 1504, control proceeds to block 1506.

At block 1506, the example route manager 334 of FIG. 3 causes the drone to follow the route during a flight of the drone (block 1506). For example, the route manager 334 may provide one or more signal(s), command(s) and/or instruction(s) to one or more motor(s) of the drone to cause the drone to track, follow and/or otherwise move along the route during a flight of the drone. Following block 1506, control proceeds to block 1508.

At block 1508, the example route manager 334 of FIG. 3 determines whether to update the route being followed by the drone (block 1508). For example, the route manager 334 may receive one or more signal(s), command(s) and or instruction(s) indicating that the route is to be updated (e.g., updated based on more current wind data). If the route manager 334 determines at block 1508 that that the route is to be updated, control returns to block 1502. If the route manager 334 instead determines at block 1508 that the route is not to be updated, control proceeds to block 1510.

At block 1510, the example route manager 334 of FIG. 3 determines whether the route being followed by the drone has been completed (block 1510). For example, based on location data obtained and/or accessed from the GPS receiver 306 of FIG. 3, the route manager 334 may determine whether a current position and/or location of the drone coincides with (e.g., matches) a destination location of a route being followed by the drone during a flight of the drone. The route being followed by the drone has been completed when the current location of the drone coincides with the destination location of the route. If the route manager 334 determines at block 1510 that that the route being followed by the drone has not been completed, control returns to block 1506. If the route manager 334 instead determines at block 1510 that the route being followed by the drone has been completed, the example program 1500 of FIG. 15 ends.

Figure 16:
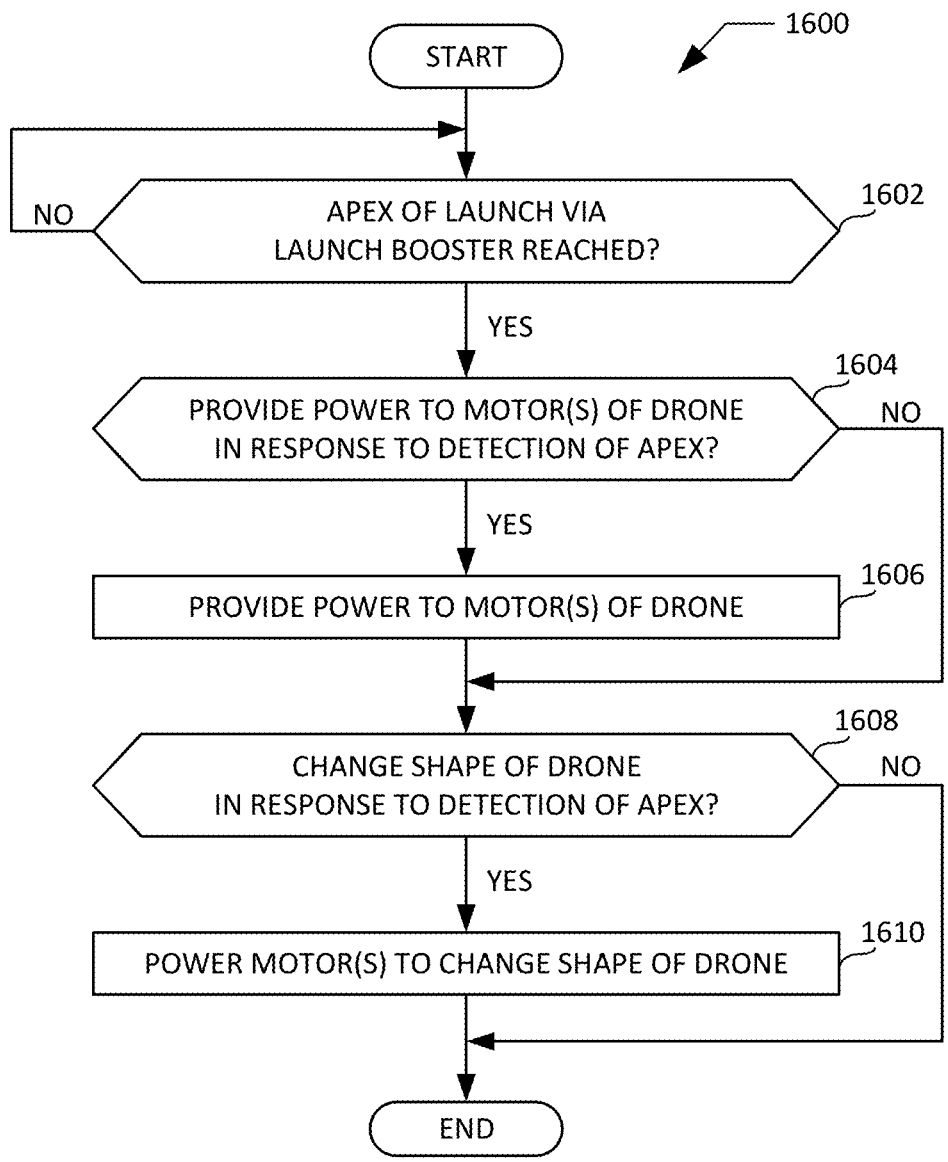
FIG. 16 is a flowchart representative of example machine readable instructions that may be executed at the example drone of FIGS. 1 and/or 3 to control the supply of power to the drone and to control the shape of the drone in connection with launching the drone.

FIG. 16 is a flowchart representative of example machine readable instructions 1600 that may be executed at a drone (e.g., the drone 300 of FIG. 3) to control the supply of power to the drone and to control the shape of the drone in connection with launching the drone. The example program 1600 begins when the example launch manager 336 of FIG. 3 determines whether an apex of a launch of the drone via the example launch booster 350 of FIG. 3 has been reached (block 1602). For example, the launch manager 336 may determine that an apex of a launch via the launch booster 350 has been reached based on altitude data sensed, measured and/or detected by the altimeter 308 of FIG. 3. If the launch manager 336 determines at block 1602 that the apex of the launch via the launch booster 350 has not been reached, control remains at block 1602. If the launch manager 336 instead determines at block 1602 that the apex of the launch via the launch booster 350 has been reached, control proceeds to block 1604.

At block 1604, the example power manager 338 of FIG. 3 determines whether to provide and/or supply power from the power source 320 of FIG. 3 to one or more motor(s) of the drone in response to the launch manager 336 of FIG. 3 determining that an apex of the launch has been reached (block 1604). For example, the power manager 338 may receive one or more signal(s), command(s) and or instruction(s) indicating that power is to be supplied from the power source 320 to one or more motor(s) of the drone in response to the launch manager 336 determining that an apex of the launch has been reached. If the power manager 338 determines at block 1604 that power is to be supplied from the power source 320 to one or more motor(s) of the drone in response to the launch manager 336 determining that an apex of the launch has been reached, control proceeds to block 1606. If the power manager 338 instead determines at block 1604 that power is not to be supplied from the power source 320 to one or more motor(s) of the drone in response to the launch manager 336 determining that an apex of the launch has been reached, control proceeds to block 1608.

At block 1606, the power manager 338 provides and/or supplies power from the power source 320 of FIG. 3 to one or more motor(s) of the drone (block 1606). For example, the power manager 338 may provide one or more signal(s), command(s) and/or instruction(s) to the power source 320 of FIG. 3 and/or to one or more motor(s) of the drone to cause the power source 320 to provide and/or supply power to the one or more motor(s) of the drone. Following block 1606, control proceeds to block 1608.

At block 1608, the shape manager 340 of FIG. 3 determines whether to change a shape of one or more shape adjustable component(s) (e.g., an extendable and/or transformable arm) of the drone in response to the launch manager 336 of FIG. 3 determining that an apex of the launch has been reached (block 1608). For example, the shape manager 340 may receive one or more signal(s), command(s) and or instruction(s) indicating that a shape of one or more shape adjustable component(s) of the drone is/are to be changed in response to the launch manager 336 determining that an apex of the launch has been reached. If the shape manager 340 determines at block 1608 to change a shape of one or more shape adjustable component(s) of the drone in response to the launch manager 336 of FIG. 3 determining that an apex of the launch has been reached, control proceeds to block 1610. If the shape manager 340 instead determines at block 1608 not to change a shape of one or more shape adjustable component(s) of the drone in response to the launch manager 336 of FIG. 3 determining that an apex of the launch has been reached, the example program 1600 of FIG. 16 ends.

At block 1610, the shape manager 340 powers one or more motor(s) of the drone to change the shape of one or more shape adjustable component(s) of the drone (block 1610). For example, the shape manager 340 may provide one or more signal(s), command(s) and/or instruction(s) to one or more motor(s) of the drone and/or one or more shape adjustable component(s) of the drone to cause the shape adjustable component(s) to change shape. Following block 1610, the example program 1600 of FIG. 16 ends.

Figure 17:
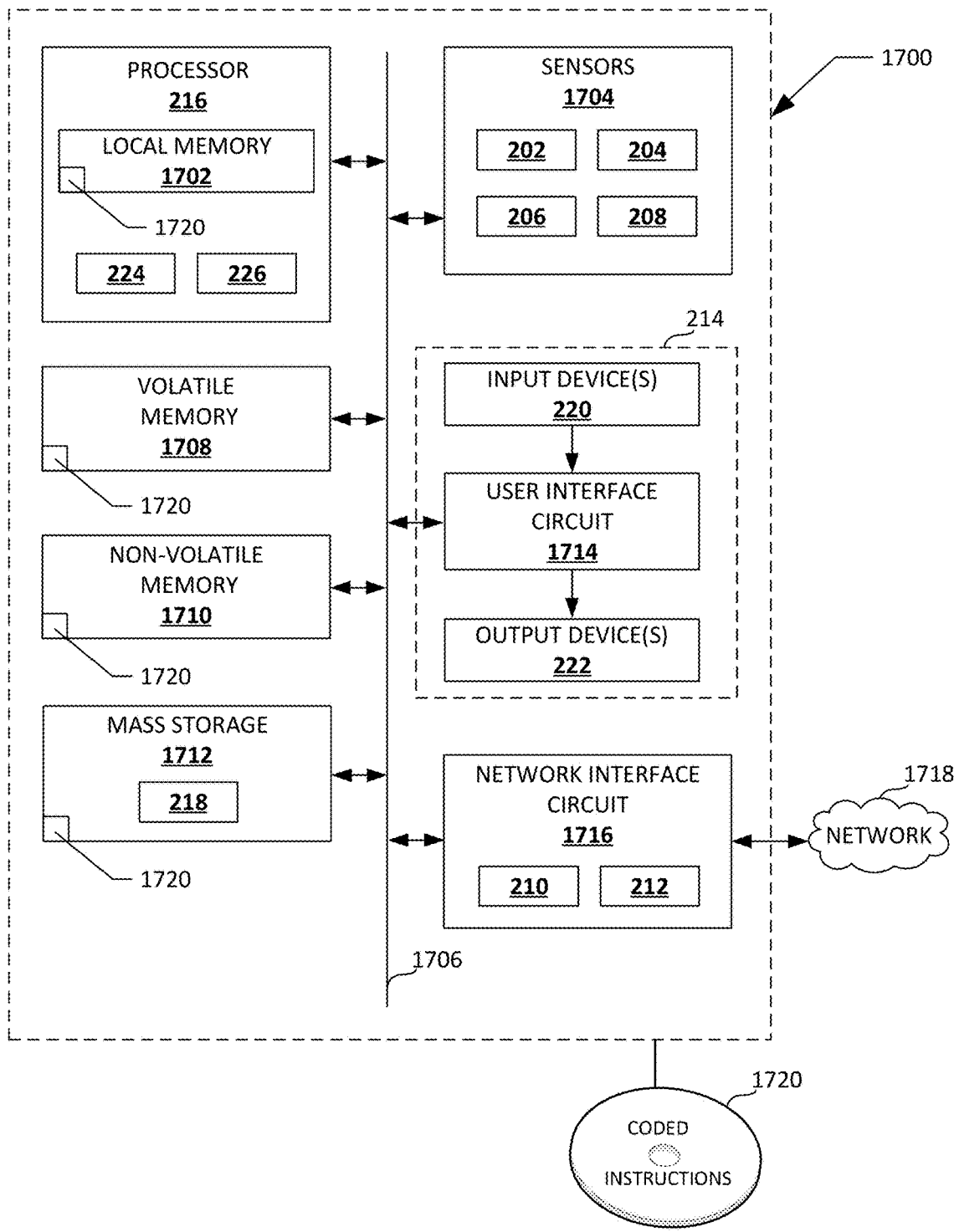
FIG. 17 is an example processor platform capable of executing the instructions of FIG. 10 to implement the example turbine of FIGS. 1 and/or 2.

FIG. 17 is an example processor platform 1700 capable of executing the instructions of FIG. 10 to implement the example turbine 200 of FIG. 2. The processor platform 1700 of the illustrated example includes a processor implemented as the example controller 216 of FIG. 2. The controller 216 of the illustrated example is hardware. For example, the controller 216 can be implemented by one or more integrated circuit(s), logic circuit(s) or microprocessor(s) from any desired family or manufacturer. The controller 216 of the illustrated example includes a local memory 1702 (e.g., a cache). The controller 216 of the illustrated example also includes the example data aggregator 224 and the example wind data generator 226 of FIG. 2.

The controller 216 of the illustrated example is in communication with one or more example sensors 1704 via a bus 1706. The example sensors 1704 include the example wind vane 202, the example anemometer 204, the example GPS receiver 206 and the example altimeter 208 of FIG. 2.

The controller 216 of the illustrated example is also in communication with a main memory including a volatile memory 1708 and a non-volatile memory 1710 via the bus 1706. The volatile memory 1708 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1710 may be implemented by flash memory and/or any other desired type of memory device. Access to the volatile memory 1708 and the non-volatile memory 1710 is controlled by a memory controller.

The controller 216 of the illustrated example is also in communication with one or more mass storage devices 1712 for storing software and/or data. Examples of such mass storage devices 1712 include floppy disk drives, hard disk drives, compact disk drives, Blu-ray disk drives, RAID systems, and digital versatile disk (DVD) drives. In the illustrated example of FIG. 17, the mass storage device 1712 includes the example memory 218 of FIG. 2.

The processor platform 1700 of the illustrated example also includes a user interface circuit 1714. The user interface circuit 1714 may be implemented by any type of interface standard, such as an Ethernet interface, a universal serial bus (USB), and/or a PCI express interface. In the illustrated example, one or more input device(s) 220 are connected to the user interface circuit 1714. The input device(s) 220 permit(s) a user to enter data and commands into the controller 216. The input device(s) 220 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 222 are also connected to the user interface circuit 1714 of the illustrated example. The output device(s) 222 can be implemented, for example, by a light emitting diode, an organic light emitting diode, a liquid crystal display, a touchscreen and/or a speaker. The user interface circuit 1714 of the illustrated example may, thus, include a graphics driver such as a graphics driver chip and/or processor. In the illustrated example, the input device(s) 220, the output device(s) 222 and the user interface circuit 1714 collectively form the example user interface 214 of FIG. 2.

The processor platform 1700 of the illustrated example also includes a network interface circuit 1716. The network interface circuit 1716 may be implemented by any type of interface standard, such as an Ethernet interface, a universal serial bus (USB), and/or a PCI express interface. In the illustrated example, the network interface circuit 1716 includes the example radio transmitter 210 and the example radio receiver 212 of FIG. 2 to facilitate the exchange of data and/or signals with external machines (e.g., the server 152 of FIGS. 1 and/or 4, the drone 102 of FIGS. 1 and/or 3, the first, second, third and/or fourth airborne drones 158, 160, 162, 164 of FIGS. 1 and/or 3, etc.) via a network 1716 (e.g., a cellular network, a wireless local area network (WLAN), etc.).

Coded instructions 1720 corresponding to FIG. 10 may be stored in the local memory 1702, in the volatile memory 1708, in the non-volatile memory 1710, in the mass storage device 1712, and/or on a removable tangible computer readable storage medium such as a flash memory stick, a CD or DVD.

Figure 18:
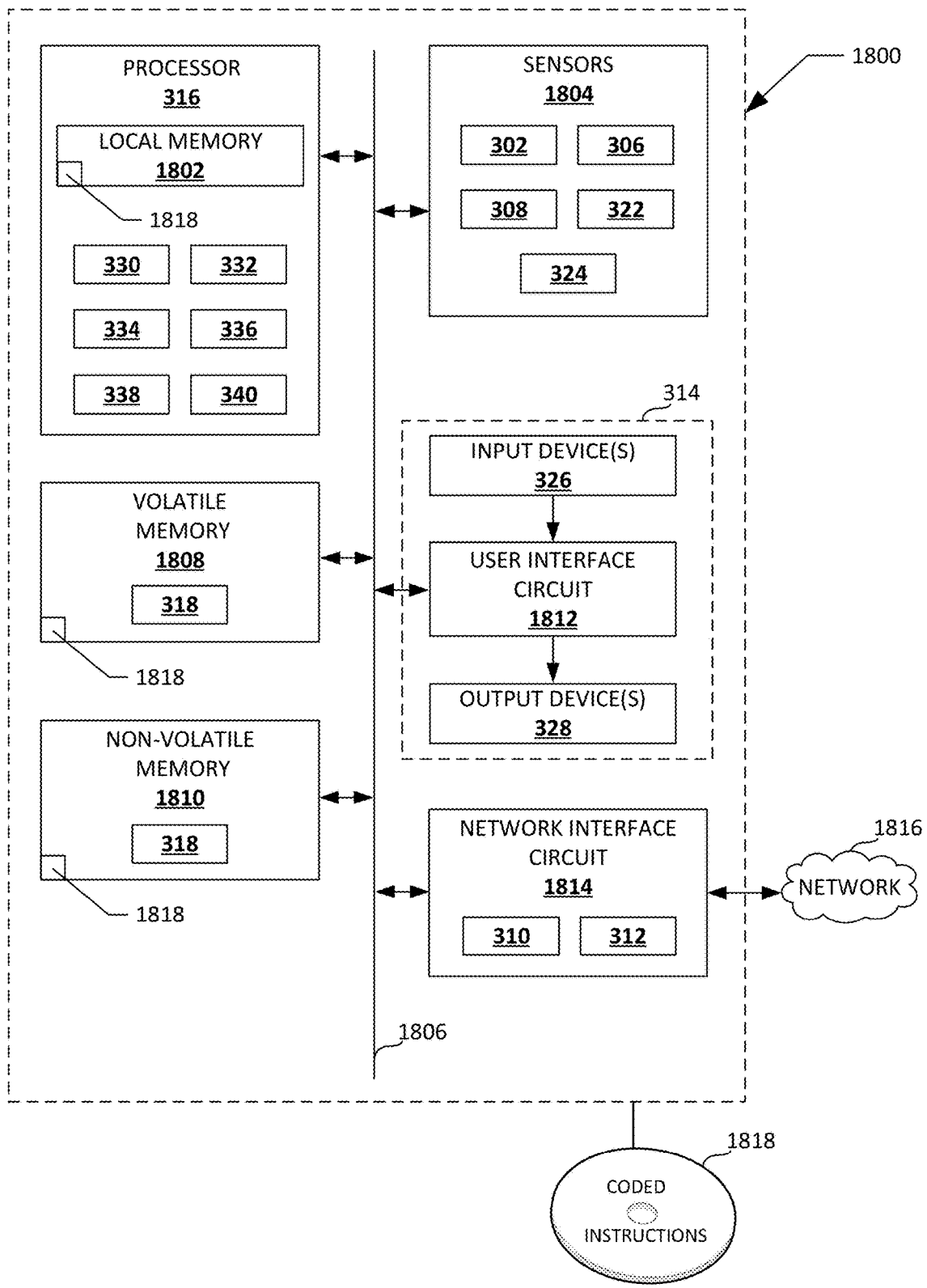
FIG. 18 is an example processor platform capable of executing the instructions of FIGS. 11 and 14-16 to implement the example drone of FIGS. 1 and/or 3.

FIG. 18 is an example processor platform 1800 capable of executing the instructions of FIGS. 11 and 14-16 to implement the example drone 300 of FIG. 3. The processor platform 1800 of the illustrated example includes a processor implemented as the example controller 316 of FIG. 3. The controller 316 of the illustrated example is hardware. For example, the controller 316 can be implemented by one or more integrated circuit(s), logic circuit(s) or microprocessor(s) from any desired family or manufacturer. The controller 316 of the illustrated example includes a local memory 1802 (e.g., a cache). The controller 316 of the illustrated example also includes the example data aggregator 330, the example wind data generator 332, the example route manager 334, the example launch manager 336, the example power manager 338 and the example shape manager 340 of FIG. 3.

The controller 316 of the illustrated example is in communication with one or more example sensors 1804 via a bus 1806. The example sensors 1804 include the example IMU 302, the example GPS receiver 306, the example altimeter 308, the example accelerometer 322 and the example gyroscope 324 of FIG. 3.

The controller 316 of the illustrated example is also in communication with a main memory including a volatile memory 1808 and a non-volatile memory 1810 via the bus 1806. The volatile memory 1808 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1810 may be implemented by flash memory and/or any other desired type of memory device. Access to the volatile memory 1808 and the non-volatile memory 1810 is controlled by a memory controller. In the illustrated example of FIG. 18, one or both of the volatile memory 1808 and/or the non-volatile memory 1810 include(s) the example memory 318 of FIG. 3.

The processor platform 1800 of the illustrated example also includes a user interface circuit 1812. The user interface circuit 1812 may be implemented by any type of interface standard, such as an Ethernet interface, a universal serial bus (USB), and/or a PCI express interface. In the illustrated example, one or more input device(s) 326 are connected to the user interface circuit 1812. The input device(s) 326 permit(s) a user to enter data and commands into the controller 316. The input device(s) 326 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 328 are also connected to the user interface circuit 1812 of the illustrated example. The output device(s) 328 can be implemented, for example, by a light emitting diode, an organic light emitting diode, a liquid crystal display, a touchscreen and/or a speaker. The user interface circuit 1812 of the illustrated example may, thus, include a graphics driver such as a graphics driver chip and/or processor. In the illustrated example, the input device(s) 326, the output device(s) 328 and the user interface circuit 1812 collectively form the example user interface 314 of FIG. 3.

The processor platform 1800 of the illustrated example also includes a network interface circuit 1814. The network interface circuit 1814 may be implemented by any type of interface standard, such as an Ethernet interface, a universal serial bus (USB), and/or a PCI express interface. In the illustrated example, the network interface circuit 1814 includes the example radio transmitter 310 and the example radio receiver 312 of FIG. 3 to facilitate the exchange of data and/or signals with external machines (e.g., the server 152 of FIGS. 1 and/or 4, the first, second, third and/or fourth turbines 126, 132, 138, 144 of FIGS. 1 and/or 2, etc.) via a network 1816 (e.g., a cellular network, a wireless local area network (WLAN), etc.).

Coded instructions 1818 corresponding to FIGS. 11 and 14-16 may be stored in the local memory 1802, in the volatile memory 1808, in the non-volatile memory 1810, and/or on a removable tangible computer readable storage medium such as a flash memory stick, a CD or DVD.

Figure 19:
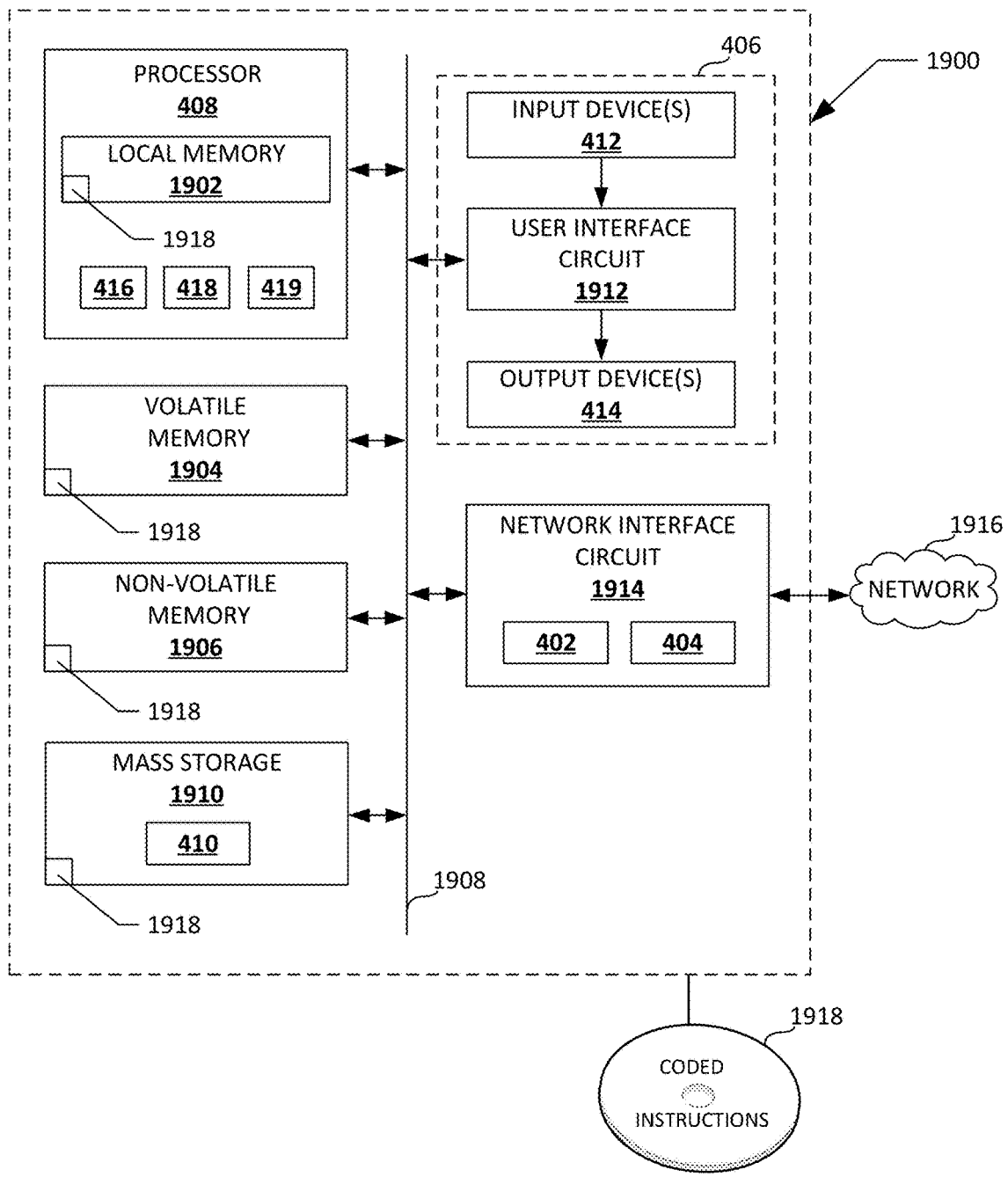
FIG. 19 is an example processor platform capable of executing the instructions of FIGS. 12 and 13 to implement the example server of FIGS. 1 and/or 4.

FIG. 19 is an example processor platform 1900 capable of executing the instructions of FIGS. 12 and 13 to implement the example server 152 of FIGS. 1 and/or 4. The processor platform 1900 of the illustrated example includes the example processor 408 of FIG. 4. The processor 408 of the illustrated example is hardware. For example, the processor 408 can be implemented by one or more integrated circuit(s), logic circuit(s) or microcontrollers(s) from any desired family or manufacturer. The processor 408 of the illustrated example includes a local memory 1802 (e.g., a cache). The processor 408 of the illustrated example also includes the example data aggregator 416, the example wind data generator 418 and the example route manager 419 of FIG. 4.

The processor 408 of the illustrated example is also in communication with a main memory including a volatile memory 1904 and a non-volatile memory 1906 via a bus 1908. The volatile memory 1904 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1906 may be implemented by flash memory and/or any other desired type of memory device. Access to the volatile memory 1904 and the non-volatile memory 1906 is controlled by a memory controller.

The processor 408 of the illustrated example is also in communication with one or more mass storage devices 1910 for storing software and/or data. Examples of such mass storage devices 1910 include floppy disk drives, hard disk drives, compact disk drives, Blu-ray disk drives, RAID systems, and digital versatile disk (DVD) drives. In the illustrated example of FIG. 19, the mass storage device 1910 includes the example memory 410 of FIG. 4.

The processor platform 1900 of the illustrated example also includes a user interface circuit 1912. The user interface circuit 1912 may be implemented by any type of interface standard, such as an Ethernet interface, a universal serial bus (USB), and/or a PCI express interface. In the illustrated example, one or more input device(s) 412 are connected to the user interface circuit 1912. The input device(s) 412 permit(s) a user to enter data and commands into the processor 408. The input device(s) 412 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 414 are also connected to the user interface circuit 1912 of the illustrated example. The output device(s) 414 can be implemented, for example, by a light emitting diode, an organic light emitting diode, a liquid crystal display, a touchscreen and/or a speaker. The user interface circuit 1912 of the illustrated example may, thus, include a graphics driver such as a graphics driver chip and/or processor. In the illustrated example, the input device(s) 412, the output device(s) 414 and the user interface circuit 1912 collectively form the example user interface 406 of FIG. 4.

The processor platform 1900 of the illustrated example also includes a network interface circuit 1914. The network interface circuit 1914 may be implemented by any type of interface standard, such as an Ethernet interface, a universal serial bus (USB), and/or a PCI express interface. In the illustrated example, the network interface circuit 1914 includes the example radio transmitter 402 and the example radio receiver 404 of FIG. 4 to facilitate the exchange of data and/or signals with external machines (e.g., the first, second, third and/or fourth turbines 126, 132, 138, 144 of FIGS. 1 and/or 2, the first, second, third and/or fourth airborne drones 158, 160, 162, 164 of FIGS. 1 and/or 3, the drone 102 of FIGS. 1 and/or 3, etc.) via a network 1916 (e.g., a cellular network, a wireless local area network (WLAN), etc.).

Coded instructions 1918 corresponding to FIGS. 12 and 13 may be stored in the local memory 1902, in the volatile memory 1904, in the non-volatile memory 1906, in the mass storage device 1910, and/or on a removable tangible computer readable storage medium such as a flash memory stick, a CD or DVD.

From the foregoing, it will be appreciated that methods and apparatus have been disclosed for reducing energy consumed by a drone during flight. Unlike such known drone applications, methods and apparatus disclosed herein generate a route to reduce energy consumed during a flight of the drone based on wind data including turbine-generated wind data and/or airborne drone-generated wind data generated in real time or near real time. The turbine-generated wind data and/or the airborne drone-generated wind data advantageously provide(s) the drone with actual (e.g., not modeled), localized, real-time (or near real-time) data and/or information relating to the current airflow(s) and or wind condition(s) within one or more area(s) through which the drone is to pass during a flight. By taking such actual, localized, real-time (or near real-time) data and information into consideration when generating a route to be followed by the drone during the flight, the drone is advantageously able to reduce the energy consumed by the drone during the flight.

In some examples, a drone is disclosed. In some disclosed examples, the drone includes a housing, a motor, and a route manager to generate a route for a flight of the drone based on wind data. In some disclosed examples, the wind data includes turbine-generated wind data provided by turbines that detect airflows received at the turbines. In some disclosed examples, the turbines are located in one or more area(a) within which a segment of the flight of the drone is to occur. In some disclosed examples, the route is to be followed by the drone during the flight to reduce energy consumed by the drone during the flight.

In some disclosed examples of the drone, the turbine-generated wind data includes a direction of airflow detected by a first one of the turbines, a speed of the airflow detected by the first one of the turbines, and a location of the first one of the turbines. In some disclosed examples, the route passes through a tailwind area within which the drone is to engage a tailwind during the flight. In some disclosed examples, the tailwind is to be detected by at least one of the turbines. In some disclosed examples, the route passes through an updraft area within which the drone is to engage an updraft during the flight. In some disclosed examples, the updraft is to be detected by at least one of the turbines.

In some disclosed examples of the drone, the wind data further includes airborne drone-generated wind data provided to the drone by an airborne drone located in the area within which the segment of the flight of the drone is to occur. In some disclosed examples, the airborne drone-generated wind data is to be determined by an inertial measurement unit of the airborne drone. In some disclosed examples, the airborne drone-generated wind data includes a direction of airflow detected by the inertial measurement unit, a speed of the airflow detected by the inertial measurement unit, and a location of the airborne drone.

In some disclosed examples of the drone, the drone is to be launched via a launch booster. In some disclosed examples, the launch booster is to increase at least one of a height of the drone or a speed of the drone. In some disclosed examples, the launch booster includes at least one of a catapult, a slingshot, a balloon, a rocket, or a vacuum chamber. In some disclosed examples, the drone includes a power manager to provide power to the motor of the drone in response to detecting an apex of the launch of the drone. In some disclosed examples, the drone includes a shape manager to change a shape of the drone in response to detecting an apex of the launch of the drone.

Methods to reduce energy consumed by a drone during a flight of the drone are also disclosed. In some disclosed examples, the method includes obtaining, by executing a computer readable instruction with a processor, wind data. In some disclosed examples, the wind data includes turbine-generated wind data provided by turbines that detect airflows received at the turbines. In some disclosed examples, the turbines are located in one or more area(s) within which a segment of the flight is to occur. In some disclosed examples, the method includes generating, by executing a computer readable instruction with the processor, a route for the flight of the drone based on wind data. In some disclosed examples, the route is to be followed by the drone during the flight to reduce the energy consumed by the drone during the flight.

In some disclosed examples of the method, the turbine-generated wind data includes a direction of airflow detected by a first one of the turbines, a speed of the airflow detected by the first one of the turbines, and a location of the first one of the turbines. In some disclosed examples, the route passes through a tailwind area within which the drone is to engage a tailwind during the flight. In some disclosed examples, the tailwind is to be detected by at least one of the turbines. In some disclosed examples, the route passes through an updraft area within which the drone is to engage an updraft during the flight. In some disclosed examples, the updraft is to be detected by at least one of the turbines.

In some disclosed examples of the method, the wind data further includes airborne drone-generated wind data obtained by the drone from an airborne drone located in the area within which the segment of the flight of the drone is to occur. In some disclosed examples, the airborne drone-generated wind data is determined by an inertial measurement unit of the airborne drone. In some disclosed examples, the airborne drone-generated wind data includes a direction of airflow detected by the inertial measurement unit, a speed of the airflow detected by the inertial measurement unit, and a location of the airborne drone.

In some disclosed examples of the method, the method includes launching the drone via a launch booster. In some disclosed examples, the launching of the drone via the launch booster increases at least one of a height of the drone or a speed of the drone. In some disclosed examples, the launching of the drone via the launch booster includes at least one of launching the drone via a catapult, launching the drone via a slingshot, launching the drone via a balloon, launching the drone via a rocket, or launching the drone via a vacuum chamber. In some disclosed examples, the method includes providing power to a motor of the drone in response to detecting an apex of the launch of the drone. In some disclosed examples, the method includes changing a shape of the drone in response to detecting an apex of the launch of the drone.

Tangible machine-readable storage media comprising instructions are also disclosed. In some disclosed examples, the instructions, when executed, cause a processor to obtain wind data. In some disclosed examples, the wind data includes turbine-generated wind data provided by turbines that detect airflows received at the turbines. In some disclosed examples, the turbines are located in one or more area(s) within which a segment of a flight of a drone is to occur. In some disclosed examples, the instructions, when executed, cause the processor to generate a route for the flight of the drone based on wind data. In some disclosed examples, the route is to be followed by the drone during the flight to reduce the energy consumed by the drone during the flight.

In some disclosed examples of the tangible machine-readable storage medium, the turbine-generated wind data includes a direction of airflow detected by a first one of the turbines, a speed of the airflow detected by the first one of the turbines, and a location of the first one of the turbines. In some disclosed examples, the route passes through a tailwind area within which the drone is to engage a tailwind during the flight. In some disclosed examples, the tailwind is to be detected by at least one of the turbines. In some disclosed examples, the route passes through an updraft area within which the drone is to engage an updraft during the flight. In some disclosed examples, the updraft is to be detected by at least one of the turbines.

In some disclosed examples of the tangible machine-readable storage medium, the wind data further includes airborne drone-generated wind data obtained by the drone from an airborne drone located in the area within which the segment of the flight of the drone is to occur. In some disclosed examples, the airborne drone-generated wind data is determined by an inertial measurement unit of the airborne drone. In some disclosed examples, the airborne drone-generated wind data includes a direction of airflow detected by the inertial measurement unit, a speed of the airflow detected by the inertial measurement unit, and a location of the airborne drone.

In some disclosed examples of the tangible machine-readable storage medium, the instructions, when executed, cause the processor to launch the drone via a launch booster. In some disclosed examples, the launching of the drone via the launch booster increases at least one of a height of the drone or a speed of the drone. In some disclosed examples, the launching of the drone via the launch booster includes at least one of launching the drone via a catapult, launching the drone via a slingshot, launching the drone via a balloon, launching the drone via a rocket, or launching the drone via a vacuum chamber. In some disclosed examples, the instructions, when executed, cause the processor to provide power to a motor of the drone in response to detecting an apex of the launch of the drone. In some disclosed examples, the instructions, when executed, cause the processor to change a shape of the drone in response to detecting an apex of the launch of the drone.

In some disclosed examples, a drone is disclosed. In some disclosed examples, the drone includes a housing, a motor, and route planning means for generating a route for a flight of the drone based on wind data. In some disclosed examples, the wind data includes turbine-generated wind data provided by airflow detecting means for detecting airflows received at the airflow detecting means. In some disclosed examples, the airflow detecting means is located in an area within which a segment of the flight of the drone is to occur. In some disclosed examples, the route is to be followed by the drone during the flight to reduce energy consumed by the drone during the flight.

In some disclosed examples of the drone, the turbine-generated wind data includes a direction of airflow detected by the airflow detecting means, a speed of the airflow detected by the airflow detecting means, and a location of the airflow detecting means. In some disclosed examples, the route passes through a tailwind area within which the drone is to engage a tailwind during the flight. In some disclosed examples, the tailwind is to be detected by the airflow detecting means. In some disclosed examples, the route passes through an updraft area within which the drone is to engage an updraft during the flight. In some disclosed examples, the updraft is to be detected by the airflow detecting means.

In some disclosed examples of the drone, the wind data includes airborne drone-generated wind data provided to the drone by an airborne drone located in the area within which the segment of the flight of the drone is to occur. In some disclosed examples, the airborne drone-generated wind data is to be determined by an inertial measurement unit of the airborne drone. In some disclosed examples, the airborne drone-generated wind data includes a direction of airflow detected by the inertial measurement unit, a speed of the airflow detected by the inertial measurement unit, and a location of the airborne drone.

In some disclosed examples of the drone, the drone is to be launched via a launch boosting means. In some disclosed examples, the launch boosting means is to increase at least one of a height of the drone or a speed of the drone. In some disclosed examples, the launch boosting means includes at least one of a catapult, a slingshot, a balloon, a rocket, or a vacuum chamber. In some disclosed examples, the drone includes a power management means for providing power to the motor of the drone in response to detecting an apex of the launch of the drone. In some disclosed examples, the drone includes a shape management means for changing a shape of the drone in response to detecting an apex of the launch of the drone.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A drone, comprising:
   a housing;
   a motor;
   receiver circuitry carried by the housing, the receiver circuitry to receive airborne drone-generated wind data from an airborne drone located in an area within which a segment of a flight of the drone is to occur, the airborne drone-generated wind data to be determined by an inertial measurement unit of the airborne drone; and
   a route manager to generate a route for the flight of the drone based on wind data, the wind data including the airborne drone-generated wind data, the route to be followed by the drone during the flight, the route manager to select at least one portion of the route to cause the drone to be at least partially propelled by wind to reduce energy consumed by the drone during the flight.

2. A drone as defined in claim 1, wherein the airborne drone-generated wind data includes a direction of airflow detected by the inertial measurement unit, a speed of the airflow detected by the inertial measurement unit, and a location of the airborne drone.

3. A drone as defined in claim 1, wherein the route manager is to select a portion of the route including a tailwind area within which the drone is to engage a tailwind during the flight, the tailwind to be detected by the airborne drone.

4. A drone as defined in claim 1, wherein the route manager is to select a portion of the route including an updraft area within which the drone is to engage an updraft during the flight, the updraft to be detected by the airborne drone.

5. A drone as defined in claim 1, wherein the drone is to be launched via a launch booster.

6. A drone as defined in claim 5, wherein the launch booster is to increase at least one of a height of the drone or a speed of the drone.

7. A drone as defined in claim 5, wherein the launch booster includes at least one of a catapult, a slingshot, a balloon, a rocket, or a vacuum chamber.

8. A drone as defined in claim 5, further including a power manager to provide power to the motor of the drone in response to detecting an apex of the launch of the drone.

9. A drone as defined in claim 5, further including a shape manager to change a shape of the drone in response to detecting an apex of the launch of the drone.

10. A drone as defined in claim 1, wherein the wind data further includes turbine-generated wind data provided by turbines that detect airflows received at the turbines, the turbines located in the area within which the segment of the flight is to occur, the turbine-generated wind data including a direction of airflow detected by a first one of the turbines, a speed of the airflow detected by the first one of the turbines, and a location of the first one of the turbines.

11. A drone, comprising:
a housing;
a motor;
an altitude sensor carried by the housing, the altitude sensor to detect an altitude of the drone; and
a power manager to detect, based on the altitude, an apex of a launch of the drone from a launch booster, the power manager to provide power to the motor of the drone in response to detecting the apex.

12. A drone as defined in claim 11, wherein the launch booster is to increase at least one of a height of the drone or a speed of the drone.

13. A drone as defined in claim 11, wherein the launch booster includes at least one of a catapult, a slingshot, a balloon, a rocket, or a vacuum chamber.

14. A drone as defined in claim 11, further including a route manager to generate a route for a flight of the drone based on wind data, the wind data including airborne drone-generated wind data provided to the drone by an airborne drone located in an area within which a segment of the flight is to occur, the airborne drone-generated wind data to be determined by an inertial measurement unit of the airborne drone, the route to be followed by the drone during the flight to reduce energy consumed by the drone during the flight.

15. A drone as defined in claim 14, wherein the airborne drone-generated wind data includes a direction of airflow detected by the inertial measurement unit, a speed of the airflow detected by the inertial measurement unit, and a location of the airborne drone.

16. A drone, comprising:
a housing;
a motor;
an altitude sensor carried by the housing, the altitude sensor to detect an altitude of the drone; and
a shape manager to detect, based on the altitude, an apex of a launch of the drone from a launch booster, the shape manager to change a shape of the drone in response to detecting the apex.

17. A drone as defined in claim 16, wherein the launch booster is to increase at least one of a height of the drone or a speed of the drone.

18. A drone as defined in claim 16, wherein the launch booster includes at least one of a catapult, a slingshot, a balloon, a rocket, or a vacuum chamber.

19. A drone as defined in claim 16, further including a route manager to generate a route for a flight of the drone based on wind data, the wind data including airborne drone-generated wind data provided to the drone by an airborne drone located in an area within which a segment of the flight is to occur, the airborne drone-generated wind data to be determined by an inertial measurement unit of the airborne drone, the route to be followed by the drone during the flight to reduce energy consumed by the drone during the flight.

20. A drone as defined in claim 19, wherein the airborne drone-generated wind data includes a direction of airflow detected by the inertial measurement unit, a speed of the airflow detected by the inertial measurement unit, and a location of the airborne drone.

* * * * *